US010000370B2

(12) United States Patent
Bethuy et al.

(10) Patent No.: US 10,000,370 B2
(45) Date of Patent: Jun. 19, 2018

(54) CONTAINER-LESS CUSTOM BEVERAGE VENDING INVENTION

(71) Applicant: Ecowell, LLC, Exton, PA (US)

(72) Inventors: Timothy William Bethuy, Erie, PA (US); Preston Fitzjarrell David, Honey Brook, PA (US); Matthew J. Wiant, Fairfield, CT (US)

(73) Assignee: Ecowell, LLC, Exton, PA (US)

( * ) Notice: Subject to any disclaimer, the term of this patent is extended or adjusted under 35 U.S.C. 154(b) by 0 days. days.

(21) Appl. No.: 15/252,812

(22) Filed: Aug. 31, 2016

(65) Prior Publication Data

US 2016/0368753 A1  Dec. 22, 2016

Related U.S. Application Data

(63) Continuation-in-part of application No. 14/688,017, filed on Apr. 16, 2015, now abandoned, which is a
(Continued)

(51) Int. Cl.
*B67D 1/00* (2006.01)
*B67D 1/10* (2006.01)
(Continued)

(52) U.S. Cl.
CPC ........ *B67D 1/0037* (2013.01); *A47J 31/4403* (2013.01); *B67D 1/004* (2013.01);
(Continued)

(58) Field of Classification Search
CPC ...... B67D 1/0037; B67D 1/0888; B67D 1/10; B67D 1/0857; B67D 1/0895; B67D 1/1231; B67D 1/0025; B67D 1/0031; B67D 1/0046; B67D 1/004; B67D 1/0041; B67D 1/005; B67D 1/0052; B67D 1/0067; B67D 1/0068; B67D 1/07; B67D 1/0869;
(Continued)

(56) References Cited

U.S. PATENT DOCUMENTS 3,695,314 A   10/1972   Watts et al.
3,991,911 A   11/1976   Shannon et al.
(Continued)

OTHER PUBLICATIONS

The International Search Report and the Written Opinion of the International Searching Authority dated Nov. 13, 2017 for corresponding International Application No. PCT/US2017/042736.

*Primary Examiner* — Michael Collins
(74) *Attorney, Agent, or Firm* — DLA Piper LLP (US)

(57) ABSTRACT

Methods and apparatus describing a convenience beverage vending machine and its operation are described. An embedded computer interface allows consumers to create their own drinks or choose from a menu of drinks. Drinks are dispensed in a container. The beverages may be made from hot water, cold water or carbonated water that is mixed with various flavors of syrup, sweeteners and nutritional supplements. Identification may be presented and the computer recognizes the consumer and pulls up that consumer's account to determine funds available and previous drink selections and mixtures. The machine may incorporate an automatic cleaning cycle for both the valves and the dispense area.

29 Claims, 45 Drawing Sheets

Related U.S. Application Data continuation of application No. 13/798,296, filed on Mar. 13, 2013, now Pat. No. 9,026,245, which is a continuation of application No. 13/021,607, filed on Feb. 4, 2011, now Pat. No. 8,442,674.

(60) Provisional application No. 61/301,959, filed on Feb. 5, 2010.

(51) Int. Cl.
| | |
|---|---|
| *B67D 1/12* | (2006.01) |
| *B67D 1/08* | (2006.01) |
| *A47J 31/44* | (2006.01) |
| *G06Q 30/06* | (2012.01) |
| *G07F 13/06* | (2006.01) |
| *B67D 1/07* | (2006.01) |

(52) U.S. Cl.
CPC ......... *B67D 1/0025* (2013.01); *B67D 1/0031* (2013.01); *B67D 1/0046* (2013.01); *G06Q 30/0631* (2013.01); *G06Q 30/0641* (2013.01); *G07F 13/065* (2013.01); *B67D 1/005* (2013.01); *B67D 1/0041* (2013.01); *B67D 1/0052* (2013.01); *B67D 1/0067* (2013.01); *B67D 1/0068* (2013.01); *B67D 1/07* (2013.01); *B67D 1/0869* (2013.01); *B67D 1/0884* (2013.01); *B67D 1/0888* (2013.01); *B67D 1/0895* (2013.01); *B67D 1/108* (2013.01); *B67D 1/122* (2013.01); *B67D 1/1206* (2013.01); *B67D 1/1231* (2013.01); *B67D 1/1238* (2013.01); *B67D 2001/0097* (2013.01); *B67D 2210/00007* (2013.01); *B67D 2210/00015* (2013.01)

(58) Field of Classification Search
CPC .... B67D 1/0884; B67D 1/108; B67D 1/1206; B67D 1/122; B67D 1/1238; B67D 2001/0097; B67D 2210/00007; B67D 2210/00015; A47J 31/4403; G06Q 30/0631; G06Q 30/0641; G07F 13/065
USPC .......................................... 700/233, 239, 240
See application file for complete search history.

(56) References Cited

U.S. PATENT DOCUMENTS

| | | | |
|---|---|---|---|
| 4,011,967 A | 3/1977 | Halsey et al. | |
| 4,231,524 A | 11/1980 | Aprea et al. | |
| 4,265,371 A | 5/1981 | Desai et al. | |
| 4,278,186 A | 7/1981 | Williamson | |
| 4,343,434 A | 8/1982 | Haruch | |
| 4,474,331 A | 10/1984 | Aprea et al. | |
| 4,624,414 A | 11/1986 | Ferrazza | |
| 4,979,641 A | 12/1990 | Turner | |
| 4,988,043 A | 1/1991 | Lechler | |
| 5,072,883 A | 12/1991 | Vidusek | |
| 5,143,298 A | 9/1992 | Prokopoff | |
| 5,176,325 A | 1/1993 | Vidusek | |
| 5,372,312 A | 12/1994 | Vidusek | |
| 5,491,333 A | 2/1996 | Skell et al. | |
| 5,868,321 A | 2/1999 | Haruch | |
| 5,899,387 A | 5/1999 | Haruch | |
| 6,036,055 A | 3/2000 | Mogadam et al. | |
| 6,058,718 A | 5/2000 | Forsberg et al. | |
| 6,076,744 A | 6/2000 | O'Brien | |
| 6,182,453 B1* | 2/2001 | Forsberg | B01D 5/0072 62/125 |
| 6,279,838 B1 | 8/2001 | Sivells et al. | |
| 6,322,003 B1 | 11/2001 | Haruch | |
| 6,393,338 B1 | 5/2002 | Kemnitz | |
| 6,394,366 B1 | 5/2002 | Adams | |
| 6,449,532 B1 | 9/2002 | Nicol | |
| 6,561,440 B1 | 5/2003 | Hofherr | |
| 6,609,431 B1 | 8/2003 | Tietsworth et al. | |
| 6,705,538 B2 | 3/2004 | Fecht et al. | |
| 6,759,072 B1 | 7/2004 | Gutwein et al. | |
| 6,772,960 B2 | 8/2004 | Speier | |
| 6,997,405 B2 | 2/2006 | Haruch | |
| 7,370,815 B2 | 5/2008 | Fecht et al. | |
| 7,438,941 B2 | 10/2008 | Gutwein et al. | |
| 7,439,859 B2 | 10/2008 | Humphrey | |
| 7,455,867 B1 | 11/2008 | Gutwein et al. | |
| 7,611,080 B2 | 11/2009 | Peterson et al. | |
| 7,627,496 B2 | 12/2009 | Walker et al. | |
| 7,689,468 B2 | 3/2010 | Walker et al. | |
| 7,717,059 B2 | 5/2010 | Wanthal et al. | |
| 7,739,181 B2 | 6/2010 | Breitenbach et al. | |
| 7,750,817 B2 | 7/2010 | Teller | |
| 7,754,025 B1 | 7/2010 | Crisp, III | |
| 7,757,896 B2 | 7/2010 | Carpenter et al. | |
| 7,768,396 B2 | 8/2010 | Teller | |
| 7,783,381 B2 | 8/2010 | Walker et al. | |
| 7,856,910 B2 | 12/2010 | Kwok | |
| 7,857,910 B2 | 12/2010 | Carhuff et al. | |
| 7,899,713 B2 | 3/2011 | Rothschild | |
| 7,912,579 B2 | 3/2011 | Stettes | |
| 7,913,879 B2 | 3/2011 | Carpenter et al. | |
| 8,003,145 B2 | 8/2011 | Gutwein et al. | |
| 8,032,251 B2 | 10/2011 | Morin | |
| 8,062,684 B2 | 11/2011 | Gutwein et al. | |
| 8,103,378 B2 | 1/2012 | Crisp, III | |
| 8,121,917 B2 | 2/2012 | Insolia et al. | |
| 8,162,176 B2 | 4/2012 | Rudick | |
| 8,162,181 B2 | 4/2012 | Carpenter et al. | |
| 8,251,258 B2 | 8/2012 | Rudick et al. | |
| 8,322,570 B2* | 12/2012 | Beavis | A47J 31/36 222/129.1 |
| 8,340,815 B2 | 12/2012 | Peters et al. | |
| 8,442,674 B2 | 5/2013 | Tilton et al. | |
| 8,504,196 B2 | 8/2013 | Wiles | |
| 8,524,327 B2 | 9/2013 | Wanthal et al. | |
| 8,814,000 B2 | 8/2014 | Rudick | |
| 8,820,663 B2 | 9/2014 | Vidusek et al. | |
| 8,960,571 B2 | 2/2015 | Haruch | |
| 8,998,035 B2 | 4/2015 | Ford | |
| 9,026,245 B2 | 5/2015 | Tilton et al. | |
| 9,032,699 B2 | 5/2015 | Ramabadran | |
| 9,180,471 B2 | 11/2015 | Schlecht et al. | |
| 9,339,022 B2 | 5/2016 | Buck et al. | |
| 2002/0020757 A1 | 2/2002 | Speier | |
| 2002/0134862 A1 | 9/2002 | Fecht et al. | |
| 2003/0089800 A1 | 5/2003 | Hofherr | |
| 2003/0188740 A1 | 10/2003 | Tribelsky et al. | |
| 2004/0040983 A1 | 3/2004 | Ziesel | |
| 2004/0056124 A1 | 3/2004 | Haruch | |
| 2005/0087255 A1 | 4/2005 | Humphrey et al. | |
| 2005/0133628 A1 | 6/2005 | Fecht et al. | |
| 2005/0276883 A1 | 12/2005 | Jeffrey et al. | |
| 2005/0284957 A1 | 12/2005 | Haruch | |
| 2006/0081653 A1 | 4/2006 | Boland et al. | |
| 2006/0238346 A1 | 10/2006 | Teller | |
| 2006/0286290 A1 | 12/2006 | Wanthal | |
| 2006/0293956 A1 | 12/2006 | Walker et al. | |
| 2007/0204930 A1* | 9/2007 | Phallen | B67D 1/1234 141/83 |
| 2007/0207040 A1 | 9/2007 | Hughes et al. | |
| 2007/0271194 A1 | 11/2007 | Walker et al. | |
| 2007/0290073 A1 | 12/2007 | Peterson et al. | |
| 2008/0004973 A1 | 1/2008 | Rothschild | |
| 2008/0033595 A1 | 2/2008 | Packes, Jr. et al. | |
| 2008/0033824 A1 | 2/2008 | Packes, Jr. et al. | |
| 2008/0040211 A1 | 2/2008 | Walker et al. | |
| 2008/0142115 A1 | 6/2008 | Vogt et al. | |
| 2009/0065520 A1 | 3/2009 | Peters et al. | |
| 2009/0069931 A1 | 3/2009 | Peters et al. | |
| 2009/0069932 A1* | 3/2009 | Rudick | B67D 1/0888 700/239 |
| 2009/0069934 A1 | 3/2009 | Newman et al. | |
| 2009/0070234 A1 | 3/2009 | Peters et al. | |
| 2009/0105875 A1 | 4/2009 | Wiles | |

(56) References Cited

U.S. PATENT DOCUMENTS

| | | |
|---|---|---|
| 2009/0152345 A1 | 6/2009 | Johnson |
| 2009/0280229 A1* | 11/2009 | Constantine .............. A23L 2/66 |
| | | 426/521 |
| 2010/0030355 A1 | 2/2010 | Insolia et al. |
| 2010/0049362 A1 | 2/2010 | Hatuka |
| 2010/0125362 A1 | 5/2010 | Canora et al. |
| 2010/0145522 A1 | 6/2010 | Claesson et al. |
| 2010/0173048 A1 | 7/2010 | Miller |
| 2010/0176147 A1 | 7/2010 | Segers |
| 2010/0258654 A1 | 10/2010 | Peterson et al. |
| 2010/0268378 A1 | 10/2010 | Sharpley |
| 2011/0017776 A1* | 1/2011 | Metropulos .......... B67D 1/0041 |
| | | 222/129.1 |
| 2011/0049180 A1 | 3/2011 | Carpenter et al. |
| 2011/0114647 A1 | 5/2011 | Hallberg |
| 2011/0125334 A1 | 5/2011 | Deo et al. |
| 2011/0147491 A1 | 6/2011 | Pope et al. |
| 2011/0264285 A1 | 10/2011 | Mattos, Jr. et al. |
| 2011/0265431 A1 | 11/2011 | Ramabadran |
| 2012/0035761 A1 | 2/2012 | Tilton et al. |
| 2012/0123588 A1 | 5/2012 | Cloran et al. |
| 2012/0285986 A1 | 11/2012 | Irvin |
| 2013/0037565 A1 | 2/2013 | Newman |
| 2013/0186982 A1 | 7/2013 | Vidusek et al. |
| 2013/0231774 A1 | 9/2013 | Tilton et al. |
| 2014/0048622 A1 | 2/2014 | Haruch |
| 2014/0081777 A1 | 3/2014 | Mastrodonato et al. |
| 2014/0142749 A1 | 5/2014 | Peters et al. |
| 2014/0239081 A1 | 8/2014 | Schlecht et al. |
| 2015/0125586 A1 | 5/2015 | Ergican |
| 2015/0157005 A1 | 6/2015 | Buck et al. |
| 2015/0225224 A1 | 8/2015 | Tilton et al. |
| 2016/0090288 A1 | 3/2016 | Givens, Jr. et al. |
| 2016/0368752 A1* | 12/2016 | Bethuy ............... A47J 31/4403 |
| 2016/0368753 A1 | 12/2016 | Bethuy et al. |

\* cited by examiner

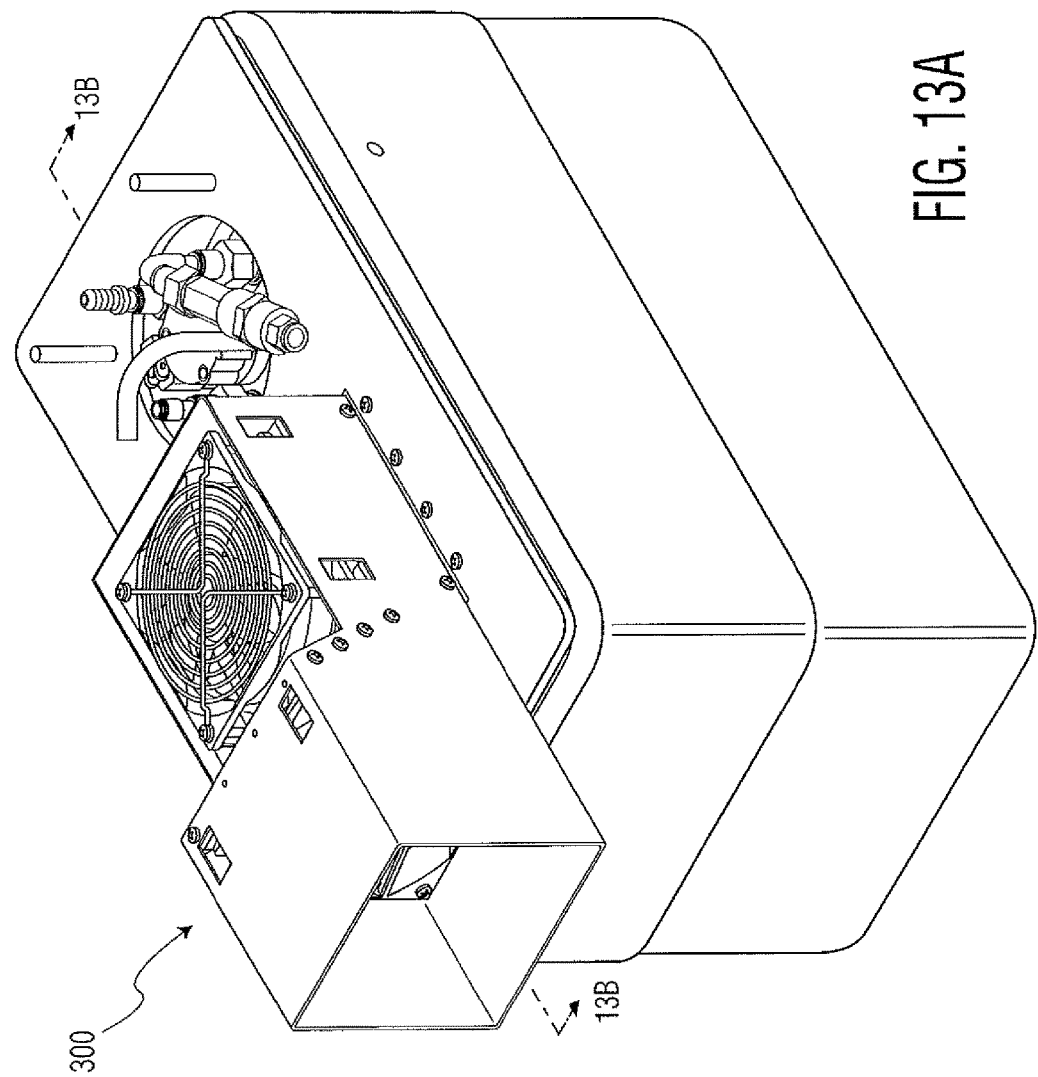

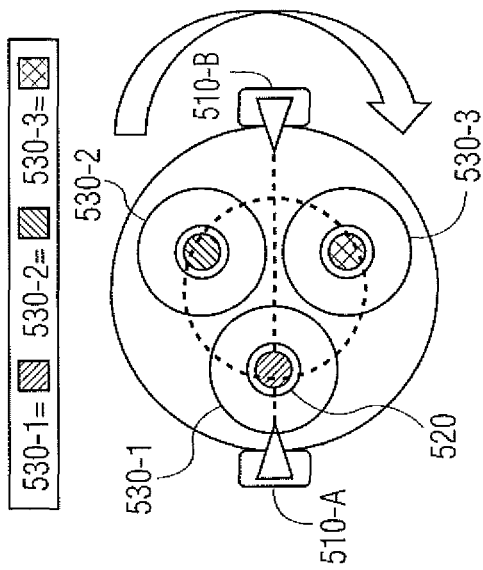
FIG. 20C
| ROTATION | SENSOR | ROLLER |
|---|---|---|
| 0° | A | 1 |
| 60° | B | 2 |
| 120° | A | 3 |
| 180° | B | 1 |
| 240° | A | 2 |
| 300° | B | 3 |
FIG. 20B
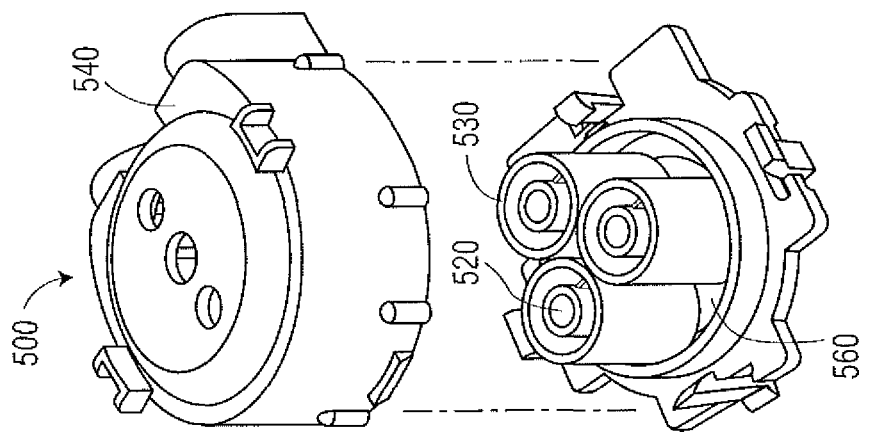
FIG. 20A

| ROTATION | SENSOR | ROLLER |
|---|---|---|
| 0° | A | 1 |
| 30° | C | 2 |
| 60° | B | 3 |
| 90° | D | 1 |
| 120° | A | 2 |
| 150° | C | 3 |
| 180° | B | 1 |
| 210° | D | 2 |
| 240° | A | 3 |
| 270° | C | 1 |
| 300° | B | 2 |
| 330° | D | 3 |

| ROTATION | APERTURE |
|---|---|
| 0° | 565-1 |
| 12° | 565-2 |
| 24° | 565-3 |
| 36° | 565-4 |
| 48° | 565-5 |
| 60° | 565-6 |
| 72° | 565-7 |
| 84° | 565-8 |
| 96° | 565-9 |
| 108° | 565-10 |
| 120-228° | 565-11-20 |
| 240-348° | 565-21-30 |

FIG. 24G

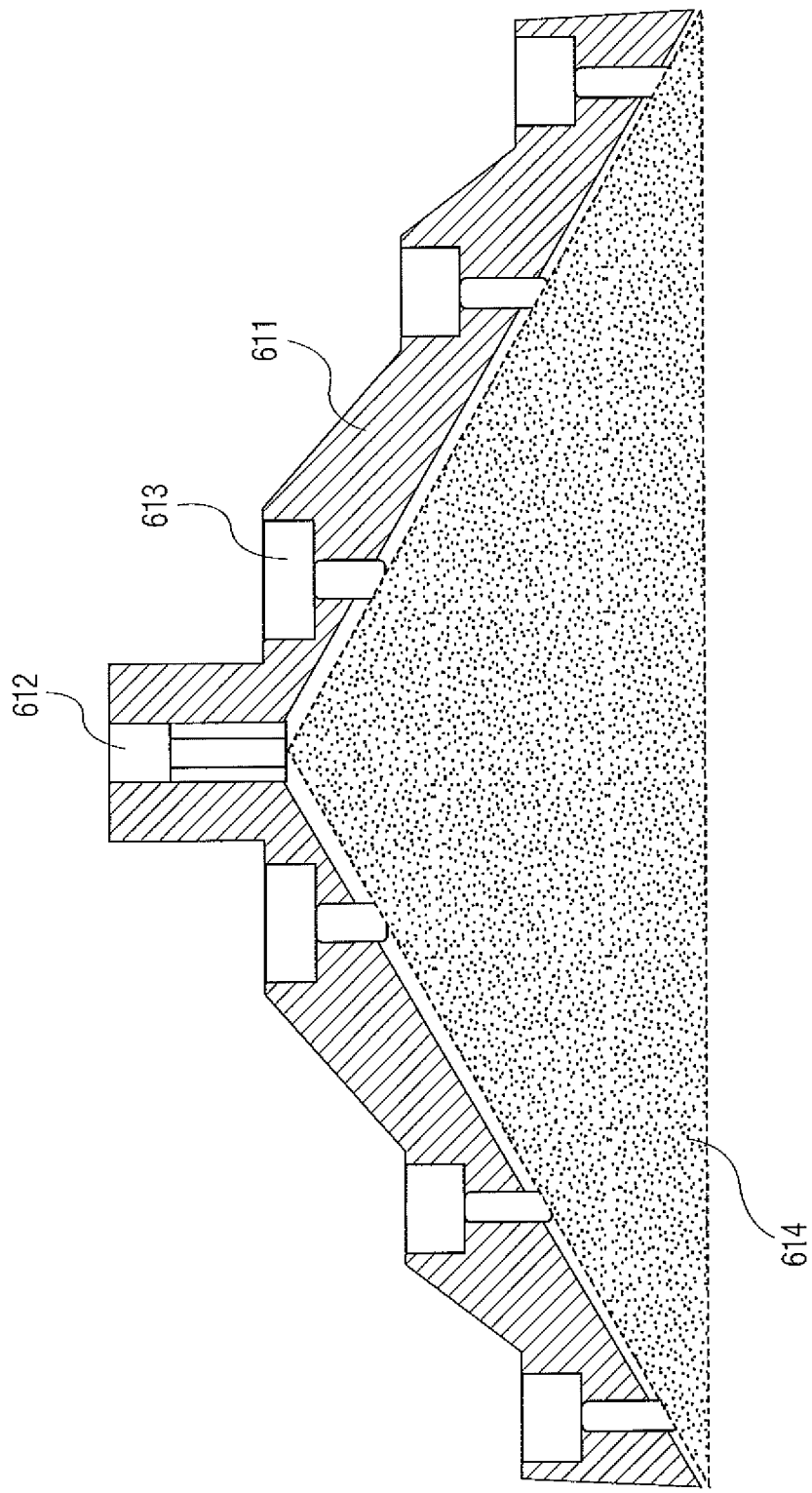

CONTAINER-LESS CUSTOM BEVERAGE VENDING INVENTION

BACKGROUND

Convenience beverage vending is a multi-billion dollar major industry world-wide. Today, market share is totally dominated by beverages sold in plastic bottles and aluminum cans. It is estimated that less than 15% of such beverage containers are currently recycled, leading to huge environmental waste.

In addition, most convenience beverages are predominately water, and consequently, there is a significant embedded energy in their bottling, transportation and distribution into the vending machines themselves.

There is a need for a new type of beverage vending that addresses the selection limitations and environmental concerns related to existing beverage vending machines.

SUMMARY

A convenience beverage vending machine and methods of dispensing convenience beverages are described. An embedded computer interface that allows customers to vend a wide variety of convenience beverages into their own containers is utilized. This vending machine is connected to a municipal water source and drain, in a similar fashion to a standard drinking fountain. This allows the bulk of the beverage contents to be supplied to the machine in a highly concentrated form, and mixed into a custom beverage in the machine, rather than transporting the water to the vending site. The municipal water entering the machine goes through a multi-stage filtration process that is custom tailored to the water quality at a specific location site.

The vending machine vends beverages that may be made from hot, cold or carbonated water, and everything from plain filtered water, to standard soft drinks, to fully custom beverages that are designed by the customer. Beverage ingredients may be stocked in the machine in one of two ways, both in highly concentrated forms. Beverage ingredients may be in the form of liquids, either in industry standard "bag-in-box" format, cartridges, or in product tanks. Beverage ingredients may be in powder form and may appear in bulk powder containers and or low volume containers. Each machine holds a plurality of separate ingredients. Some of these may be standard beverages and the remainder may be separate ingredients including, but not limited to: multiple types of real fruit syrup concentrates, regular and low calorie sweeteners, real fruit extracts, real herb extracts, natural flavor ingredients, coffees, teas, cocoa, chocolate, dairy based products, such milk or cream, non-dairy products, such as soy milk or almond milk, vegetables, such as juices or powders or purees, multiple types of flavored nutritional supplements, and multiple types of nutritional supplements.

A human agent or user may approach the invention and present identification. The machine identifies the user as a customer and pulls up that customer's account. Further, the machine may locate a customer based on a global positioning system (GPS) or a proximity sensor and sign the customer in via a mobile device application. If desired, the user may add funds through the machine interface with physical currency or bill the amount necessary, for example, to a credit card. The machine may also accumulate charges for beverages. The charges may be billed to any third party, such as but not limited to, an employer, sponsor, school district, host, advertiser, or health care provider. In an implementation, the third party may pay the full charge, or any portion of the full charge of the beverage such as a set fee (per beverage or per day), for example, as part of an employee benefit. The machine may also pull up a list of that user's favorite or recently vended beverages. The user can then simply order from this list, order plain filtered water, a standard soft drink, favorite or top selling recipes recommended by the machine, or design a totally new custom beverage. In designing a new custom beverage, the user may select flavor types (which may be blended) and their relative flavor intensity. For example, the user could select 30% pomegranate and 70% blueberry, and then vary the intensity from light, like a flavor hinted water, to heavy, like a fruit juice. The user may also select additional sweetener, from a more standard sugar based sweetener, like cane/agave syrup, or a low calorie sweetener, like stevia or monk fruit extract. Again, the user may select a combination of these in various percentages, and then vary the intensity from lightly sweet to very sweet. Next, the user may optionally select a nutritional supplement mix, like immune boost, energy boost, multi-vitamin, etc., select their relative percentages, and then vary the amount, maybe according to body weight. For example, a child may use less nutritional supplement than an adult. After making all these selections, the beverage is automatically mixed and dispensed into the user's own container. If the user likes the drink, it may be saved to the user's account and stored in the database for future vending or editing to adjust the recipe. In another example, a customer may access a social media outlet, such as provided by Facebook, Inc. headquartered in Palo Alto, Calif., and "drink share" recipes. For example, a customer may access a social media outlet (e.g., Facebook®) via an electronic application such as an iPhone® application, Android® application and/or other electronic application, and "drink share" custom drink recipes. A customer may then choose to have a local machine vend a shared drink recipe discovered from the social media outlet experience. The local machine may be able to vend the requested shared drink recipe by accessing a remote database via an internet connection. For example, a customer may discover a shared drink recipe during a social media outlet experience and save it to a personal account. The personal account may be saved in a remote database, which the machines are able to access and subsequently vend a drink as requested by the customer.

A custom mix ratio beverage may also be created. Unlike a standard soda machine, which vends the syrup and water base in a fixed ratio simultaneously, the microprocessor control allows any combination of all of the multiple ingredients stocked in the machine to be mixed in variable proportion to each other, and to the base water. Standard soda fountain mix ratios may be pre-programmed so that standard soft drinks may be vended, or completely custom beverages designed by the individual users may also be vended.

An automatic cleaning cycle, incorporated into a novel vending cycle may also be incorporated. In a standard soda fountain, soda syrup/water mix drips slightly at the end of each vending operation. This causes the dispense area to be sticky and hence, it requires frequent cleaning. A mixing manifold may be incorporated that is first cleaned with an automatic clean cycle. This purges any drips that may have leaked into the manifold during the period between vending cycles. The mixing manifold multi-path solenoid valve on the end that is normally open to the machine drain is connected to the drain. The cleaning cycle may be effectuated with hot water at approximately 190.degree. F. and/or with a cleaning solution such as bleach.

The vending machine may also be equipped to provide for automated cleaning of valves. Solenoid valves and standard soda fountain dispensing valves alike can become sticky over time, and may fail to open or close correctly. In a standard soda fountain machine, the machine parts are frequently disassembled and cleaned and then reassembled. One embodiment of the vending machine utilizes a periodic valve cleaning cycle which may be executed via software or through manual control at certain defined intervals based upon events such as elapsed time, or number of vends of given syrup types.

The vending machine may also provide a unique billing/customer interface that enables the individual customer to create unique beverages and store their favorite recipes in the machine central database. Each machine may be connected via the internet to the main database. As each individual machine may be stocked with different ingredients, the user interface may display drink possibilities that can be made in the specific machine that the customer is using. The system may also enable features such as "parental controls." This feature may be enabled in machines deployed in schools, where parents may set limits on the number and type of beverages their children can vend, and may put limits on types of beverages or specific ingredients, such as sugar. The parent may also require a specific nutritional supplement in each beverage. In addition, customers may name drinks and submit them to be tried and rated by other customers, and the database may display the top rated/top selling recipes in the machine. The system may also enable features such as "own/operator controls." For example, the machine may incorporate lockout times. For example, the machine may be programmed to lock the machine to students during class times, while remaining open to teachers and/or staff.

The vending machine may also be able to vend beverages into containers of all different sizes, colors and translucencies. Often opaque containers are difficult to see through during beverage filling causing overfilling and spills. If the user knows the bottle/container size, they can select the appropriate size/amount of total beverage, and the microprocessor may adjust the quantities of all ingredients automatically and fill the container accurately, without overflowing the container. If the user makes a mistake, and does not know the size of the container, a manual or microprocessor controlled cycle may be activated to circumvent overfilling.

The vending machine may also provide the user with a safe experience. Since the machine may be used to vend hot, cold or carbonated beverages, there is a risk that some customer may vend a hot drink into an unsuitable container, such as a stainless steel bottle that is not insulated, potentially causing burns. For this reason, the vending machine may incorporate a temperature sensor. If the temperature on the surface of the bottle exceeds a safe level, the user may be alerted and the vending process halted.

Dispense area sanitation may also be incorporated in the vending machine. Traditional soda fountains utilize a dispense nozzle which is activated by pushing a disposable cup up against the dispense valve lever. If users were to use their own containers with this type of dispense mechanism, bacteria may be transmitted to the dispense lever and consequently between successive customers. In one embodiment of the vending machine, a recessed dispense tube may be utilized which is shielded so it cannot come in contact with users bottles, and the entire dispense area may be flooded with an anti-bacterial Ultra-Violet sterilization light.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE DRAWINGS

The detailed description is described with reference to accompanying figures. In the figures, the left-most digit(s) of a reference number identifies the figure in which the reference number first appears. The use of the same reference numbers in different figures indicates similar or identical items.

FIGS. 13A and 13B are respective perspective and cross-sectional depictions of an implementation of a thermoelectric water cooling and carbonation system in the beverage dispensing system.

FIGS. 20A and 20B are exploded perspective view and cross-sectional view depictions, respectively, of an implementation of a two-sensor pulse counter dosing system using Hall effect sensors.

FIG. 20C is a chart of an implementation of the two-sensor pulse counter dosing system for pulse counting.

FIGS. 24A, 24B, 24C, 24D, 24E, 24F and 24G are a series of depictions of an implementation of the infra-red sensor pulse counter dosing system.

FIGS. 28A, 28B, 28C and 28D depict respective partial cross-sectional and cross-sectional views of an implementation of a full-cone spray of the nozzle in the beverage dispensing system.

DETAILED DESCRIPTION

Figure 1:
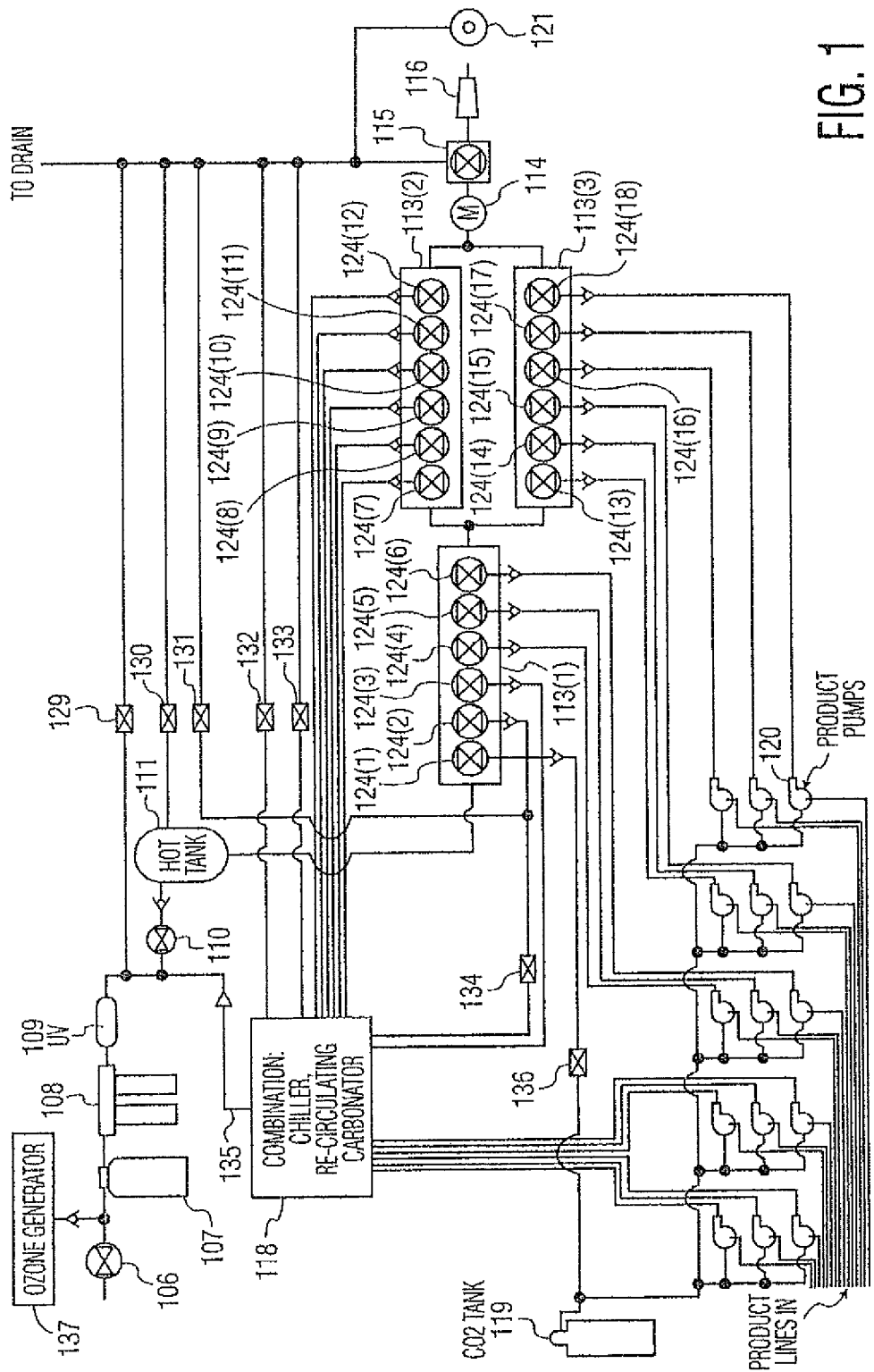
FIG. 1 is a schematic of an implementation of the plumbing system in the vending machine apparatus.

Referring to the drawings. FIG. 1 shows an implementation of the vending machine apparatus that may include a touch screen display 100. However, other implementations may include many other means for the delivery and/or reception of information to and from a user such as a keyboard, monitor, human interface device, or visual display. In an implementation, a personal computer (PC) containing a processor or processors and memory 101 may communicate with the touch screen display 100 to receive and transmit information related to the information acquired by the display 100 and/or delivered by the PC 101. Other implementations may include other means for the delivery or reception of information to a component interacting with the user.

The PC 101 may convert received information to a format and/or language for communication with two Programmable Logic Controllers (PLCs) 103, 104. Other implementations may include a means to directly and/or indirectly communicate the user's input with one or more controller devices.

The PC 101 may communicate with two PLCs 103, 104 via an Ethernet router 102. The PLCs 103, 104 may send and receive information to and from the PC 101 which is directly related to the information retrieved from a user and/or the operation of said PLCs 103, 104. Other implementations may include single or multiple control devices and/or methods capable of directly or indirectly effectuating the user's desire. In one example, the user may select an option presented on the touch screen display 100 which may then be transmitted to the PC 101. PC 101 may then interpret the user's input and convert the input to a format and/or language intelligible to the PLCs 103, 104. The PC 101 may then transmit information necessary to accomplish the desire of the user to the PLCs 103, 104 via an Ethernet router 102.

In an implementation the PLC 103 controls a relay 105 connected to a solenoid valve 124 to effectuate the controlled flow of fluid and/or gas through the solenoid manifold 113. Alternative implementations may include single or multiple relays of varying types including solid state relays, polarized relays, latching relays, reed relays, or other means to control or directly influence the actuation of a valve or the flow of fluid. Other implementations may also include single or multiple valves actuated by pneumatic, hydraulic, electrical, and/or other mechanical means. For example, the user's input after being communicated to the PLC 103 via the PC 101 and/or Ethernet router 102 may be effectuated by the activation of a relay 105 which activates a solenoid valve 124 allowing fluid to pass for an amount of time directly related to the user's input. Further, the user's input after being communicated to the PLC 103 via the PC 101 and/or Ethernet router 102 may be effectuated by the activation of a relay 105 which activates the solenoid valve 124 allowing fluid to pass for an amount of volume based on feedback from one or more flow sensors directly related to the user's input.

As illustrated in FIG. 1, an implementation utilizes a fluid system to effectuate the transportation, filtration, alteration and manipulation of one or more fluids and its properties. Water entering the vending machine apparatus passes through a normally closed safety solenoid valve 106. Valve 106 allows for the flow of fluid into the vending machine to be terminated at any time. An Ozone generator may be connected to the fluid path exiting valve 106 via a T-connection. Flow from the fluid path exiting valve 106 may be prevented from entering the Ozone generator via a check valve. In this implementation, the water passes through a water softening filter 107 to reduce magnesium, calcium, and other dissolved minerals to levels desirable and palatable for human consumption. After the softener 107, fluid passes through two activated carbon filters 108 orientated in series. The fluid then passes through an ultraviolet (UV) filter 109 before continuing to other components of the fluid system.

In summary, an implementation may use a four stage filtration process consisting of a softener 107, activated carbon filters 108, and a UV filter 109 to effectuate the delivery of water that is palatable and suitable for human consumption. However, other implementations may include varying quantities and types of purification and/or particulate filters necessary to effectuate the delivery of water that is palatable and suitable for human consumption. An implementation may include other means to reduce scale and/or water hardness such as a scale filter. Alternative implementations may omit the use of filtration in the fluid system.

The inlet fluid path may be divided to flow to several components. One component may be a solenoid valve 110 for controlling the flow of fluid to a hot tank or water heater 111. Another implementation may use one or more pneumatic, electric, hydraulic, and/or mechanical valves located before and/or after a heater tank to effectuate the flow of fluid to and from a heater tank.

The flow of fluid into the heater tank 111 may be directly controlled by the actuation of a solenoid valve 110. Fluid flow to and from the heater tank 111 passes through the inlet port and outlet port respectively. The outlet port may be directly connected to a fluid path that remains at atmospheric pressure at all times. Other implementations may utilize means to effectuate the heating of water such as a pressurized hot tank, instant water heater, or various other heat addition techniques.

The temperature of hot water may range from about 100.degree. F. to 212.degree. F. This hot fluid then follows a fluid path to a one way valve 112 which prohibits the backflow of fluid toward or into the heater tank 111. After the one way valve 112, the hot fluid passes through three manifolds 113, orientated with one in series and two in parallel, a fluid flow meter, and a 3-way normally open solenoid valve 115. At this point the hot fluid is diverted to a fluid path connected to the dispensing nozzle 116 or to a fluid path connected to a drain line 117. Another implementation may include one or more fluid paths which the hot fluid would follow directly and/or indirectly to the dispensing nozzle and/or drain. Yet another implementation may include means necessary to guide hot fluids from a source to a destination in the fluid system resulting in the dispensing and/or draining of said fluid.

Fluid may also enter a fluid treatment apparatus 118 which possesses the ability to cool and/or carbonate incoming fluid. This vending machine also possesses the ability to cool one or multiple incoming fluids all of which pass through unique fluid paths. Other implementations may include one or more apparatuses to effectuate the cooling and/or carbonating of fluid in the invention.

Fluid paths exiting the vending machine, such as a path dedicated to chilled fluid flow through a one way valve 112 to prevent backflow, and then to a dedicated solenoid valve 124 located on a manifold 113 may be incorporated. Each fluid path then follows a path similar to that of the hot fluid after entering a manifold.

Drain valves may be utilized to ensure the ability to drain fluid held by the present invention. Valves may be of a myriad of designs including but not limited to shut-off valves and solenoid valves. FIG. 1 illustrates an implementation of drain valves with a main line drain valve 129, a hot tank drain valve 130, a carbonated fluid drain valve 131, and an ice bath drain valve 132. Also an ice bath overflow fluid path or drain line 133 could be utilized to maintain an optimal fluid level in said ice bath as a component of the chiller 118.

The temperature of the chilled product may range from about 60.degree. F. to 32.degree. F. For example, fluid may enter a combination water chiller, carbonator, and syrup chiller designed for soda-fountain style machines 118. Fluid exiting from the chilled water path then follows a path connected to a one way valve 124 and then to a normally closed solenoid valve located on a manifold. When the solenoid is activated, the chilled water flows through the manifolds 113, flow meter 114, and 3-way solenoid 115 directly to dispense. Other implementations may incorporate the use of one or more fluid paths and/or valves to control the flow of fluid from a fluid treatment device such as a water chiller and effectuate the dispense or disposal of said fluid. Carbonated fluid exiting the fluid treatment apparatus may follow a fluid path directly or indirectly connected to the dispense nozzle and the fluid path may be regulated by a device such as a needle valve 134 or through the use of an inline compensator or similar device. In another example, syrup may traverse a syrup chilling line and flow through a manifold 113, flow meter 114, and 3-way solenoid 115 to a dispensing nozzle.

One implementation utilizes a pressurized carbon dioxide ($CO_2$) tank 119 with outlet pressure regulated to supply a combination chiller/carbonator 118, product pump 120, and direct line with $CO_2$ gas. Other implementations may incorporate various other components requiring pressurized gas for pneumatic actuation, carbonation, direct use, and/or other applications requiring pressurized gas.

Gas entering a product pump 120 effectuates the operation of the pump and the flow of the product through a fluid path which bisects the product pump 120. For example, $CO_2$ gas actuates a pneumatic turbine pump which delivers positive pressure to incoming fluid thus causing the fluid to traverse an outflow fluid path. $CO_2$ gas may also follow a fluid path terminating at a one way valve 112 connected to a dedicated, normally closed, solenoid valve on a manifold 113. The flow through the fluid path may be regulated by a component such as a needle valve 135. The path then continues along a route similar to the chilled fluid as described previously. In other implementations gas may follow various routes terminating at a flow controlling component, such as a solenoid valve, pneumatic valve and/or mechanical valve effectuating the dispense or disposal of the gas. In other implementation, $CO_2$ gas may enter a carbonation tank under pressure where it dissolves into the co-occupying fluid.

Pneumatically driven product pumps 120 may effectuate the transmission of product fluid from one or more containers to dispense or disposal along a fluid path similar to the chilled fluid as described previously. Alternative implementations may utilize other means for the transmission of product fluid to dispense or disposal via one or more fluid transmission methods such as electric pumps, pneumatic pumps, positive displacement pumps, hydraulic pumps, positive head, and any combination or isolated use thereof.

One implementation may utilize a combination of solenoid manifolds 113 to control the flow of fluid from unique and separate inflow paths to a common outflow path. For example, a six line manifold may contain six normally closed solenoid valves, each preventing a given fluid from entering the manifold. When a given solenoid valve is energized, fluid that was previously blocked by the solenoid flows through the manifold. Multiple solenoid valves 112 may actuate during overlapping time intervals allowing one or more fluids to enter the manifold through unique fluid paths and depart through a common path. Other means may also be used to achieve the controlled flow of single and/or multiple fluids through a common exit may also be utilized.

In another implementation, the vending machine may utilize a normally open 3-way solenoid valve 115 to control the flow of fluid to the dispense nozzle 116. The solenoid functions such that all fluid passing through an inlet departs through one of two unique outlet paths. When the 3-way solenoid 115 is energized all fluid passing through an inlet departs through an outlet path connected to the dispense nozzle 116. Other implementations may utilize methods such as a normally closed solenoid or other means by which to control the dispensing of a fluid.

A sink 121 may be located beneath the dispense nozzle 116 to capture disposed fluid and channels said fluid to a drain 117. Other implementations may use various methods to capture disposed fluid and pass said fluid to a drain.

An ultra violet (UV) sanitization light 125 may be utilized to effectuate the sanitization of the sink, dispense nozzle and or the dispense area.

Fluids may be transmitted to disposal exit through a drain pipe 117. Other implementations may use methods such as a reservoir with a submersible pump to expel disposed fluid from the invention.

An inductive float switch 128 may detect the presence of fluid at the base of the invention. Other implementations may use other fluid level sensing means.

A magnetic stripe card reader 122 may effectuate the transfer of funds from the consumer as payment for products delivered by the invention. For example, consumer approaches the invention and utilizes a VISA® credit card to purchase a beverage from the vending machine. Other means may also be used to effectuate a payment, such as a cash and coin machine or other payment accepting device.

A near field radio frequency identification (RFID) reader 123 may effectuate the recognition of a known customer and enable the invention to respond to that customer in a personalized manner. For example, a customer approaches the machine and presents an RFID tag to the reader 123 which accepts an identification number from the customer's tag and transmits the information to a program which retrieves and utilizes information associated with the customer's identification number. The RFID tag may be a proximity card, a passive RFID tag, an active RFID tag, a Near Field Communications device, or any other RFID technology and/or frequency communication device suitable for effectuating the recognition of a known customer and enable the invention to respond to that customer in a personalized manner. Other implementations may use methods such as a user name, password, magnetic stripe card, smart card, and/or any similar method to effectuate the identification of known customers.

Single or multiple LED lights 126 may be used to illuminate a beverage container located below the dispense nozzle 116 and or for the purpose of illumination in the area where fluid is dispensed.

A camera 127 may be used to capture images of the path of fluid out of the dispense nozzle 116. The captured images may be still images and/or video images of the path of fluid out of the dispense nozzle 116.

Figure 4:
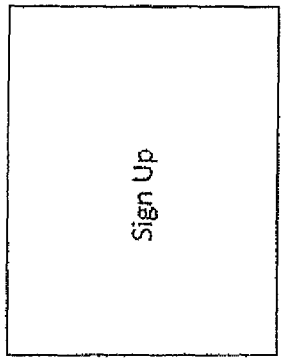
FIG. 4 is a depiction of an interface presented to the human agent to effectuate the dispense of a custom beverage.
Figure 4:
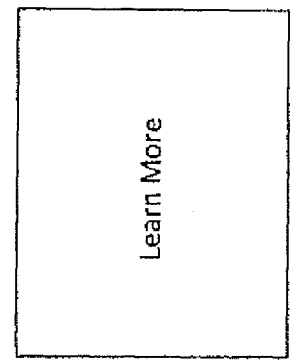
Figure 4:
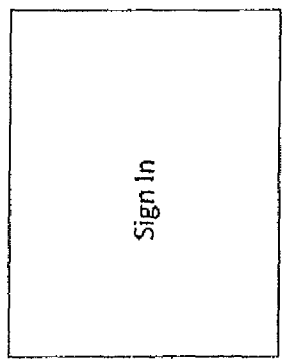
Figure 4:
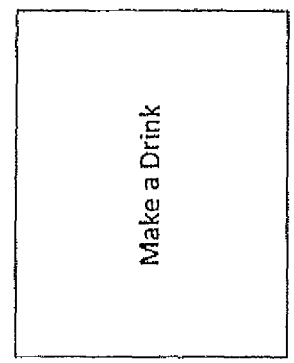

The beverage selection and customization process may utilize a touch screen display 100 to effectuate communication between the vending machine and a user. Such communication enables the user to directly control the composition of a dispensed beverage. For example, FIG. 4 exemplifies an initial display image that an implementation may utilize. The user's identity becomes known to the invention at a "sign in" event. Preceding this event, an implementation may display an image as shown in FIG. 5.

Figure 5:
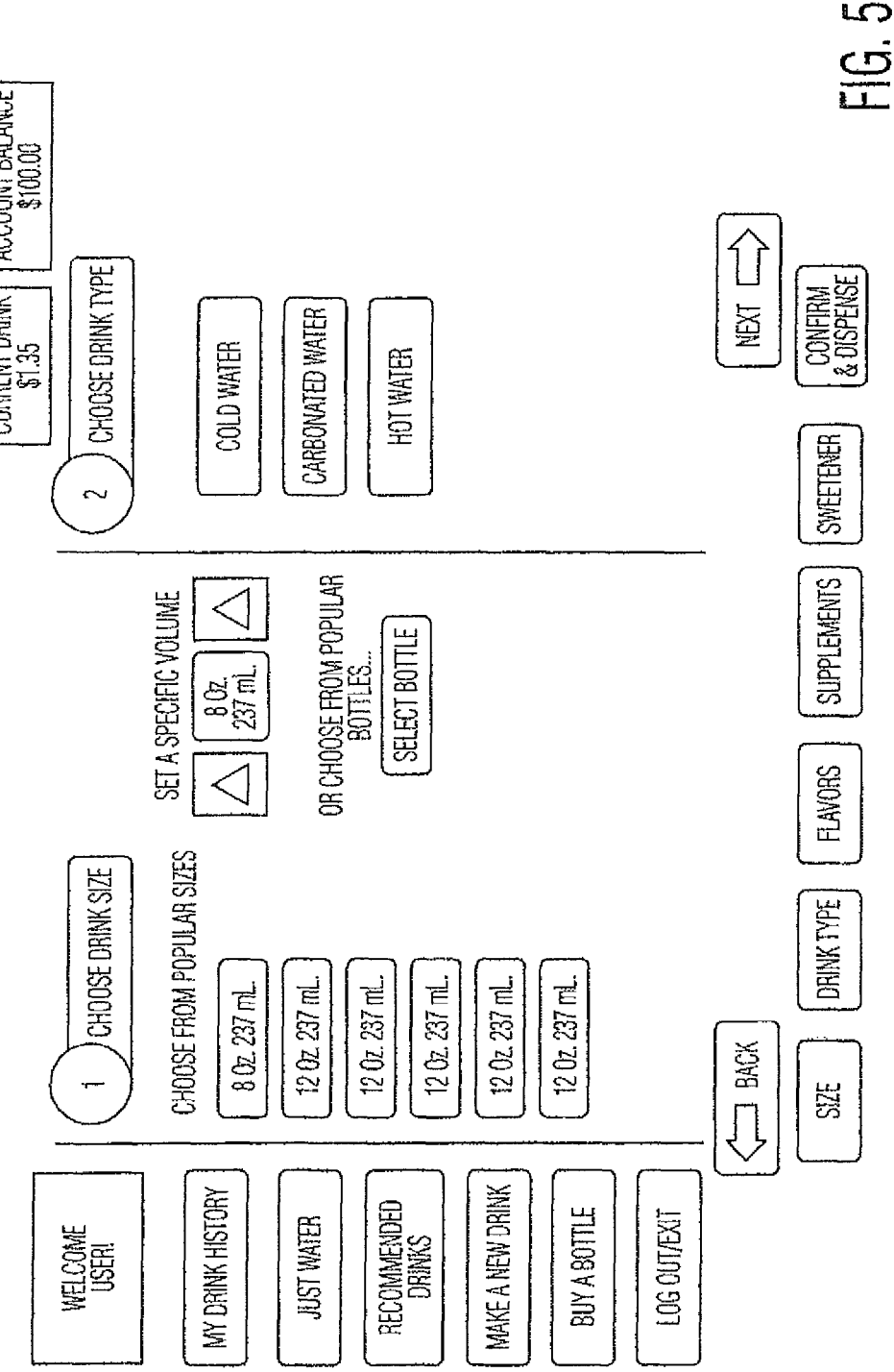
FIG. 5 is a depiction of an interface presented to the human agent to effectuate the dispense of a custom beverage.
Figure 6:
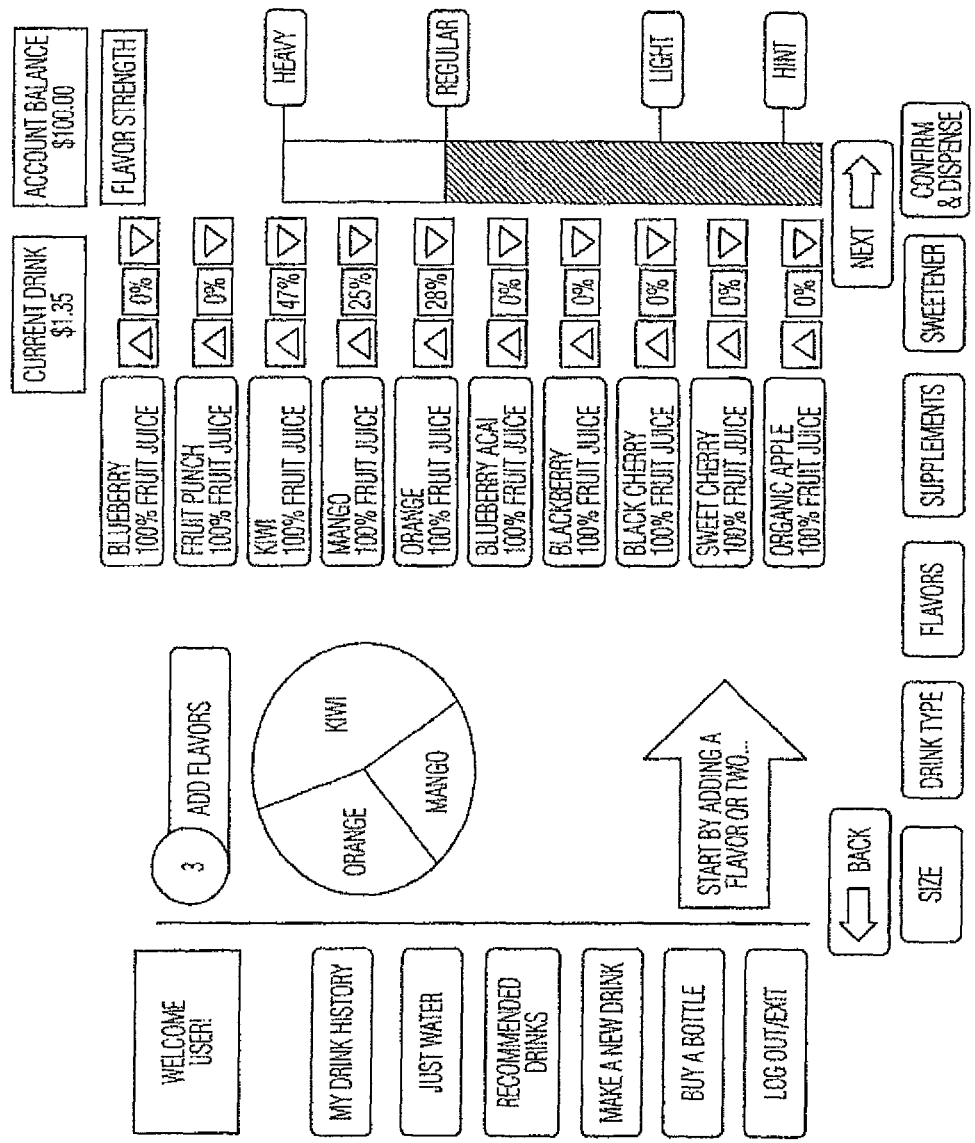
FIG. 6 is a depiction of an interface presented to the human agent to effectuate the dispense of a custom beverage.
Figure 7:
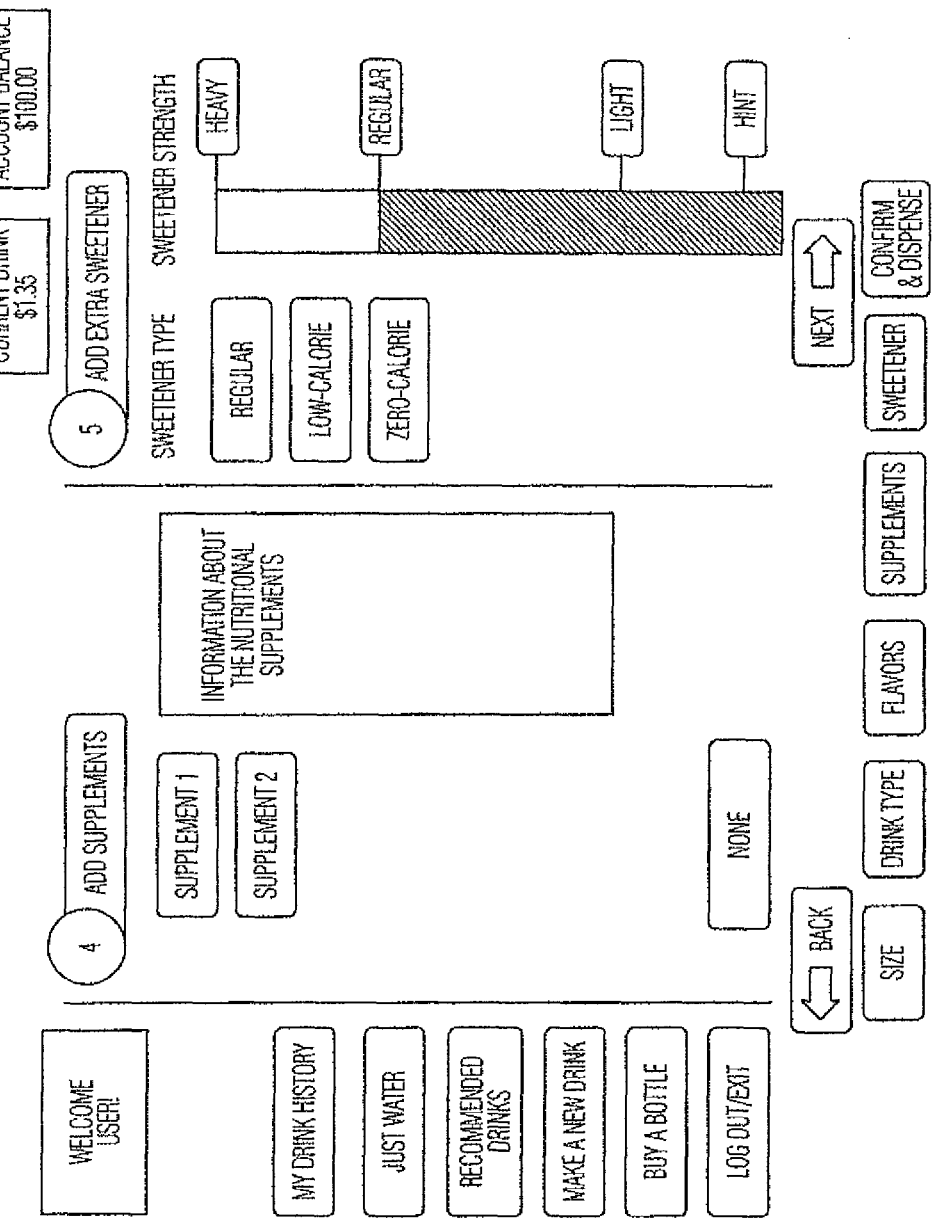
FIG. 7 is a depiction of an interface presented to the human agent to effectuate the dispense of a custom beverage.

An implementation may use display images such as shown in FIG. 4-9 for the beverage customization process. For example, a user utilizes a display image such as shown in FIG. 5 to select a desired drink volume. In one implementation, a beverage volume may range from about six fluid ounces to about sixty four fluid ounces or any similar volume related to a personal beverage container. The user then has option to select a main fluid type such as regular cold water, carbonated water, and hot water. However, other implementations may include main fluid types other than water such as a solution of water and ethanol alcohol. After that, a display screen, such as shown in FIG. 7, may be used to allow the user to select one or multiple supplemental fluids to add to the beverage. For example, the user selects kiwi, mango and orange fruit juice concentrates to be added to the custom beverage. The user then has the option to customize the ratio in which the supplemental fluids are added. The user may designate that the final combination of supplemental fluid contain 47% kiwi, 28% orange, and 25% mango fruit juice concentrates.

Other implementations may include similar but different means for the user to customize the specific supplemental fluid to be added. Other implementations may also include similar but different means for the user to customize the ratio in which the specific supplemental fluids are added. For example, a user may choose to create a beverage from multiple supplemental fluids at an infinite variety of ratios with the sum total equaling one or 100%. The arbitrary value of 100% may be associated with a value directly related to the user's desired flavor strength. If a user chooses five supplemental fluids at a flavor strength of "heavy," where heavy flavoring is known to be equal to one fluid ounce, then the five supplemental fluids may be combined at an infinite variety of ratios with the volume equal to a constant of one fluid ounce. Still other implementations may utilize means other than a total volume approach to enable a user to customize the mix ratios of supplemental fluids. Another implementation may be to set supplement volumes to static volumes or "shots." The shots may be of the same volume for an 8 oz drink and a 32 oz drink. A user may select one shot or more than one. Such other approaches may include setting the summation of supplemental fluid taste, viscosity, or other properties to meet the desire of the user.

After selecting supplemental fluids in a unique combination as per the user's desire, nutritional supplements may be added to the beverage through a display image as shown in FIG. 7. Nutritional supplements in liquid, powder, or other form may be added to the beverage or the total fluid volume dispensed in a fixed quantity, mass, or in a quantity proportional to a property of the beverage or the user's desire. For example, the user may choose a twenty fluid ounce beverage with a nutritional supplement. The total mass of supplement dispensed may be a fixed mass such as one gram. In another implementation, the mass of nutritional supplement may be proportional to the user's desired supplementation or proportional to the volume of the twenty ounce beverage. The user may also have the option of adding a sweetener to the custom beverage. The sweetener may consist of ingredients such as cane sugar, stevia, agave sugar, monk fruit extract, luo han guo or other sweeteners. These sweeteners may be added to the custom beverage in a manner similar to that described for supplements.

Figure 8:
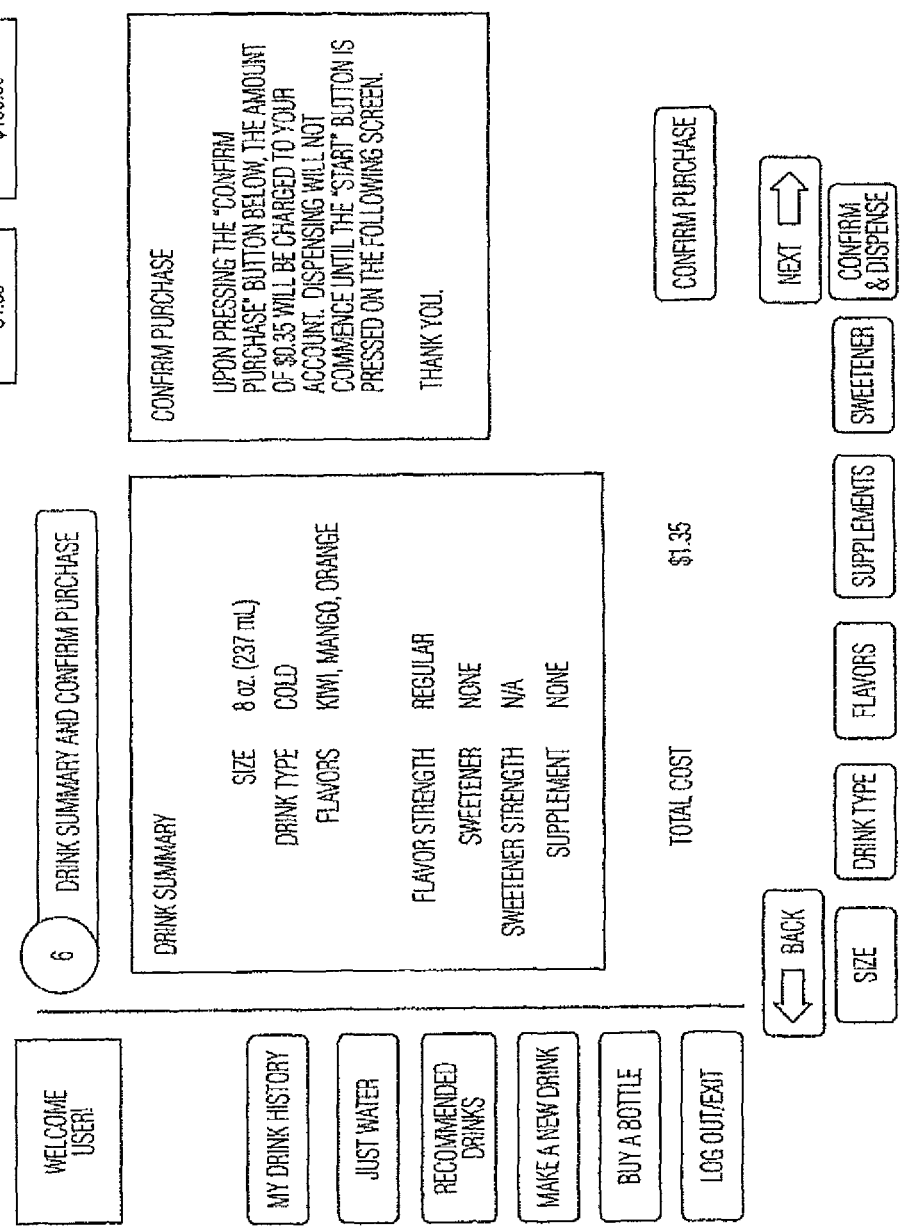
FIG. 8 is a depiction of an interface presented to the human agent to effectuate the dispense of a custom beverage.

The total mass of sweetener dispensed may be directly proportional to the beverage volume and the strength of sweetness desired by the user. Other implementations may include similar means to enable a user to customize the sweetness of a custom beverage. Other implementations may include similar means to enable a user to customize the calorie level of a custom beverage by varying the proportion of calorie and non-caloric sweeteners. The user may also be presented with a display image as shown in FIG. 8 that informs the user of the final composition of the customized beverage that the user created through the drink customization process.

Figure 9:
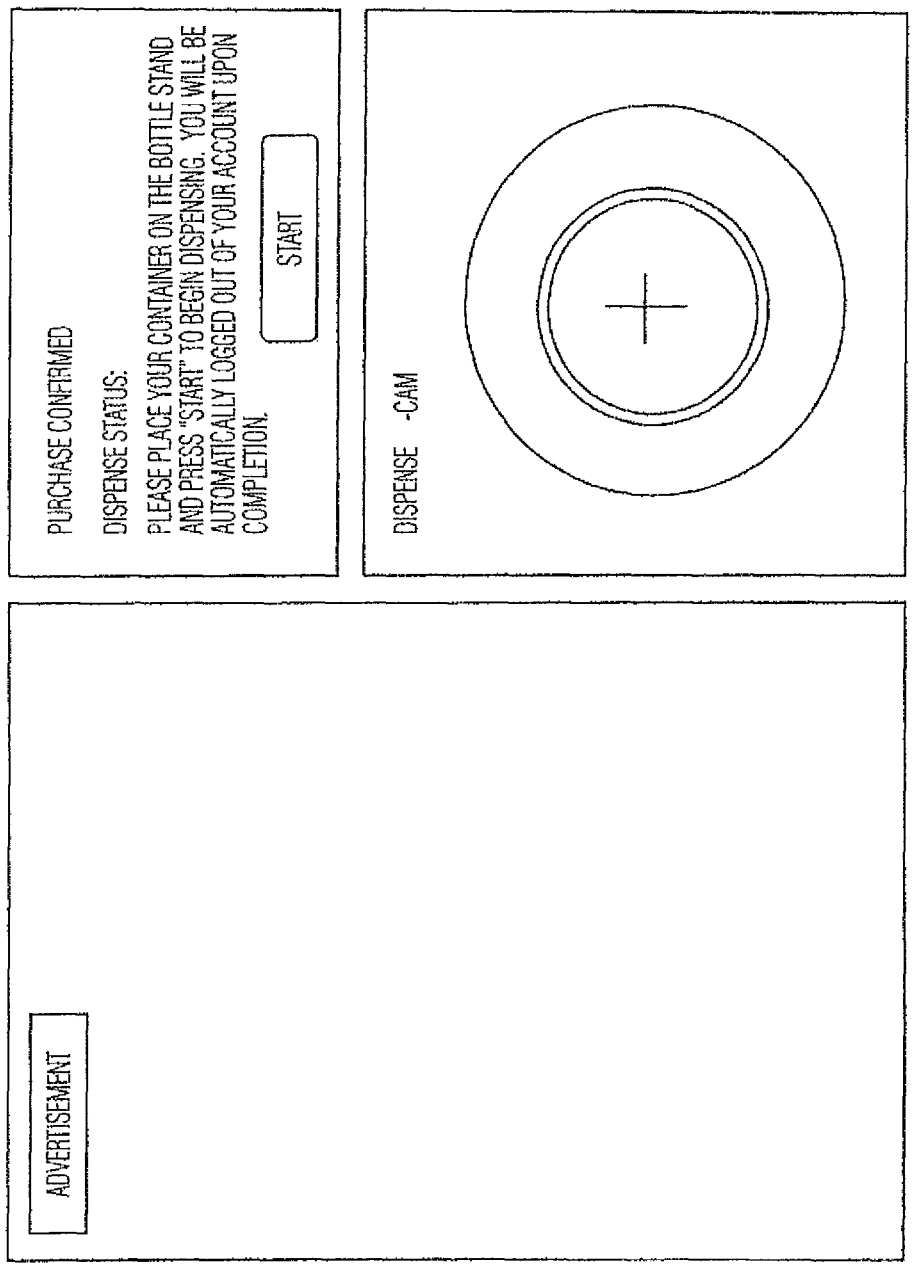
FIG. 9 is a depiction of an interface presented to the human agent to effectuate the dispense of a custom beverage.

At this point in the beverage customization process, the user has the option to confirm the purchase and/or final composition of the custom beverage. The user may also be presented with a display screen, as shown in FIG. 9, that presents various information to the user. This information may include advertisements which are presented to the user. These advertisements may be generic and/or targeted to the specific user. The display screen may also present social media interaction options. For example, users may choose to share their drink with their friends as their Facebook® status. Also, the final screen may allow the user to initiate the vending by pressing a button or through similar means of actuation.

A cleaning cycle may be utilized to ensure proper sanitization and performance. In one implementation, the vending machine may utilize an automated cycle to effectuate the cleaning and sterilization of one or more fluid paths. This cleaning may be effectuated by the circulation of hot water with a temperature of approximately 190.degree. F. and/or a sanitizing fluid such as a bleach solution through one or more of the fluid paths. Another implementation may utilize ozone gas (O.sub.3) to effectuate the sanitization of one or more fluid paths. Other implementations may utilize a similar cleaning cycle effectuated through manual means rather than automated. Also, various methods for determining the necessity of cleaning and sanitization may be incorporated in an implementation to initiate a cleaning cycle. Such methods may include the use of a flow characterization sensor to sense a change in the flow indicative of the necessity for a cleaning cycle. However, other implementations may utilize methods dictating a time interval between cleaning cycles and/or a means for manual determination of the necessity of a cleaning cycle.

A computing device which includes a process and memory, such as random access memory (RAM), may be utilized. The computing device may be used in combination with other components of an implementation including, but not limited to, a controller and display device. The computing device may operate in combination with connected devices to effectuate the dispense of a customized beverage. The computing device may also perform actions according to software operating in the device.

A means to clean and sanitize components exposed to a user interacting with the vending machine for the purpose of beverage vending may also be included. All surfaces exposed to the user are easily sanitized and cleaned. More specifically, areas of the vending machine exposed to fluid through the beverage vending process, hereinafter called the dispense area, are regularly sanitized through a sanitization cycle. In one implementation, the cycle may include an ultra violet (UV) sanitization light 125 to effectuate the sanitization of the dispense area. Other implementations may utilize hot fluid, such as water, at a temperature of approximately 190.degree. F. and/or sanitization fluid such as a bleach solution to effectuate the cleaning of the dispense area. One implementation may activate a UV light after the vending cycle or at some other time for a period necessary to inhibit bacterial growth and that of potential pathogens in the dispense area. In another implementation, a surface in the dispense area may be immersed in sanitization solution to effectuate the removal of harmful bacteria from the dispense area.

A means to ensure the safe dispense of hot fluid where hot fluid is defined as fluid at a temperature of above 100.degree. F. may also be incorporated. The safe method reduces the risk of burn and/or other related injury to a user. In one implementation, such a safe method is effectuated through the use of a temperature sensor that measures, directly and/or indirectly, the surface temperature of a container. The method may include means to terminate dispense of hot fluid and/or lower the surface temperature in the event that the surface temperature of the container reaches or exceeds a temperature threshold. For example, a user places a metallic container in the dispense area and effectuates dispense of hot fluid. After fluid enters the container, a temperature sensor indicates that the surface temperature exceeds 100.degree. F. The present invention then halts dispense of hot fluid and dispenses cold fluid at a temperature of about 45.degree. F. until the temperature sensor indicates that the surface temperature is below the temperature threshold of approximately 100.degree. F, Other implementations may utilize similar but different methods of detecting unsafe temperature levels.

A method to determine the volume and/or size of a container into which fluid is dispensed may also be incorporated. One implementation utilizes an array of proximity sensors located in a pattern to allow for the computation and approximation of container size. For example, one implementation utilizes a various ultrasonic range finders may be arranged in a hemispherical pattern around the container bay to determine the dimensions of a container. An algorithm then transforms dimensional data received from the range finders and calculates approximate container volume. Other implementations may utilize means which determine or approximate container volume by measuring other properties, such as mass, without departing from the scope of the present invention.

A method to verify the presence of a container in the dispense area may also be incorporated. Such a method allows for the vending machine to terminate dispense of fluid in the event that there is no container present into which fluid will be dispensed. One implementation may use an ultrasonic range finder to verify the presence of an object in the dispense area. Other implementations may use various other means to verify the presence of a container into which fluid will be dispensed.

A method to encourage the alignment of a container opening and the dispensed fluid so as to ensure that dispensed fluid enters the container may be incorporated. One implementation utilizes dimensional sensors and a multi-dimensional actuator to position a dispense nozzle over and above the container opening. Other implementations may use various other methods including a combination of sensors and messages that inform the user of the status of alignment between the container opening and the dispense nozzle. Another implementation may present an image of the dispense nozzle and the container opening to a user and allow the user to effectuate dimensional adjustments to ensure the flow of dispensed fluid into the container.

A method to prevent the overfill or flow of fluid out of a container opening may be incorporated. Such an event may occur during the fluid dispense process. One implementation utilizes a dimensional sensor that measures the speed of fluid rise in a container. This implementation may then sense a change in speed of said fluid which may indicate that the container has reached maximum fluid capacity. For example, an ultrasonic range finder indicates that fluid is rising in a container at a velocity of V.sub.o. Then the sensor indicates that the current velocity, V.sub.c, of the fluid has decreased by a given factor, k, or V.sub.o=V.sub.c/k. This decrease in velocity further indicates, by implication, that the fluid is no longer rising in the container and has begun to flow out of the container opening.

A method to ensure that fluid passing through fluid paths as a component of a clean cycle does not enter a container located below a dispense nozzle may be incorporated. One implementation effectuates this method by incorporating a multi-directional valve which is connected to a drain and to a dispense nozzle. In the event of a clean cycle, the multi-directional nozzle is positioned to ensure that fluid does not flow into the dispense nozzle and instead flows into a drain or re-circulation loop that is part of the clean cycle. For example, before dispensing fluid, a fluid path is filled with hot water at a temperature of approximately 190.degree. F. The fluid path is connected to a normally closed 3-way solenoid valve which controls the flow of fluid either to a dispense nozzle or to the drain. The 3-way solenoid is de-energized and thus all hot fluid entering said valve passes to a fluid path connected to the drain. This ensures that hot fluid does not enter a dispense nozzle. Other implementations may utilize other types of valves or methods to effectuate this method.

A method to store information on a customer identification device may also be incorporated. In one implementation, the device is a customer's near field radio frequency identification (RFID) tag. In other implementations the device may present itself as a personal communication or entertainment device such as an MP3 player or cell phone. Still other implementations may utilize various other devices capable of passing and storing information.

In one implementation, information containing information specific to the owner of the device is sent from the vending machine to the device for storage. This information is then stored for later use by a user and/or the vending machine. For example, a customer possesses an RFID tag which stores information pertaining to the customer's account balance and beverage preferences. In the event that the customer utilizes the RFID device to identify himself to the vending machine, the information previously described is passed to the vending machine. The information is then utilized to effectuate the personalization and/or beverage vending experience of the customer. Other implementations may utilize stored information for other purposes relating to the customer experience.

A method which enables customers to create or modify an aspect of their account and/or view information pertaining to the vending machine through electronic means may be incorporated. In one implementation, this is effectuated through the utilization of an electronic application such as an iPhone® application, Android® application and/or other electronic application. For example, a customer uses an iPhone® application to create a custom beverage and add it to his account. The next time this customer identifies himself to an implementation, he may be given the option of dispensing the beverage created on the application. In another example, a customer utilizes an iPhone® application to view locations of the vending machines near that specific customer's location. Other implementations may utilize various other electronic means to effectuate this method. Such other electronic means may include a web site, a social media outlet (e.g., Facebook®) or other information conduit.

A method to present advertisements to one or more users within a given proximity may also be incorporated. The advertisements may be tailored to a specific user and/or intended for a general audience.

A method to store customer information in a database may also be incorporated. The database may be utilized by various implementations of the vending machine to share and retain information pertaining to a customer, beverage components, location and various other information that are utilized to effectuate the beverage customization, vending process, and/or customer experience. For example, a database contains information pertaining to volumes of beverage ingredients to ensure that the ingredients are replaced before they empty. In another implementation, the database contains information pertaining to an individual customer's name, beverage history, beverage preferences, affiliations, age, gender, location and other personal attributes. This information is passed from the database to an implementation in the event that a customer identifies himself. The information may be utilized to customize the customer experience and present the customer with known preferences.

Figure 10:
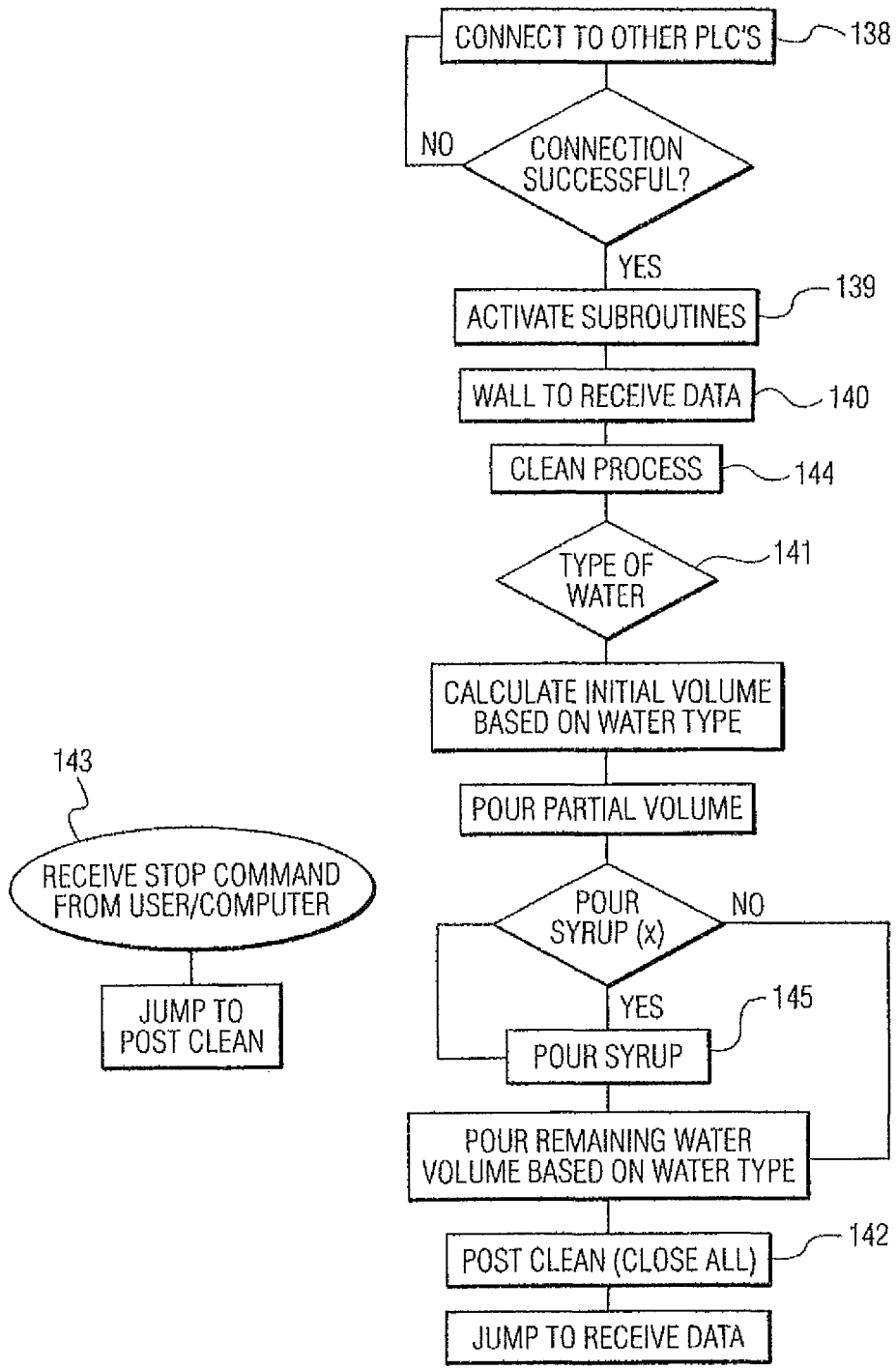
FIG. 10 is a flow chart depicting the control process relating to beverage vending in an implementation.

FIG. 10 illustrates a process through which a controller may effectuate the dispense of a customized beverage. In an implementation, the process initializes upon the establishment of communication between all controlling devices 138. The process continues with the confirmation of successful communion. If successful, the process continues and controller subroutines are activated 139. Following this, the controller waits to receive data encompassing the information necessary to dispense a beverage 140. When the information is received, the clean process 144 performs a predetermined cleaning algorithm which may include the use of hot water to clean lines before dispense. The type of water 141 desired is selected and appropriate dispense volumes are calculated. Then a ratio of the total beverage volume is dispensed and a process determines whether or not syrup was requested. If syrup was requested a pour syrup 145 algorithm controls the dispense of the desired volume of single or multiple syrups. If syrup was not requested or upon completion of the pour syrup process 145, the remaining beverage volume is dispensed. Following this event the post clean 142 process performs a cleaning algorithm to clean fluid paths and the controller or controllers wait to receive the data necessary to dispense another beverage. At any point in the process described above, a stop command 143 may interrupt the process immediately moving said process to the post clean 142 event.

Figure 2:
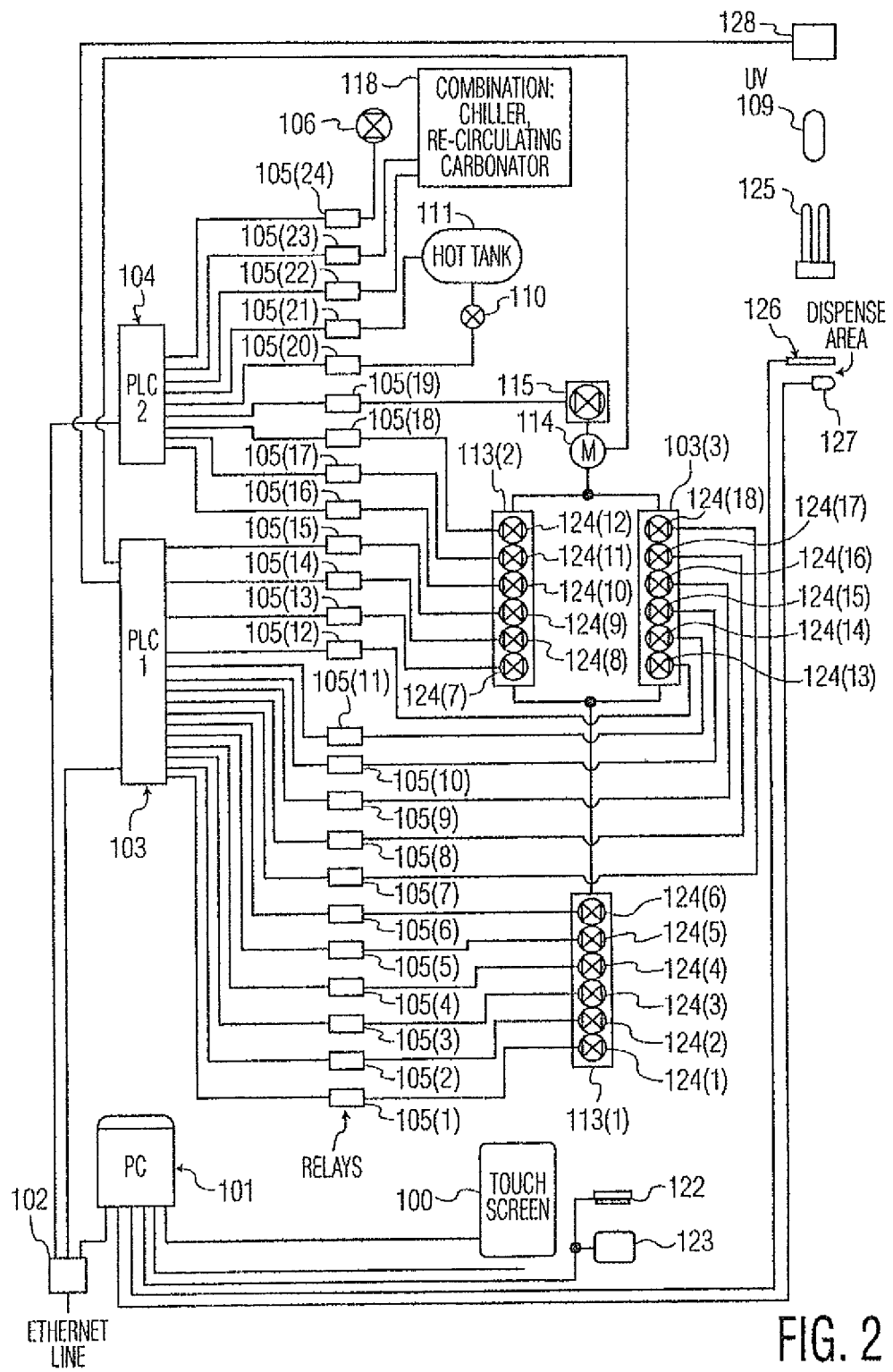
FIG. 2 is a schematic of an implementation of the electrical system in the vending machine apparatus.
Figure 3:
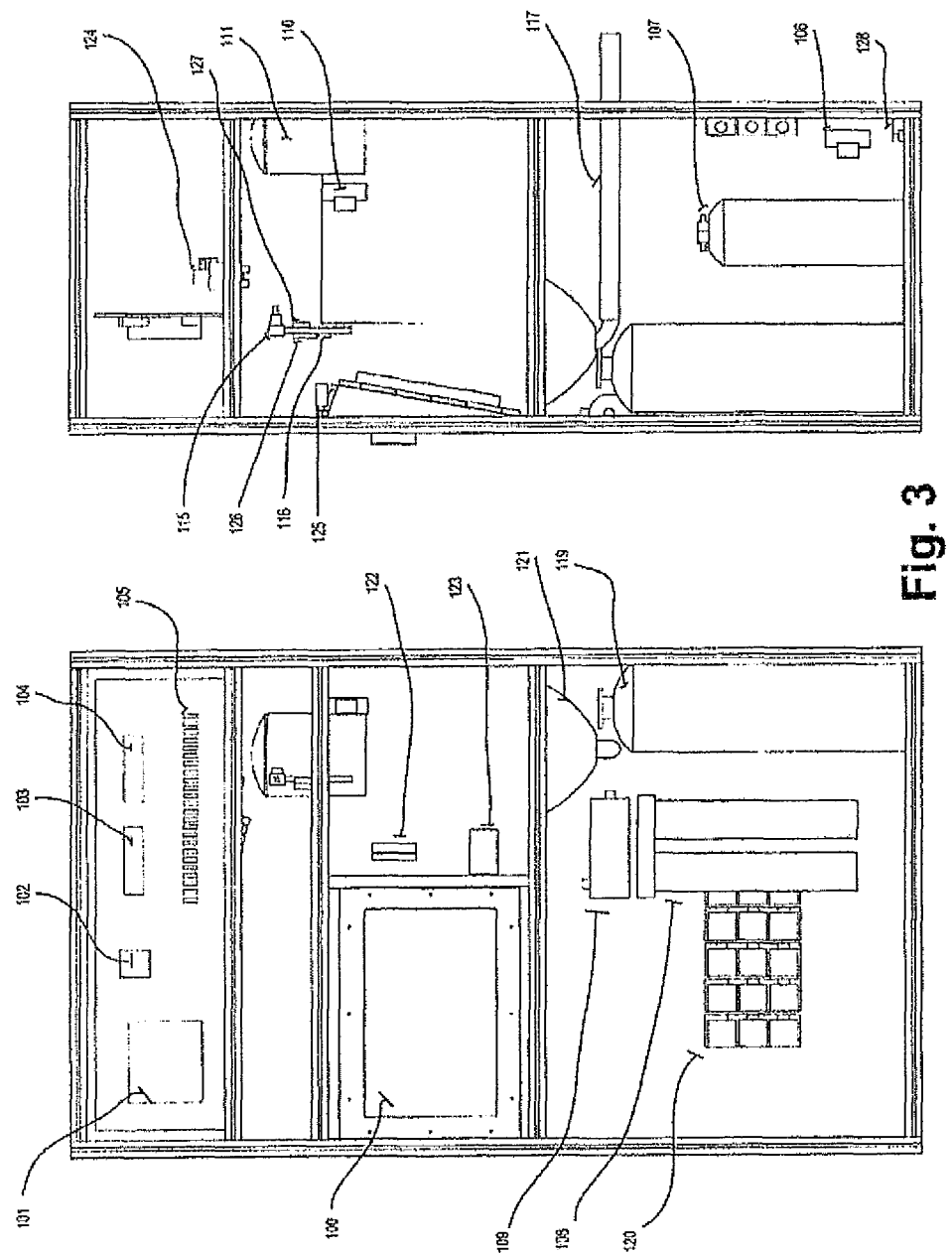
FIG. 3 is a depiction of an implementation showing the locations of components in the vending machine apparatus.
Figure 11:
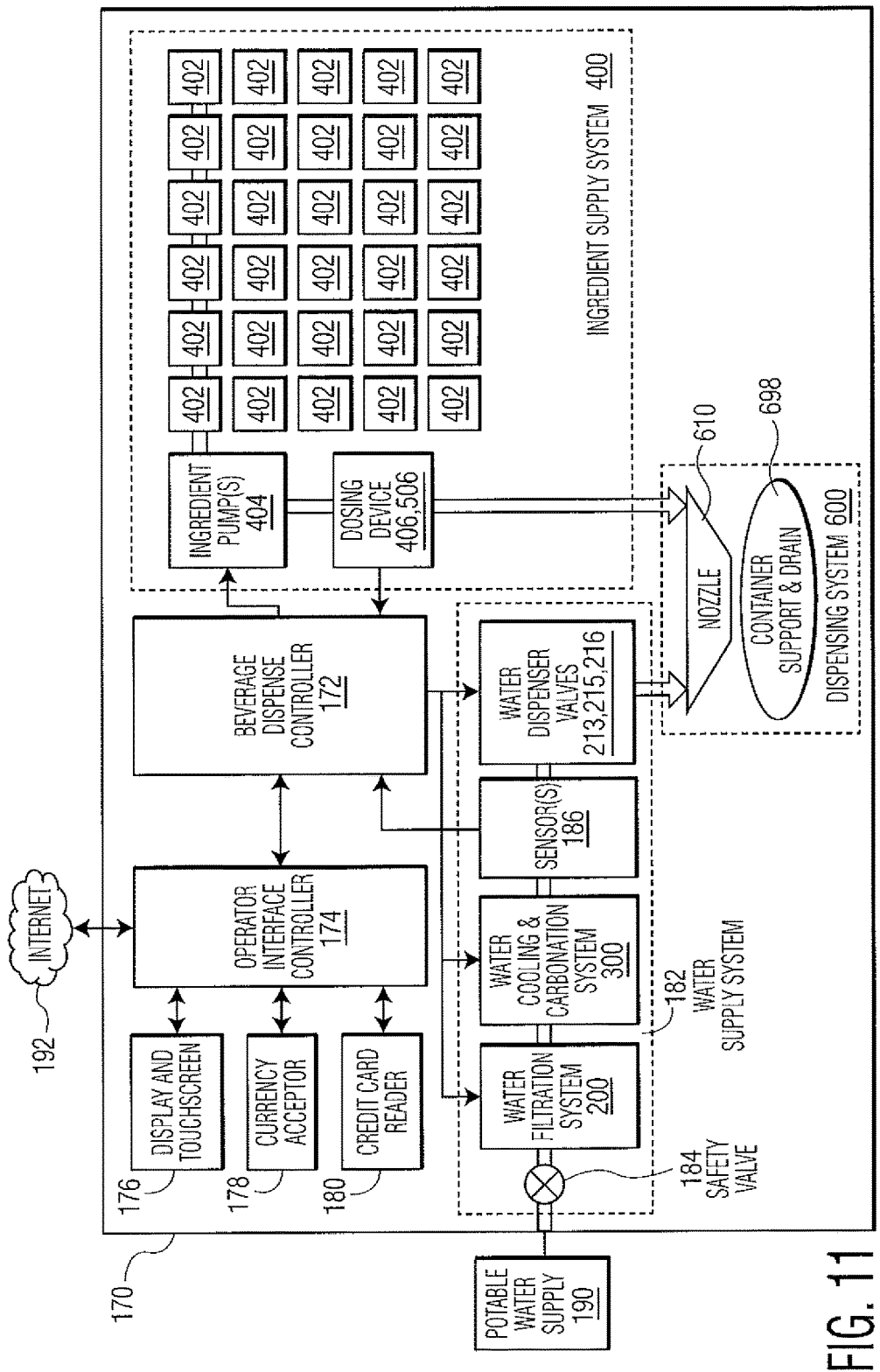
FIG. 11 is a schematic of an implementation of a plumbing system in a beverage dispensing system.

In an implementation, as shown in FIG. 11, a beverage dispensing system 170 may include a water supply system 182, ingredient supply system 400, dispensing system 600, a beverage dispense controller 172 (referred to generally as controller 172), an operator interface 174 and a display and touchscreen 176. In some examples, beverage dispensing system 170 may include a credit card reader 180 and/or a currency acceptor 178. In some examples, operator interface controller 174 may access a remote database via a network connection (such as Internet 192) to vend a requested drink recipe, as discussed above. Credit card reader 180 may be a magnetic strip card reader, such as reader 122 (FIG. 2) and/or an RFID reader, such as reader 123 (FIG. 2). Controller 172 may include one or more processors, microprocessors coupled to one or more non-transitory memory devices (such as PC 101 shown in FIG. 2 and described above) and adapted to perform the functions described herein. In an implementation, the beverage dispensing system may contain one or more of any desired ingredients. The ingredients may include, but are not limited to: multiple types of real (or artificial) fruit syrup concentrates, regular, low and no calorie sweeteners, real (or artificial) fruit extracts, real (or artificial) herb extracts, natural (or artificial) flavor ingredients, coffees, teas, cocoa, chocolate, dairy based products, such as milk or cream, non-dairy products, such as soy milk or almond milk, vegetables, such as juices or powders or purees, multiple types of flavored nutritional supplements, and multiple types of nutritional supplements. In certain implementations, the one or more ingredients may include an alcohol, such as an ethanol (i.e., ethyl alcohol), or any alcoholic or "adult" related beverages or products, such as, for illustration and without limitation, any type of alcohol based spirits, wines, or beers. In certain implementations, the beverage dispensing system may produce the equivalent of shots, mixed drinks, cocktails, sangria, spiked beverages or the like according to user preferences. In certain implementations, the beverage dispensing system may be located in restricted areas or special locations where only adults are present, such as bar establishments, or may require proof of legal age to consume alcoholic beverages before alcohol will be dispensed, such as via an input or reader of a user's driver's license or other similar authorization process.

In general, a user may use display and touchscreen 176 to select one or more user preferences for a customized beverage, that may be communicated through operator interface controller 174 to controller 172. Responsive to the user input, controller 172 may control the water supply system 182, ingredient supply system 400, and dispensing system 600 to deliver a custom, health and natural beverage to a container.

Next, water supply system 182 is described. In an implementation, the water supply system 182 may include a safety valve 184, a water filtration system 200, a water cooling and carbonation system 300, one or more sensors 186, and one or more water dispenser valves 213, 215, 216. Water from a potable water supply 190 is passed to filtration system 200, via safety valve 184, which purifies the water. Next, the purified water is passed through water cooling and carbonation system 300, which generates chilled carbonated (i.e., sparkling) water and chilled (non-carbonated) water. The carbonated and chilled water are directed through respective valves 213, 215, 216 to form high flow chilled carbonated water, high flow chilled water and low flow chilled water (described further below) to dispensing system 600. The one or more sensors 186 may be of any type useful for monitoring flowing liquids, such as, without being limited to, flowmeters, thermometers, pressure sensors or rheometers.

Figure 12:
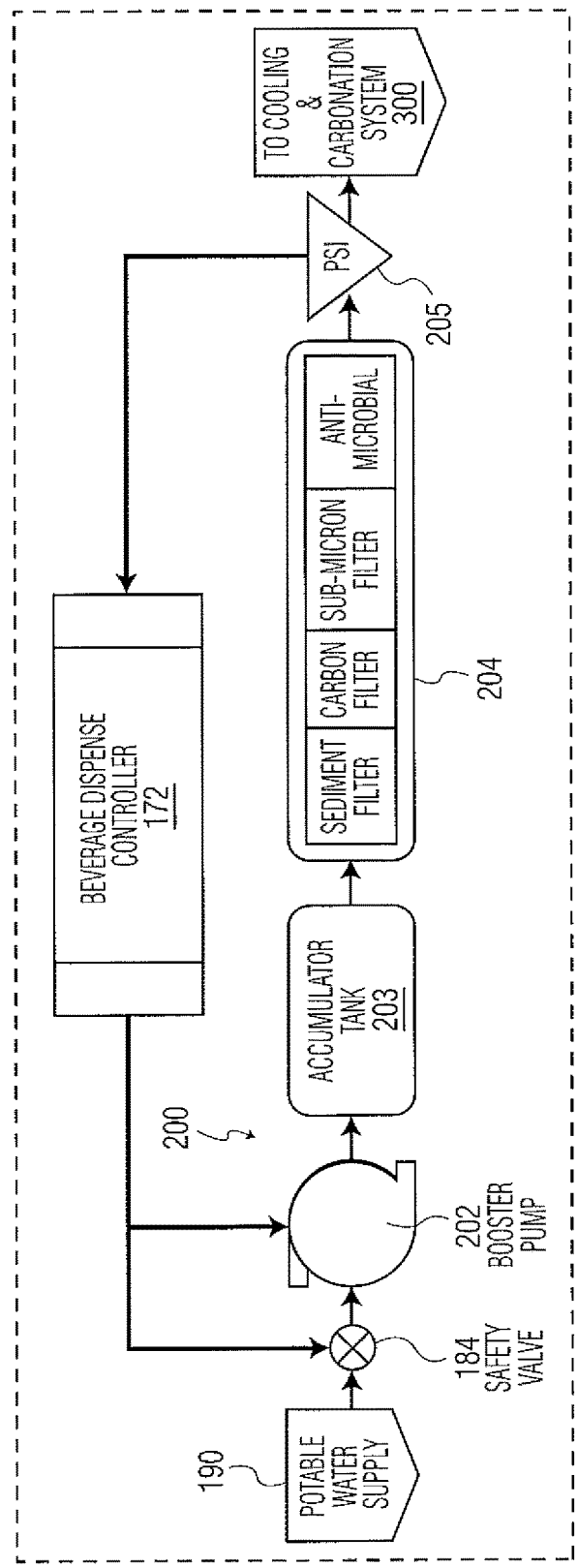
FIG. 12 is a schematic of an implementation of a water filtration system in the beverage dispensing system.

Water filtration system 200 is described further below with respect to FIG. 12. In an implementation, the water supply system 182 may be an ingredient-quality water system capable of operating in a vending environment. Potable water supply quality, and the conditions under which potable water supply 190 operates, may vary greatly. Some potable water supplies may have adequate static water pressure, but the flowing water pressure available can vary widely, with daily or hourly changes. Also, the aesthetic quality of potable water supplies varies widely, with many imparting undesirable tastes and odors. It is desirable to properly treat potable water supplies to address the aesthetic and operational challenges faced across all beverage dispensing system installations in an efficient and cost effective manner.

Multi-stage filtration systems are known that provide acceptable, aesthetically pleasing, ingredient quality water. However, these systems may cause a significant amount of water pressure loss, reducing the pressure and capacity of the water supply to dispense ingredient-quality water.

Booster pumps are known to be used to overcome the problem of deficient water pressure. A diaphragm style booster pump is typically used because it is relatively quiet during operation, and it can survive repeatedly being subjected to water supply conditions where the flowing water pressure is near zero. It is known to couple a booster pump with an accumulator storage tank and mechanical controller to hold a reserve supply of water at an elevated pressure, to overcome the pressure loss often associated with higher performance filtration systems. However, the higher water pressures and the normal operating range of cut-in and cut-out pressures of mechanically controlled booster systems may cause new problems. A mechanical controller typically includes hysteresis so that the pump does not short-cycle (i.e., repeatedly turn on and off in very short time intervals), as short-cycling can cause premature failure of the booster pump. As a result, the mechanical controller has a wide range of differential pressure between the cut-in and cut-out pressure values. This wide range of differential pressure may lead to wide variation in water operating pressure. Accordingly, it becomes necessary to add pressure reducing regulators downstream of the mechanically controlled filtration system components, in order to lower pressures to a normal working range. When a carbonation system is included in a system design, a separate carbonator pump is typically added to increase the water pressures in order to overcome the $CO_2$ gas pressure used by the carbonator to refill a carbonator tank.

The water filtration system 200 of beverage dispensing system 170 may include a booster pump 202, an accumulator tank 203, at least one filter 204 and a pressure sensor 205. Pressure sensor 205 may measure the water pressure exiting filter 204 to monitor the capacity of the filter 204. The same pressure sensor 205 may also be used to monitor and control booster pump 202 to provide more efficient operation of the water system.

Water filtration system 200 may connect to a potable water supply 190, safety valve 184 and controller 172. Controller 172, among other functions, may directly manage the dispensing operations of the beverage dispensing system 172 and monitor water pressure. Booster pump 202 may be controlled to vary the range of cut-in and cut-out pressures depending upon the needs of the water supply system 182.

When dispensing plain (i.e., non-carbonated) water, the flow rate is typically adequate with low pressure water from booster pump 202. However, when carbonator tank 320 requires refilling, the controller 172 can operate the booster pump 202 to increase the water pressure to properly refill the carbonator tank 320 and then decrease the water pressure to a lower pressure when that task is completed.

Further, the controller 172 can provide even more efficient operation by controlling the speed of booster pump 202 during operation to maintain more constant flowing water pressures to match the current operational requirements, which further reduces power consumption. The controller 172 may use the pressure sensor 205 present at the outlet of filter 204 to run the booster pump 202 more efficiently, as controller 172 also controls all other ingredient-quality water system 200 functions. Therefore, controller 172 may control booster pump 202 more efficiently than prior art mechanical controllers, which have no operational knowledge of water flow rates and required pressures.

Further, controller 172 can change the pressure values contingent on current functional demands. For example, refilling a carbonator tank typically uses much higher water pressures than does normal dispensing of plain water. The controller 172 may raise the water pressure during carbonator tank 320 refilling to more effectively aid the carbonation process, and then lower the water pressure to a lower range for normal plain water dispensing.

Illustratively, the water pressure needed to properly refill the carbonator is dependent on $CO_2$ gas pressure set to achieve the desired level of carbonation (measured as volumes of $CO_2$ absorbed). With a $CO_2$ pressure regulator connected to the carbonator tank 320 set at, for example, 50 PSI, a minimum of 85 PSI water pressure may be used to provide minimum refill performance. Water pressure used for the beverage dispenser to effectively dispense both high-flow and low-flow (rate) plain water may be, for example, 75 PSI. Pressure above about 90 PSI may cause the low-flow rinsing function (described below with respect to dispensing system 600) to dispense water at a rate higher than desirable. Controller 172 may use motor speed control to more closely match booster pump 202 output flow to the present water needs of the dispensing system. This reduces the high-pressure cycling, and allows for more even operation of the ingredient-quality water filtration system 200 while putting less physical stress on the water filtration system 200 components and reducing power consumption of the booster pump 202 motor.

Filter 204 may be a single stage filter or may include various stages, such as a sediment filter, a carbon filter, a sub-micron filter, an anti-microbial filter, or any combination thereof. The various stages may include a single multi-stage filter, or separate single-stage filters.

The examples and drawings of the present disclosure illustrate chilled and room temperature water ingredients for clarity. The beverage dispensing system 170 may also include, not shown, a heater tank (such as heater tank 111) and associated control system for dispensing a hot water ingredient, as described above. The heater tank may couple to the water filtration system 200 after pressure sensor 205 and couple to the dispensing system 600 via an outlet tube 630. Accordingly, in some implementations, the beverage dispensing system 170 user input may include selection of one or more water choices comprising a temperature range from cold to hot.

Figure 13B:
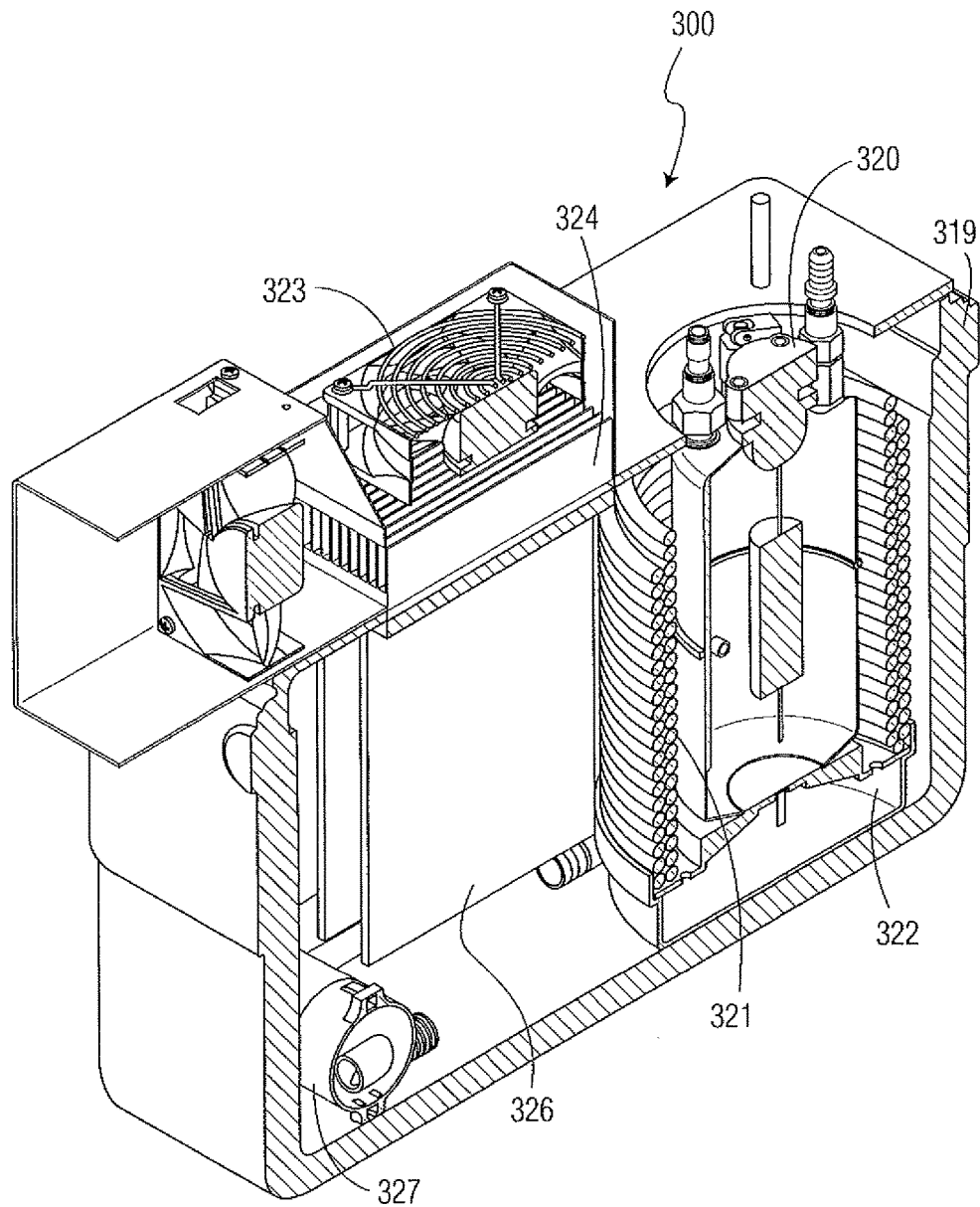
Figure 14A:
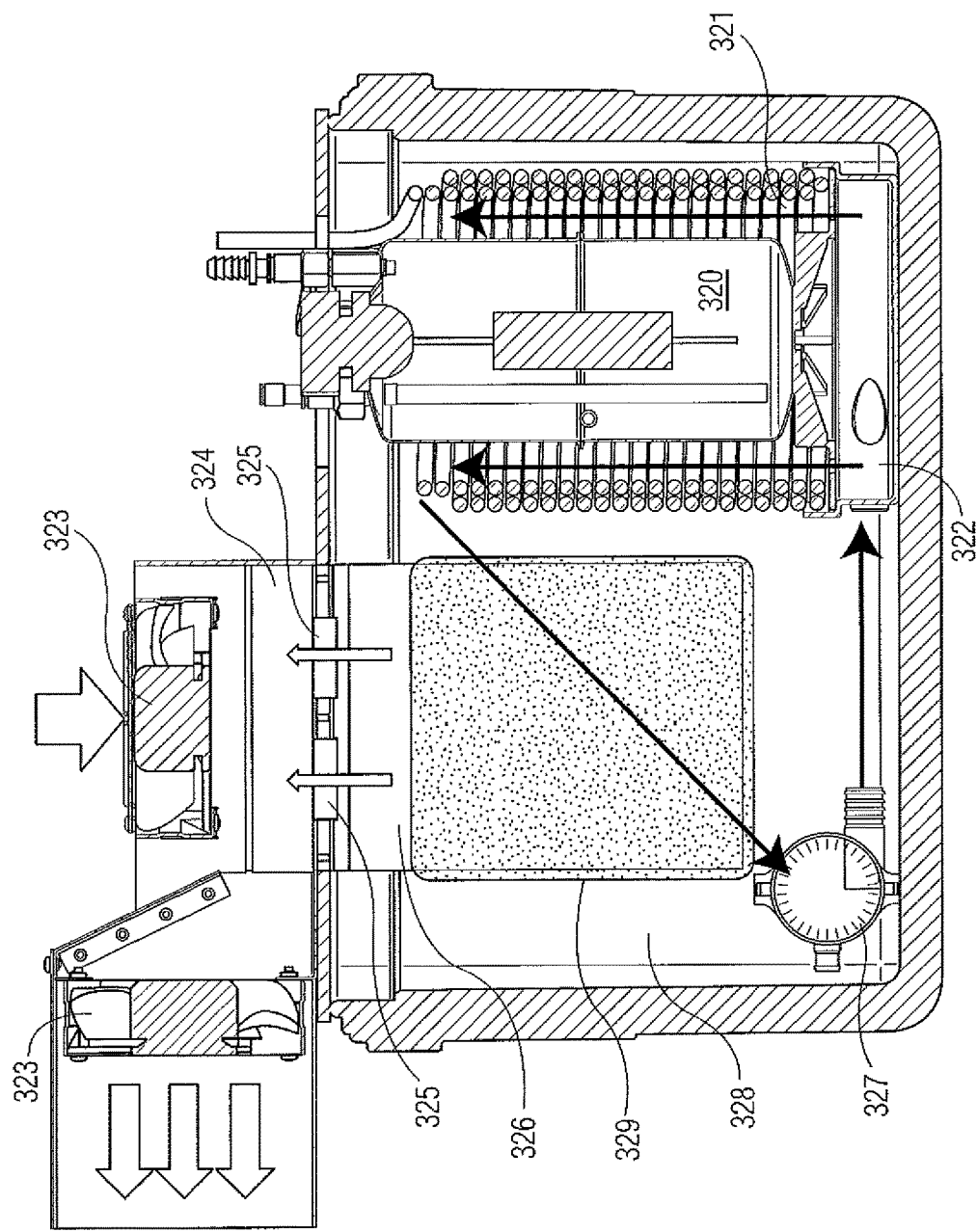
FIGS. 14A and 14B are cross-sectional depictions of an implementation of the thermoelectric water cooling and carbonation system showing water flow in the water bath and an ice-bank reserve.
Figure 14B:
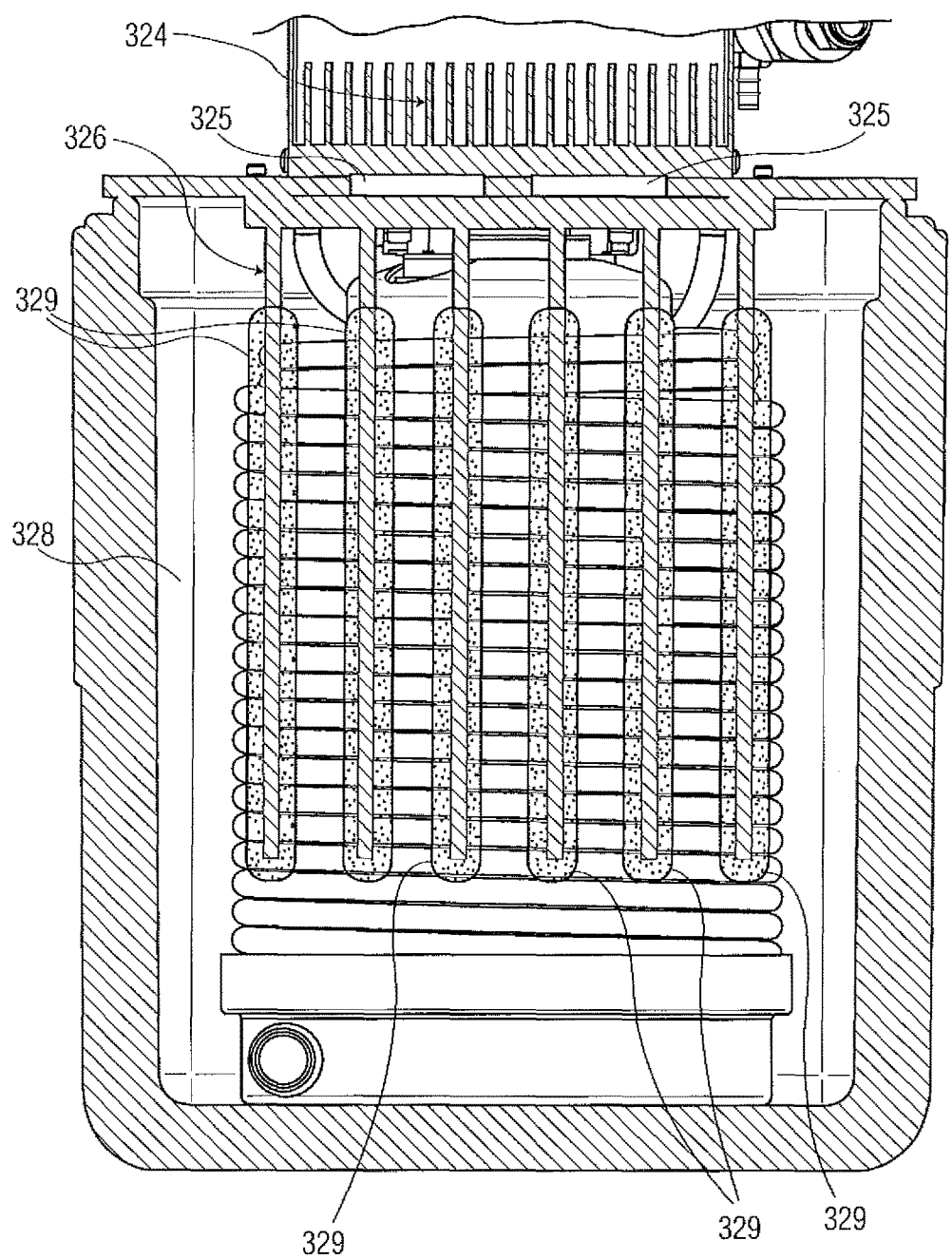

Next, water cooling and carbonation system 300 is described according to an implementation shown at FIGS. 13A and 13B and FIGS. 14A-14C. Beverages produced by the beverage dispensing system 170 may be cooled (i.e., chilled) using a thermoelectric cooling (TEC) device. FIG. 13A is a perspective view diagram of system 300, FIGS. 13B and 14 are a cross-sectional views of system 300 along lines 13B-13B. FIG. 14B is another cross-section diagram of system 300 illustrating ice bank reserve 329 on cold plates 326.

It is known to use fractional-horsepower vapor-compressive systems which use a man-made chemical refrigerant to provide the cooling needed for beverage vending. However, vapor-compressive systems suffer from issues related to noise, reliability, electrical power, and environmentally challenged refrigerant-based systems. Either the design of cooling systems must be ultra-reliable so they do not need servicing or the design must make provisions for easy field swapping of failed units so they are not required to be repaired in the field. These requirements may place considerable additional cost and complexity on vapor-compressive solutions.

With recent advances in solid-state cooling devices, a practical solution is available that can meet the operating requirements for a vending dispenser that is quiet, reduces power requirements and does not contain environmentally unfriendly refrigerants. Thermoelectric cooling (TEC) devices (also known as Peltier devices) may be useful for applications with operational temperatures below freezing water (32° F.). However, thermo-electric devices do not have excess cooling power to overcome thermally inefficient designs of the type that vapor-compressive units have traditionally tolerated. However, the design of cooling and carbonation system 300 includes insulation materials, heat transfer models and a thermo-electric device capable of producing an ice-bank reserve, such that system 300 meets operational requirements in a quiet, efficient manner.

In an implementation, as shown in FIGS. 13A and 13B, the cooling and carbonation system 300 represents a constant temperature water bath, and includes an insulated water bath enclosure 319 holding water bath 328, a thermoelectric cooling (TEC) device (i.e., at least one TEC cooling fan 323, a TEC heatsink 324, at least one TEC engine 325 and at least one TEC cold plate 326), a water cooling coil 321, a carbonator tank 320, a circulation pump 327, a distributer 322 and an ice-bank reserve 329. In the examples shown in FIGS. 13A, 13B, 14A and 14B, system 300 includes two engines 325, plural fans 323 and six cold plates 326. It is understood that this represents a non-limiting example of system 300.

The system 300 uses a number of features to operate efficiently. These features include an insulated water bath enclosure 319 to greatly reduce ambient heat gain into the water bath 328; positioning the water cooling coil 321 and carbonator tank 320 to more efficiently use the volume of the water bath 328 to simultaneously cool both coil 321 and tank 320; improved water flow management techniques to increase heat transfer efficiency between the cooling coil 321 and ice-bank reserve 329; and efficient physical design for the ice-bank reserve 329 to build sufficient thermal mass storage.

The TEC engine(s) 325 may use a multi-layer design to provide higher temperature differentials, while maintaining higher thermal transfer rates. Cold-plates 326 may be attached to the cold-side of the TEC engine(s) 325. The cold-plates 326 may be made of a thermally conductive material, such as, without being limited to, copper or aluminum. The cold-plates 326 may be suspended into the water bath 328 adjacent to, but separated from, the cooling coil 321 and carbonator tank 320.

The surface area of the cold-plates 326 may provide for direct absorption of heat from the water bath 328, and may conduct the heat to the TEC engine(s) 325 where it transfers the heat to the heatsink 324. As the water bath 328 temperature approaches 32° F., a layer of ice may form over the submerged surface of the cold-plates, creating an ice-bank reserve 329 as shown in FIGS. 14A and 14B. The ice-bank reserve 329 beneficially serves as a thermal mass storage to provide instantaneous cooling to handle heat gain caused during an individual dispense event, and to maintain a constant 32° F. water bath 328 temperature. The ice-bank reserve 329 allows the TEC engine 325 to utilize the time between dispenses to remove heat to ambient air, and recover lost ice-bank reserve 329.

Forming ice in large thin sheets over the cold-plates 326 provides the ice-bank reserve 329 without the loss of cooling capacity due to thick layers of ice that thermally insulate the cold-plates 326 from the water bath 328, reducing heat transfer efficiency. In an example, the ice-bank reserve 329 may be about 10-12 pounds of thermal mass storage, with a thickness of the ice that may be thin, generally about 6.35 mm (0.25 inches) thick.

Prior systems using vapor-compressive cooling typically experience a problem that the frequent on/off power cycling of a compressor to maintain an ice reserve during periods of no dispensing activity cause the ice to migrate, building thicker at an inlet of the evaporator and disappearing at an outlet. The ice migration causes freeze-up conditions when the ice becomes too thick at the inlet and interferes with water bath agitation flows or directly comes into contact with a water cooling coil.

In contrast, system 300 spreads out the ice-bank reserve 329 over a larger surface area, providing a similar amount of thermal mass storage. However, the cold plates 326 continue to absorb and transfer a greater percentage of heat directly to the ambient air. Additionally, the system 300 using a TEC engine 325 has the ability to regulate the cooling capacity to meet changing operational needs.

TEC devices modulate cooling by changing the power input to the cold plates. In system 300, when initial cooling or recovery conditions use the maximum heat transfer capacity, the TEC engine 325 may be operated at full power. As the ice-bank reserve 329 is built to full capacity and there is no present beverage dispensing activity, the power may be reduced to a level that maintains equilibrium of the heat gain into the water bath 328. This has the advantage of reducing power consumption while maintaining a thin ice distribution (i.e., ice-bank reserve) over the cold plate 326 surfaces. Because the TEC engine 325 operates with a completely different power management method compared to prior vapor-compressive systems, ice migration and associated failure modes may be eliminated.

One or more cooling fans 323 may use ambient air from inside a housing of the beverage dispensing system 170 to cool the heatsink 324, discharging the heated air directly out of the beverage dispensing system 170. The beverage dispensing system 170 may include air inlet louvers (not shown) located in proximity to the floor to pull in cooler ambient air, providing the added benefit of constantly moving the air inside the beverage dispensing system 170 to maintain a constant ambient temperature.

The cooling coil 321 may be located around the carbonator tank 320 and both may be mounted above water flow distributer 322, as shown in FIGS. 13B and 14A. The distributer 322 may be connected to the circulation pump 327 and may distribute a current of cold water past the coils of the cooling coil 321, using the carbonator tank 320 to help manage the water current. The water current additionally provides cooling for the carbonator tank 320. This represents an improvement in directed water current versus prior systems that rely on stirring propellers, or similar devices, to agitate the water bath but cannot efficiently direct water current over cooling surfaces.

The cooling cycle is generally shown with arrows in FIG. 14A. Circulation pump 327 moves cold water in the water bath 328 past the ice-bank reserve 329 to the distributer 322. Cold water exits holes in distributer 322, moving upwards past cooling coil 321, while absorbing heat from an incoming ingredient (e.g., water) passing through cooling coil 321 on its path to being dispensed (after being cooled from a first temperature to a second (lower) temperature via system 300). Heat absorbed from the cooling coil 321 is transferred to ice-bank reserve 329 by the water current and absorbed by the cold-plates 326 as it returns to circulation pump 327. The TEC engine 325 conducts the heat absorbed from cold plates 326 to the heatsink 324. At the heatsink 324, the heat is transferred to cooling air by cooling fan(s) 323 and exhausted from the beverage dispensing system 170.

Beverages of the beverage dispensing system 170 may be chilled by chilling the water portion of a beverage recipe. The relatively high concentration levels of the ingredients (described further below) may result in a large percentage of water being used to reconstitute the ingredients in the final beverage recipe, for example, greater than 90% water. With a low percentage of ingredients being added (which may be stored at room temperature), there may be a negligible impact on the final beverage temperature compared to the temperature of chilled water.

In an implementation, not all of the water processed by the beverage dispensing system 170 may be cooled. The carbonation needs for "sparkling" water options may not be as difficult to dispense when mixed with ingredients at room temperature. In an implementation, only the water supply may be cooled, to efficiently cool only the percentage of water required. In an optional implementation, one or more various ingredients may be chilled.

Figure 14C:
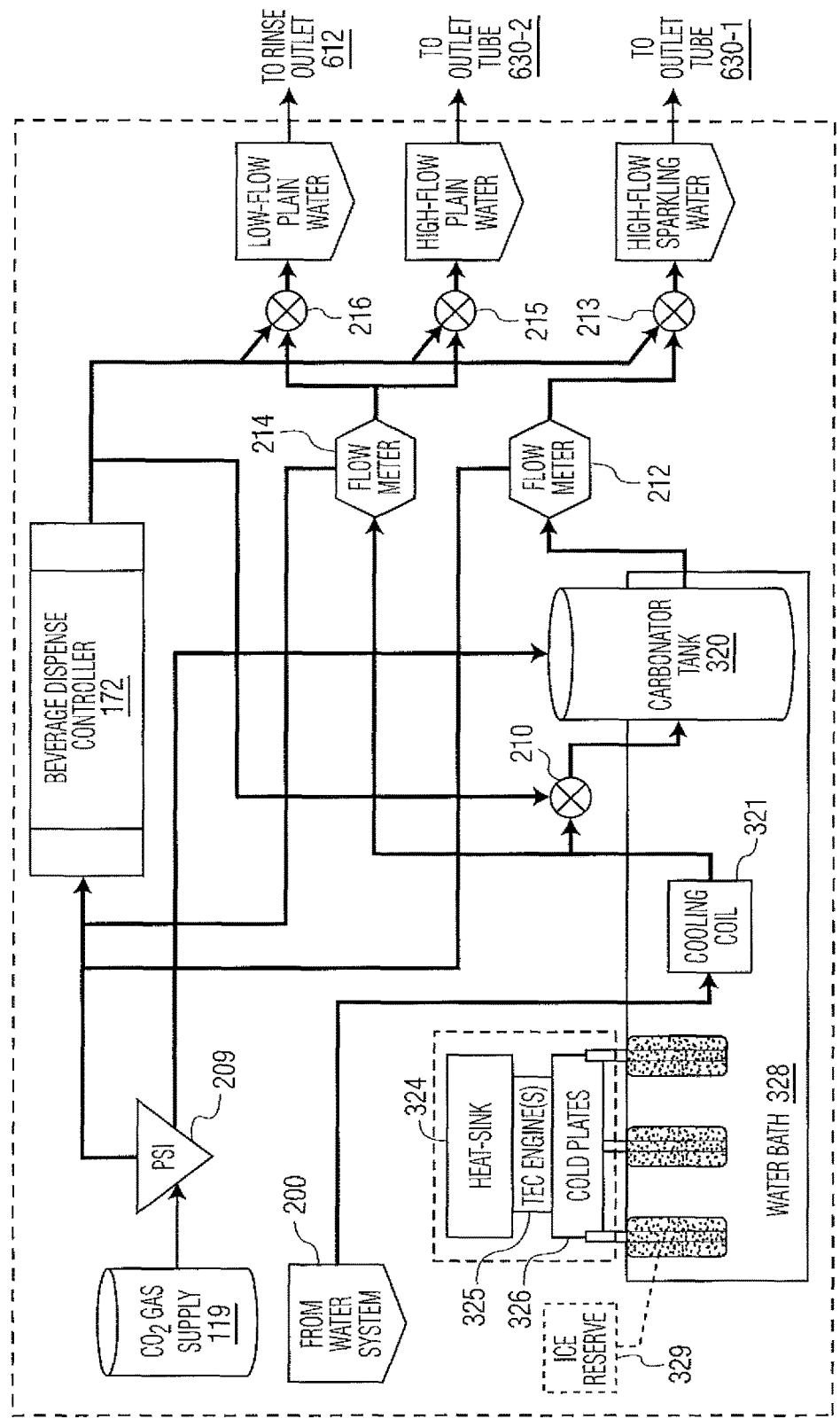
FIG. 14C is a schematic of an implementation of the thermoelectric water cooling and carbonation system.

Controller 172 may be configured to measure and control the flow of chilled ingredients and various functions, as shown in FIGS. 11 and 14C. The controller 172 may control a solenoid valve 210 to control input into carbonator tank 320. Additionally, a flow meter 212 for measuring cold carbonated water, and a solenoid valve 213 for controlling cold carbonated water may be used. Similarly, a flow meter 214 may measure chilled water flowing to a solenoid valve 215 used for controlling cold high-flow plain water, as well as a solenoid valve 216 for controlling cold low-flow plain water. An implementation may utilize pressurized carbon dioxide ($CO_2$) tank 119 with outlet pressure regulated by regulator 209 to supply carbonator tank 320.

For purposes of this disclosure, the difference in high-flow and low-flow refer to the flow rate of the water. For rinsing a nozzle 610, a flow rate effective for a rinse function, but that does not use large amounts of water, of about 0.05 to 0.25 ounces per second may be used, A high-flow water rate generally between 0.5 to 2.0 ounces per second may be used for both plain and carbonated water. The high-flow rate may be used to provide the bulk of a recipe's make-up water in the least amount of dispensing time, and to generate a little ingredient mixing turbulence as it fills a user's container 699. Additionally, at the high-flow rate, the carbonated water does not dispense so fast that it causes excessive foaming and spilling.

Next, an ingredient supply system 400 is described with respect to FIGS. 11, 15A-15B, 16A-16B, 17A-17C, 18A-18C, 19A-19B, 20A-20C, 21A-21N, 22, 23 and 24A-24G. The ingredient supply system 400 may include ingredient reservoirs 402, ingredient pumps 404, dosing device 406, 506 and a controller 172. Ingredient supply system 400 is described below with respect to a differential pressure dosing device 406 and a pulse counter dosing device 506.

Figure 15A:
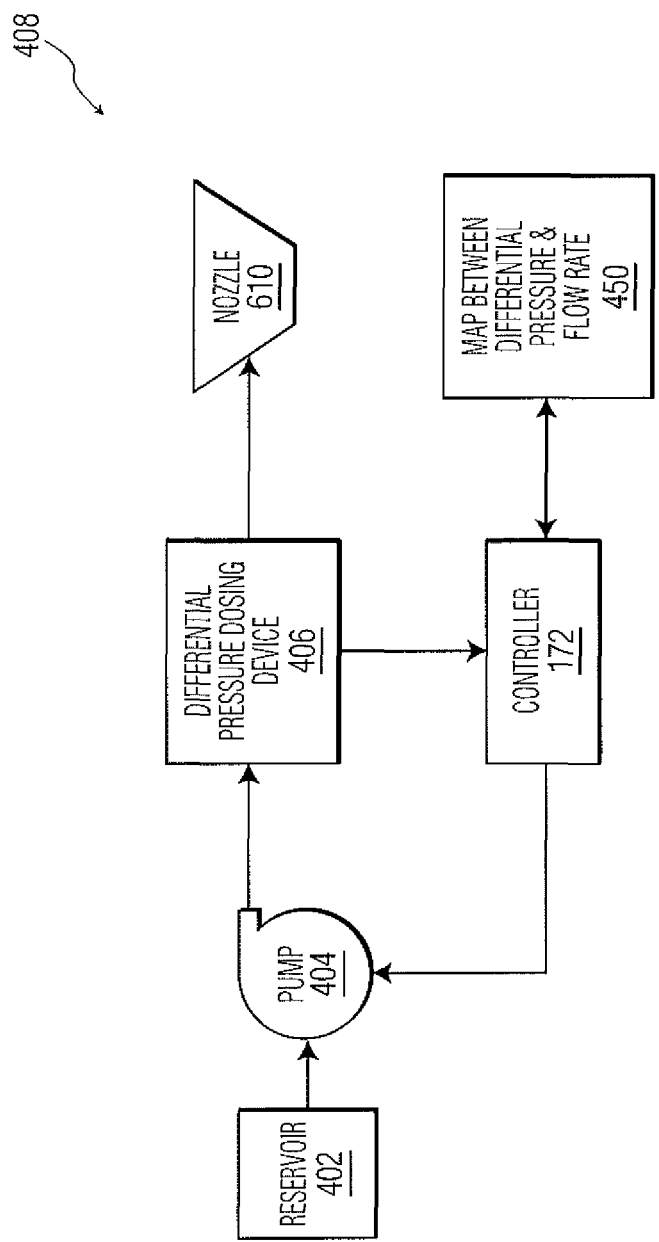
FIGS. 15A and 15B are schematics of an implementation of a differential pressure dosing system in the beverage dispensing system.
Figure 15B:
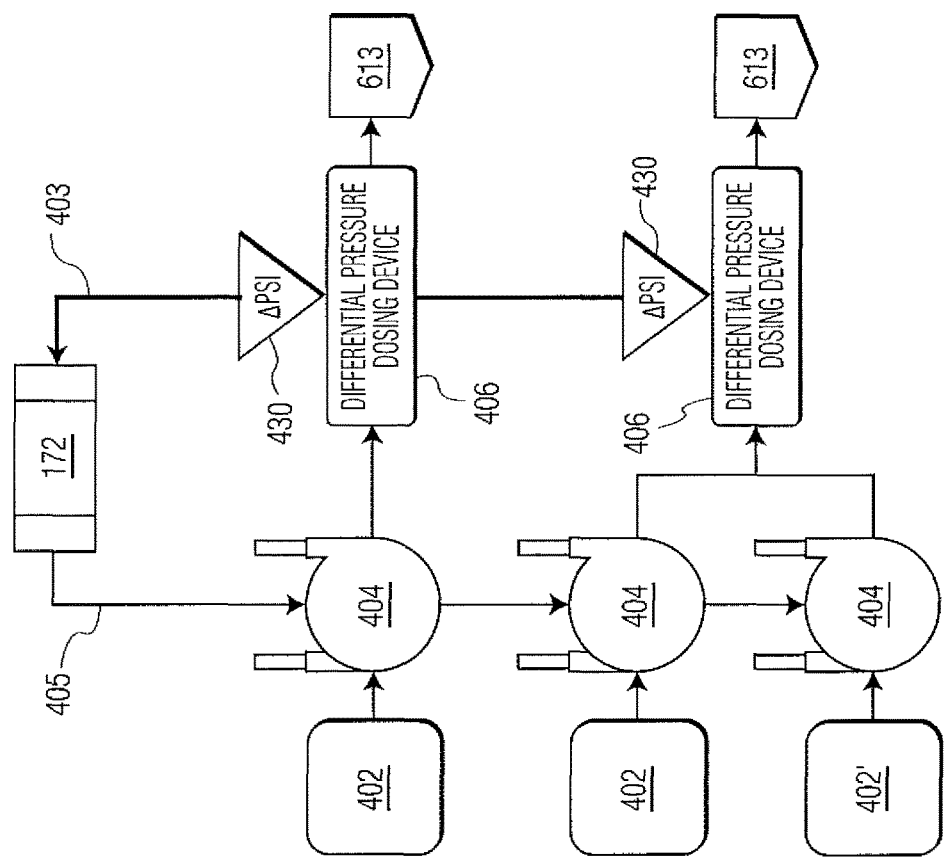
Figure 19A:
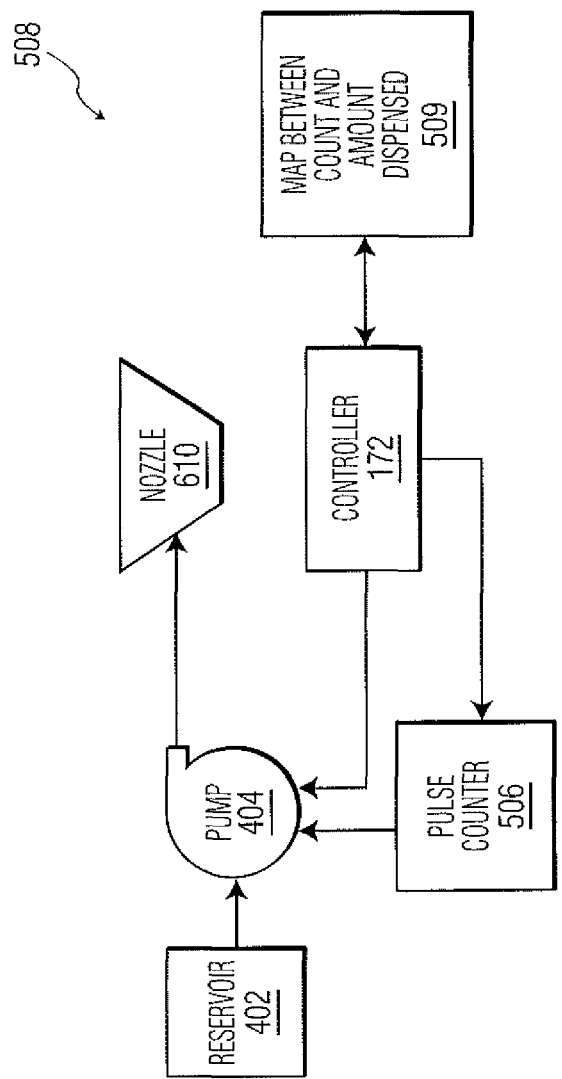
FIGS. 19A and 19B are schematics of an implementation of a pulse counter dosing system in the beverage dispensing system.
Figure 19B:
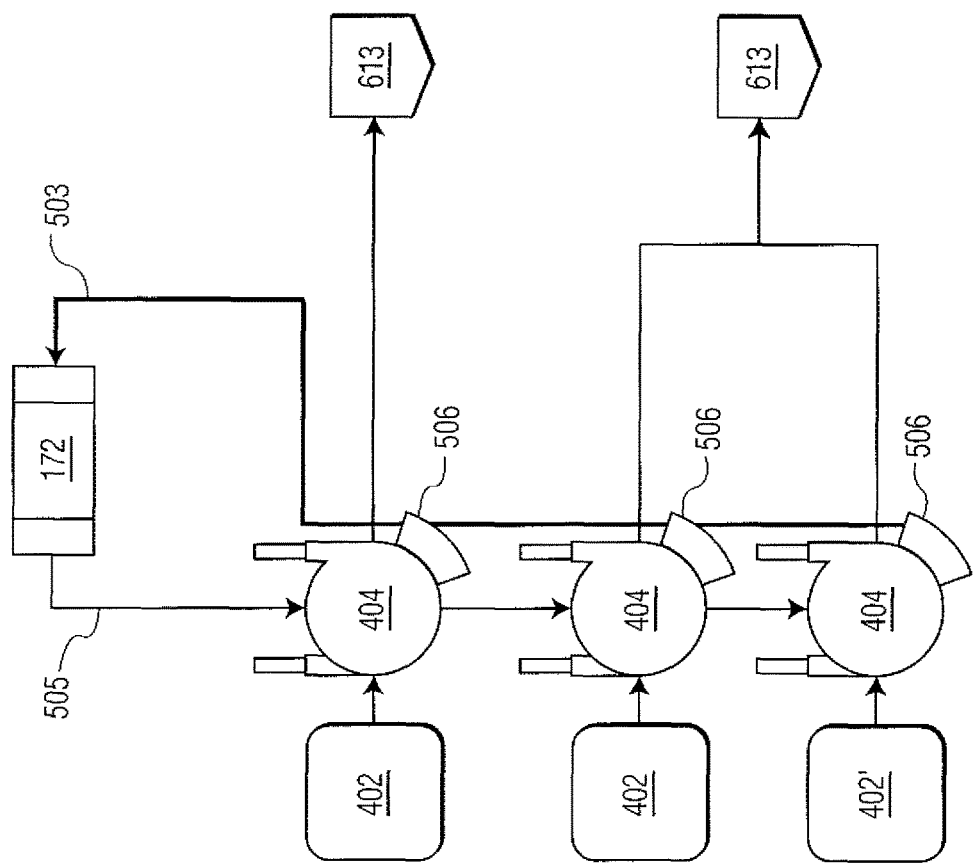

Ingredients of the present disclosure may be packaged in a plurality of reservoirs 402, as shown in FIGS. 11, 15B and 19B. In an implementation, the reservoirs 402 may be bag-in-box packages. The beverage dispensing system 170 may include various ingredients that may be in the form of highly-concentrated natural ingredients that are shelf-stable for at least one year without the use of artificial ingredients or preservatives. By adding any two or more ingredients, such as flavors and supplements at various amounts, an infinite combination of flavors and benefits may be achieved to obtain a wide variety of health benefits customized to a user's preference(s) (e.g., received as user input by system 170 via display and touchscreen 176).

In this manner, a few ingredients may deliver many benefits. For example, the beverage dispensing system 170 may include various supplements as ingredients. In an implementation, a user seeking an immunity boosting formula may specify a preference for a combination of a multi-vitamin supplement (which may be beneficial once a day) with an anti-oxidant supplement (which may be beneficial with every beverage, i.e., more than once a day) and Echinacea to create an immunity formula. In another implementation, a user may specify a preference for a combination of caffeine (which may be beneficial for energy) with a B vitamin blend (which may be beneficial for focus and concentration) for an enhanced energy beverage. In other implementations, the supplements can be used separately (i.e., not combined with other ingredients) for other specific benefits. The various ingredients provide for many possible beverages to be created from a few ingredients. The various supplements may be in the form of highly-concentrated natural ingredients that are shelf-stable for at least one year without the use of artificial ingredients or preservatives. The supplements may include, but are not limited to, proteins, vitamins, multi-vitamins, anti-oxidants, Echinacea, caffeine or any combination thereof. Non-limiting examples of supplements may include, for example, at least one of one or more vitamins, antioxidants, minerals, fiber, essential fatty acids, amino acids, probiotics, digestive enzymes, appetite suppressants, electrolytes, anti-acids (such as ginger and papaya), protein, glucosamine and chondroitin, CoQ10, curcumin, collagen, chemical extracts, brewer's yeast, spirulina, bee pollen, royal jelly, herbs caffeine, as well as any other natural or man-made herbs or extracts than can be placed into a format dispensable by the systems of the present disclosure.

The beverage dispensing system 170 may also include various sweetener ingredients, which may be used separately or combined as customized to user preference(s). For example, a user preference may be set to select a single sweetener type, or blend a higher calorie sweetener option with a low calorie option, a zero calorie option, or any combination thereof. By selecting a preferred ratio of various sweetener ingredients, a user has a range of available calorie choices available. This allows different users to use the same ingredients to achieve different calorie outcomes. For example, a first user prefers no calories, a second prefers a few calories and a third user is not concerned about calories. Each of the users may specify a beverage using the same sweetener ingredients at different ratios, resulting in differing calorie levels. A user can select their calorie level by setting a user preference. Sweeteners may include any high calorie, low calorie, or zero calorie sweetener, such as, but not limited to, any natural or artificial sweeteners, such as, for example and without limitation, sugar, dextrose, glucose, fructose, maltodextrin, trehalose, honey, stevia, monk fruit, luo han guo, cane sugar, beet sugar, agave sugar, citrus extract, saccharin, aspartame, sucralose, neotame, acesulfame-k, alitame, cyclamates, neohesperdine, thaumatin, and sugar alcohols, such as sorbitol, mannitol, xylitol, erythritol, d-tagatose, isomalt, lacititol, maltitol, glycerol, HSH hydrogenated starch hydroslsates, maltito or polydextrose, or any combination thereof.

The beverage dispensing system 170 may also include various acid ingredients. The inclusion of acid in a beverage allows for subtle flavor options to be created from a few ingredients instead of numerous finished blends. For example, many fruits differ in flavor due to their acid profile. The differences between varieties of apples, for example, is driven by differences in acid types, pH level and inclusion of volatile elements. Many fruits have citric, malic, and ascorbic acid in different ratios. Tartness may be selected by combining various acids and sweeteners in various amounts. By having a variety of acids, sweeteners and other ingredients available, it is possible to achieve a wide range of fruit flavors and fruit varietal flavors by varying the levels of these acids in the finished beverage. Acid ingredients may be selected from any acid such as, but not limited to, citric, malic, ascorbic and any combination thereof. In some implementations, a user may be able to select a tartness level (i.e., as a user preference as user input, e.g., via display and touchscreen 176). System 170 may translate the user preference of tartness level to some combination of sweetener(s) and acid(s) that correspond to the user-identified tartness level.

Next, a description of ingredient dosing is described, as shown in FIGS. 15A-15B and 19A-19B. Ingredient dosing for the customization process of the beverage dispensing system poses a unique set of problems. The beverage dispensing system 170 is different from a typical fountain dispenser. The beverage dispensing system 170 may be a vending machine which means it may operate in a stand-alone mode, and include payment and customer account management capabilities that a typical fountain dispenser does not include.

The beverage dispensing system 170 dispenses beverages as a fully customized recipe based on user preference, dispensing one drink at a time. Typical fountain dispensers, even those that provide more variety by adding a predetermined flavor additive to a basic recipe drink, dispense in a continuous ratio mode. Contrastingly, the customization process of the beverage dispensing system 170 includes choosing the amount of ingredients to be dispensed, and the beverage dispensing system 170 operates in a single batch dosing mode to accurately provide each ingredient simultaneously. The accurate dosing of each ingredient by system 170, with each ingredient having various amounts, means some ingredients will complete their individual dispense before others. In beverage dispensing system 170, a user-specified recipe is complete when all ingredients have been dispensed and the final amount of plain or sparkling water has been added to the beverage. This is a significantly different set of operational requirements than the continuous ratio mode found in fountain dispensers.

Ingredients provided by the beverage dispensing system 170 may be highly concentrated natural ingredients that are shelf-stable for at least one year without the use of artificial ingredients or preservatives. Due to the high level of concentration of the ingredients, dosing requirements can range from, for example, fractions of a milliliter to 20 milliliters per ounce. In addition, a dosing system of system 170 is capable of operating with liquid ingredients whose properties range in density (for instance, specific gravities from 1 to 1.3) and viscosity (for instance, from 1 to 250 centipoise at 72° F.).

In an implementation, each ingredient reservoir 402 is connected to an ingredient pump 404. In some implementations, a second, backup, reservoir 402' of ingredient may also be connected to an ingredient pump 404. In an implementation there may be a first reservoir 402 of an ingredient connected to a first ingredient pump 404, and a second reservoir 402' of the same ingredient connected to a second ingredient pump 404 with both ingredient pumps connected to the same dosing device 406, 506, as shown in FIGS. 15A-15B and 19A-19B. In some implementations, not shown, a single ingredient pump 404 may be coupled to multiple reservoirs 402 via a flow selector switch. The flow selector switch may be used select and couple a reservoir 402 among the multiple reservoirs to ingredient pump 404 at a particular time for a particular beverage recipe.

Ingredient dosing for the customization process of the beverage dispensing system 170 may include a relatively low-cost peristaltic pump with a direct current (DC) motor used as the ingredient pump 404, Peristaltic pumps have several advantages. A peristaltic pump provides its own flow control method in that when the pump stops operating, it automatically stops and seals off flow of the ingredient being pumped. Also, it is capable of drawing product out of a bag-in-box package and can provide sufficient vacuum to fully evacuate ingredients from the bag, leaving no wasted ingredient. There are several methods that can be used to accurately dose highly-concentrated ingredients with the use of a peristaltic pump, or any similar positive displacement pump.

In an implementation, a closed-loop feedback method may be used by measuring differential pressure in a flow of an ingredient, and calculating the amount of ingredient dispensed, as shown in FIGS. 15A, 16A-16B, 17A-17C, 18A-18C. The differential pressure may be converted to a flow rate of the ingredient. The flow rate may then be converted to a an ingredient dose. FIG. 15A illustrates a dosing system 408 formed by differential pressure dosing device 406, controller 172, ingredient pump 404 and map 450.

Figure 17A:
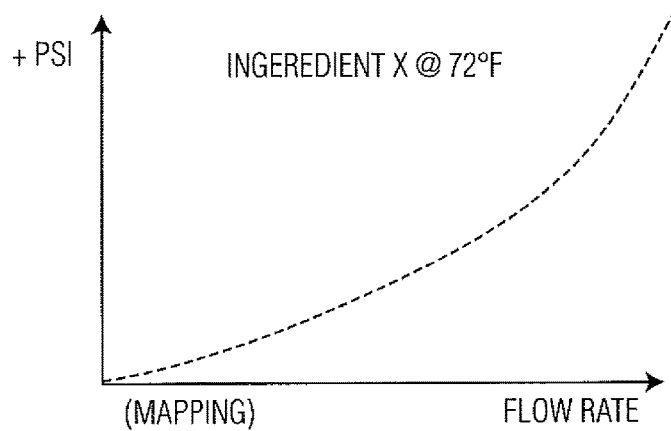
FIGS. 17A, 17B and 17C are a series of graphs depicting flow rate measurement dosing of the differential pressure dosing system.
Figure 17B:
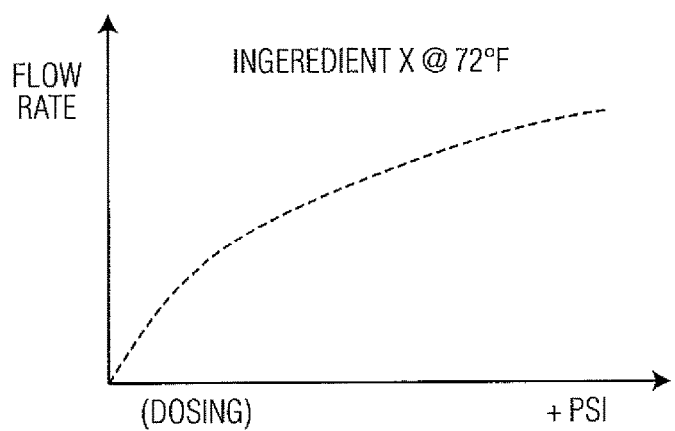
Figure 17C:
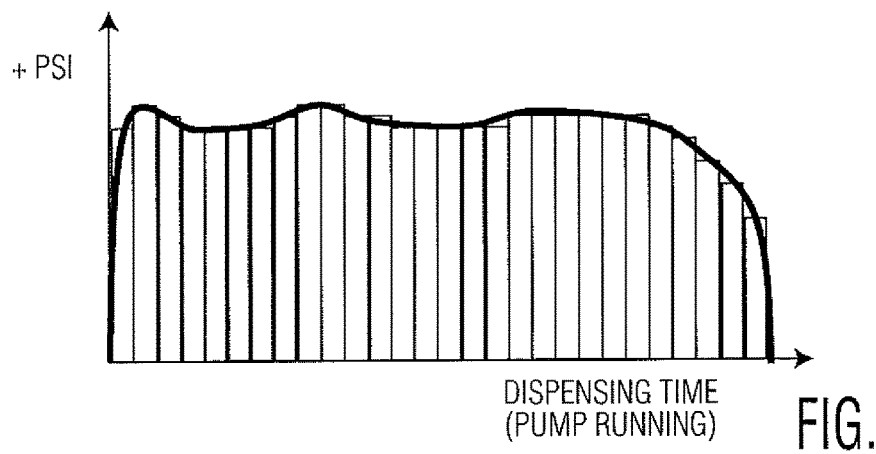

As shown in FIGS. 17A-17C, differential pressure is measured and is mapped to a flow rate. The calculated flow rate is integrated over time to calculate the total ingredient amount dispensed, directly controlling the speed of an ingredient pump 404 until the desired dose has been dispensed. Accordingly, each ingredient is mapped at room temperature to measure differential pressure over a range of flow rates (FIG. 17A). Mapping data is used to generate a polynomial equation to calculate flow rate for a measured differential pressure (FIG. 17B). The speed of ingredient pump 404 is controlled by controller 172 to deliver a desired flow rate of an ingredient being dosed. As the pump 404 is dispensing, the differential pressure is measured by device 406 at regular intervals and used to calculate the ingredient flow rate (solid line in FIG. 17C). The flow rate multiplied by the sample interval time becomes the dose for that interval (the rectangles in FIG. 17C). The flow rate is controlled and dosing totaled until the desired total dose, and the flow rate is reduced until the final total is achieved, where the total dose is the sum of the intervals.

Figure 16A:
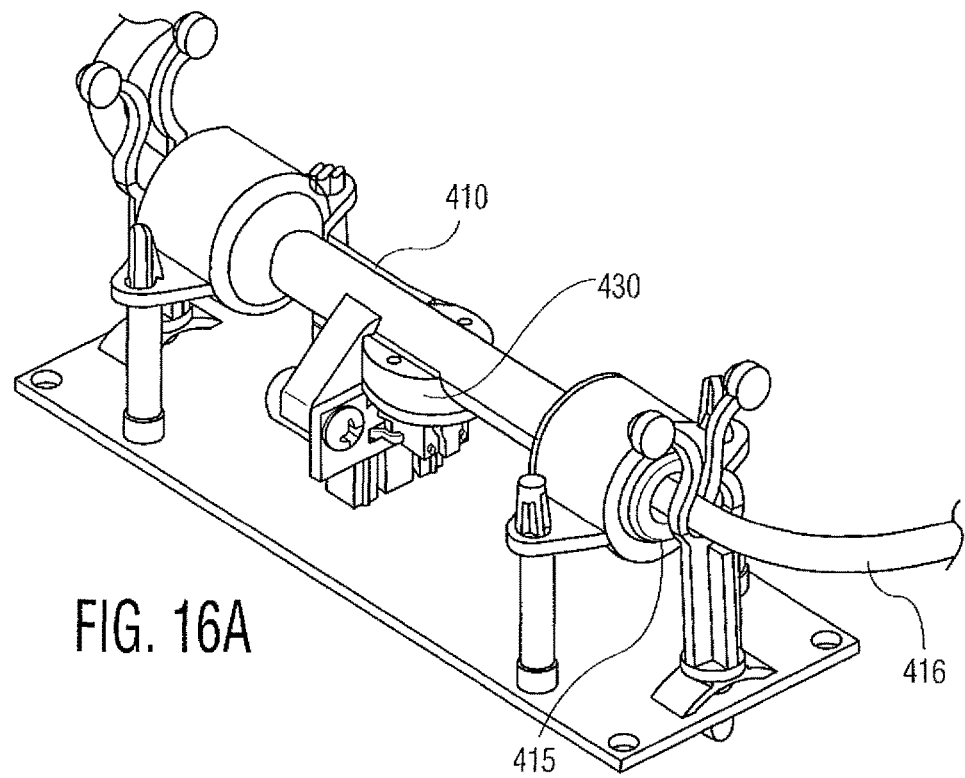
FIGS. 16A and 16B are respective perspective and cross-sectional depictions of an implementation of a differential pressure dosing device for measuring fluid flow in the differential pressure dosing system.
Figure 16B:
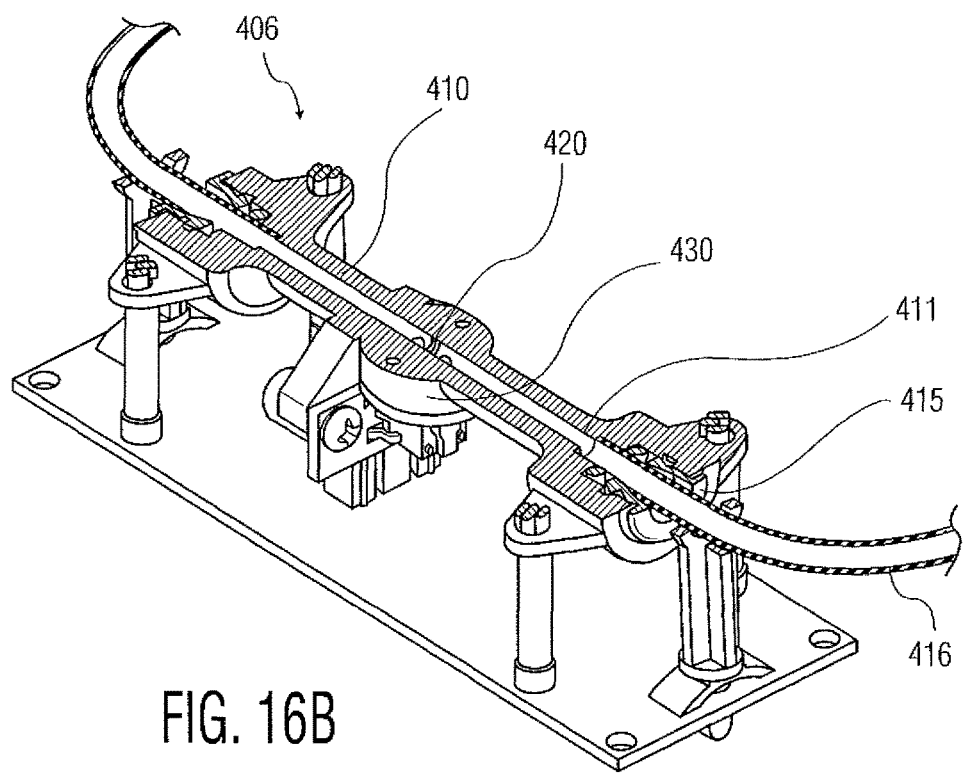

One very accurate way to measure flow rate of a liquid is to measure the differential pressure generated by the liquid as it flows through a sharp-edge or thin-plate orifice restriction. A differential pressure dosing device 406 using differential pressure may be placed in line with the ingredient flow. As shown in FIGS. 16A-16B, the differential pressure dosing device 406 may include a body 410, a flow passageway 411, a restriction orifice 420 and a differential pressure sensor 430. In an implementation, differential pressure dosing device 406 may further include tubing fittings 415 and/or an analog-to-digital converter. An analog-to-digital converter may be implemented on a printed circuit board, by a controller, by a remote system via the Internet 192, or any other suitable means.

In an implementation, body 410, flow passageway 411 and restriction orifice 420 may be a molded single-piece body wherein the internal diameter matches the internal diameter of tubing 416 attached to tubing fittings 415 in order to minimize flow disruption. Tubing fittings 415 may be quick connect fittings, such as Speedfit push-fit fittings available from John Guest, or equivalent. A diameter of internal flow passageway 411 may match an internal diameter of inlet/outlet tubing. Two example configurations of passageway 411 (2.4 mm & 4 mm internal diameter) may cover a wide range of ingredient properties. Differential pressure sensor 430 may be a surface mount differential pressure sensor mounted directly to molded body 410, with ports positioned closely on either side of restriction orifice 420. Differential pressure sensor 430 may be a flow-through sensor, such as the 26PC Flow-Through Series sensors available from Honeywell, or equivalent.

Figure 18A:
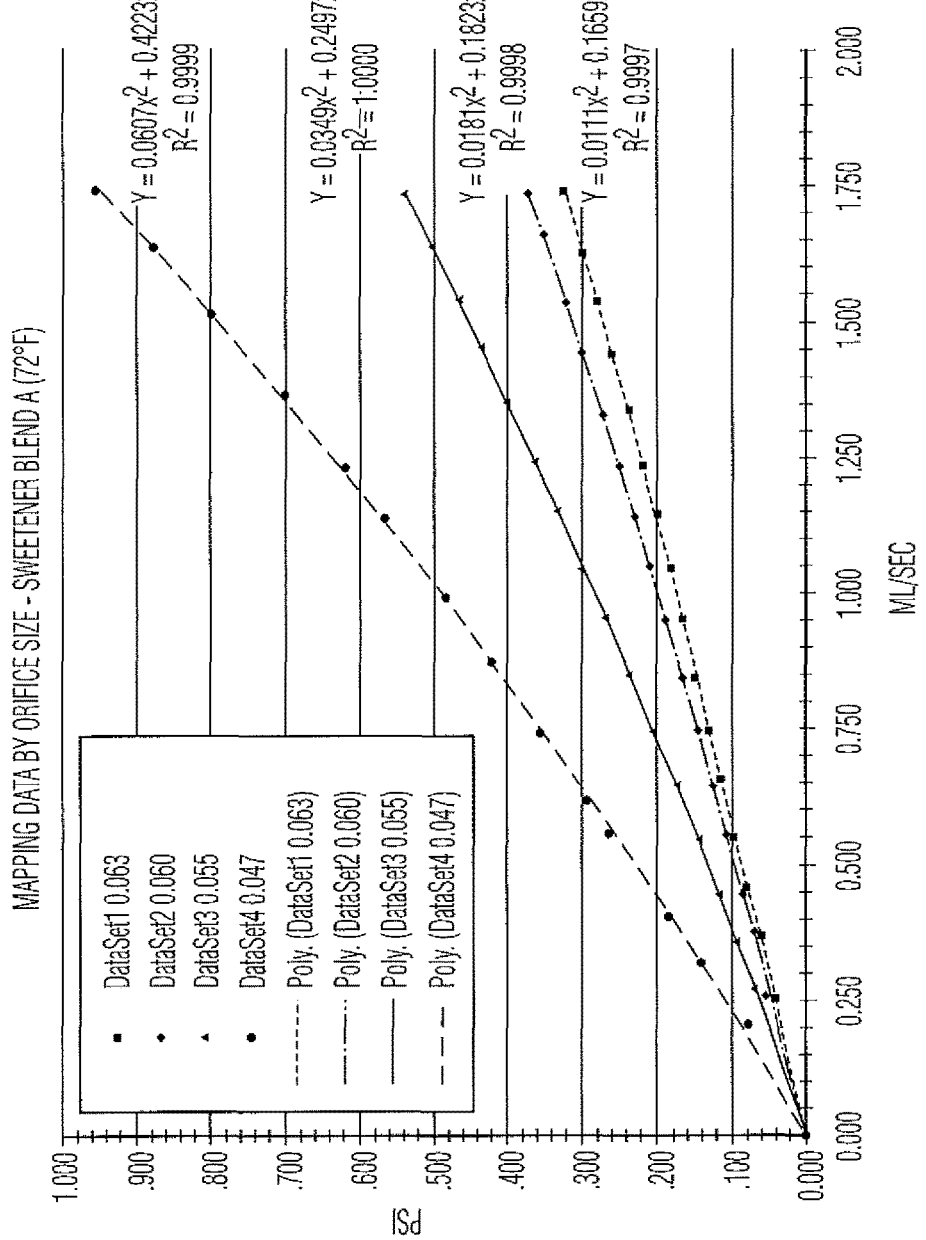
FIGS. 18A, 18B and 18C are a series of graphs depicting flow rate measurement dosing of the differential pressure dosing system.
Figure 18B:
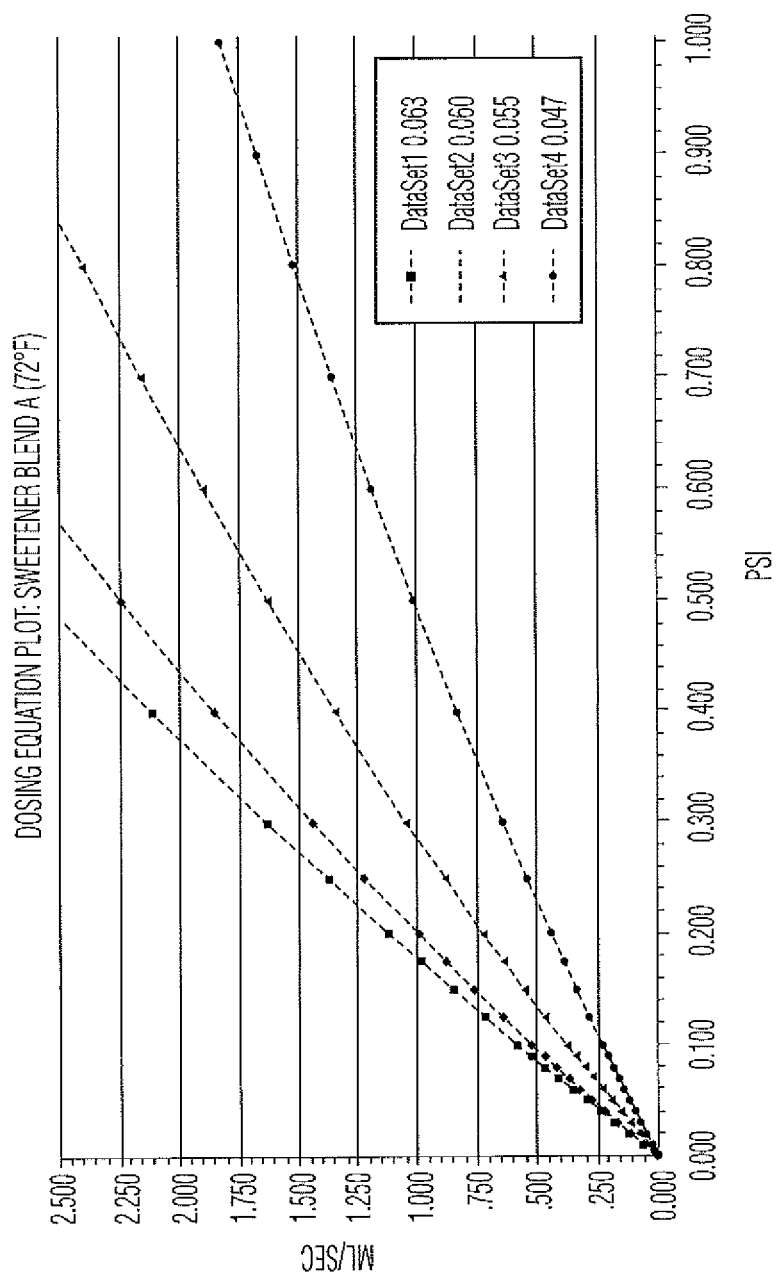
Figure 18C:
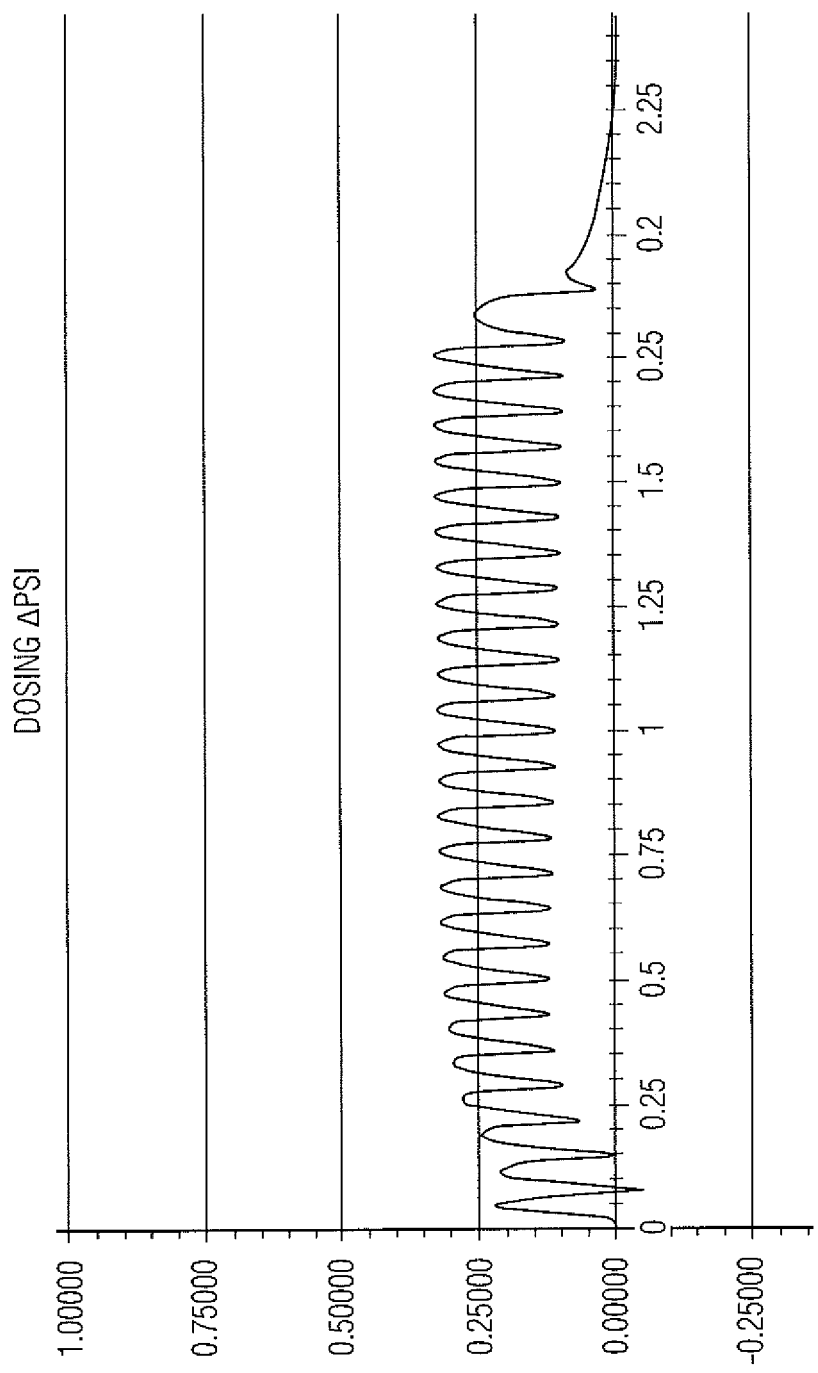

As discussed above, controller 172 may measure the differential pressure at regular intervals during dispensing. The differential pressure measurements may be applied to an equation, such as a polynomial equation of any suitable order. In the examples below, a polynomial equation (such as a second order polynomial equation) is described. It is understood that other methods of determining the mapping between differential pressure and flow rate may be used. The polynomial equation for each differential pressure dosing device 406 may be derived by mapping the differential pressure with an ingredient prior to dispensing using an initial mapping process, as shown in FIGS. 18A-18C. The initial mapping process sets the flow rate of an ingredient through the orifice restriction 420 at a known value and then reads the differential pressure developed by that flow rate. Each ingredient may be mapped over a range of controlled flow rates (x-axis) recording measured differential pressure developed (y-axis) through precision restriction orifice 420 at various temperatures. The initial mapping process is repeated over a range of flow rates from 0 to full scale flow rate. The flow-rate versus differential pressure data pairs may be used to generate a continuous equation, for example, using curve-fitting software. The mapping data is plotted and the curve-fitting software may be used to generate, for example, a best-fit, 2nd order polynomial equation. Coefficients from the polynomial map equation may be used with the quadratic equation to reverse-process and calculate flow rate from a measured differential pressure, such that a map between flow rate and amount dispensed 450 is created.

After the initial mapping process and during a user-specified recipe dispense, the speed of ingredient pump 404 for each ingredient specified by user preference(s) is controlled by controller 172, and differential pressures at the differential pressure dosing device 406 for each ingredient is measured by controller 172 at input 403 to deliver a desired total dose of the ingredient(s) being dispensed for the user-specified recipe.

As ingredient pump 404 is dispensing, differential pressure is measured at the associated differential pressure dosing device 406 at intervals and the measured differential pressure is used by controller 172, along with the map 450 between differential pressure and flow rate, to calculate an ingredient flow rate value. The calculated flow rate value is multiplied by the interval time and becomes the dose amount for that interval. Dose amounts for each interval are summed until the total is approaching the desired recipe dose, when the controller 172 reduces the speed of ingredient pump 404 by sending a signal from output 405, reducing the flow rate until the final total is achieved and the ingredient pump 404 is stopped.

Using closed-loop control in this manner, dosing error is virtually zero and the dose performance is highly repeatable. Should the flow rate vary or pulsate over time as ingredient pump 404 operates, the relationship between the differential pressure and the flow rate for that liquid follows the dosing equation and those variations in flow can be compensated for during each dosing cycle to maintain repeatable and accurate dosing amounts.

Next, another implementation is described, using a closed-loop feedback method to count pulses in a positive displacement pump to measure a flow rate of an ingredient and calculate an amount dispensed, as shown in FIGS. 19A, 20A-20C, 21A-21N, 22, 23 and 24A-24G. FIG. 19A illustrates a dosing system 508 formed by pulse counter 506, controller 172, ingredient pump 404 and map 509.

A pulse counting method for dispensing using a positive displacement pump, such as a peristaltic pump, is to divide the pump rotation into discrete pulses and measure the amount of ingredient dispensed for a given number of pulses. In general, peristaltic pumps have rollers, also known as lobes or shoes, that are used to force fluid through the pump. The rollers divide the pump into sections whose volume is known. Each time a roller moves past the outlet to the pump, a known volume has been moved through the pump.

In an embodiment, an initial mapping may be to collect many samples of the pump's fluid output and counting pulses to determine the amount of the liquid ingredient dispensed per pulse. The resolution may depend upon the number of pulses generated per one revolution of the pulse counter. Several methods to generate pulses are disclosed herein and those knowledgeable in the art will recognize that any suitable pulse counting technique for pulse count dosing may be used.

In a first implementation, technology for pulse counting may use Hall-effect sensors 510 and magnets 520 embedded in a pulse counter dosing device 506, as shown in FIGS. 20A-C. As each magnet 520 passes a Hall-effect sensor 510, a pulse is generated. Magnets 520 are positioned in at least one pump roller 530. At least one Hall-effect sensor 510 may be positioned in proximity to rollers 530, to sense the passing of a magnet 520 at least once per revolution of the pump. In an embodiment, Hall-effect sensors 510 are attached to pump case 540, as shown in FIG. 20A, The number of pulses generated per one revolution of the pulse counter dosing device 506 is dependent upon the number of rollers 530, magnets 520 and Hall-effect sensors 510 used in pulse counter dosing device 506. There is no limitation on the number of rollers 530, magnets 520 and Hall-effect sensors 510 that are used in a pulse counter dosing device 506. Illustratively, in an implementation shown in FIGS. 20A-C, two Hall-effect sensors 510 (i.e., sensors 510-A and 510-B), and one magnet 520 per each of three rollers 530 (i.e., rollers 530-1, 530-2, 530-3), are used to generate 6 pulses per revolution of pulse counter dosing device 506. As each roller 530 with a magnet 520 passes by each Hall-effect sensor 510, a pulse is generated that is readable by controller 172 at input 503. The hatched areas shown in FIG. 20B represent the associated roller; for clarity only the center of the roller is hatched.

Figures 21A, 21B:
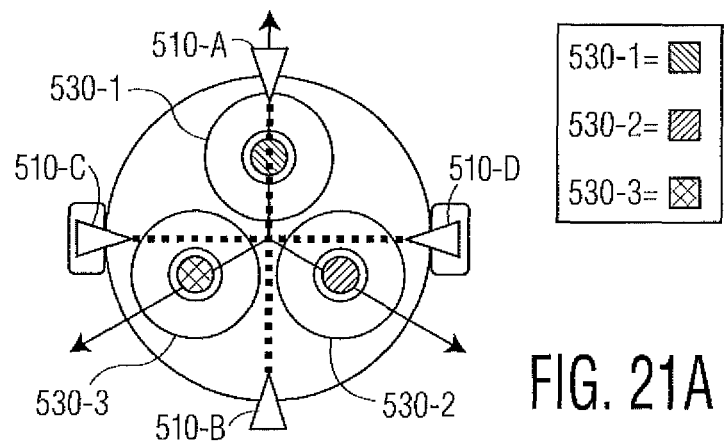
FIGS. 21A, 21B, 21C, 21D, 21E, 21F, 21G, 21H, 21I, 21J, 21K, 21L, 21M and 21N depict an implementation of a four-sensor pulse counter dosing system using Hall effect sensors.
Figure 21C:
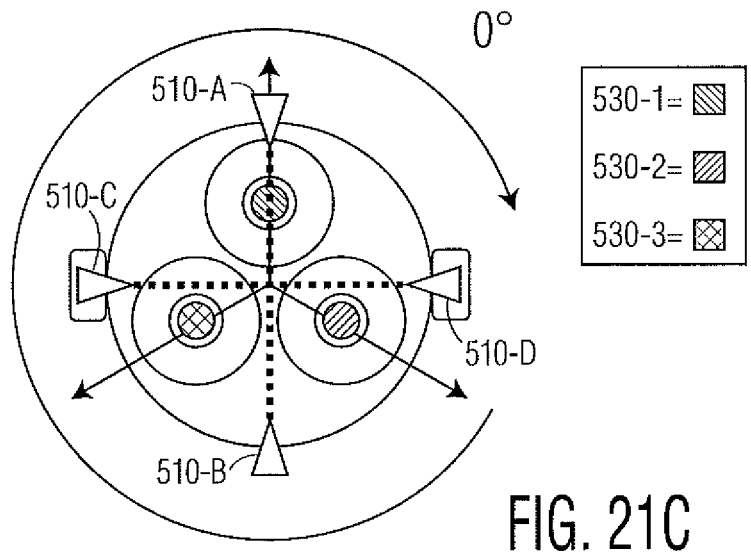
Figure 21D:
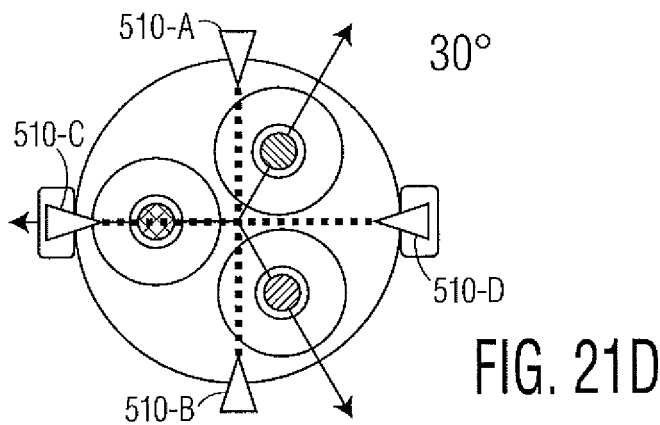
Figure 21E:
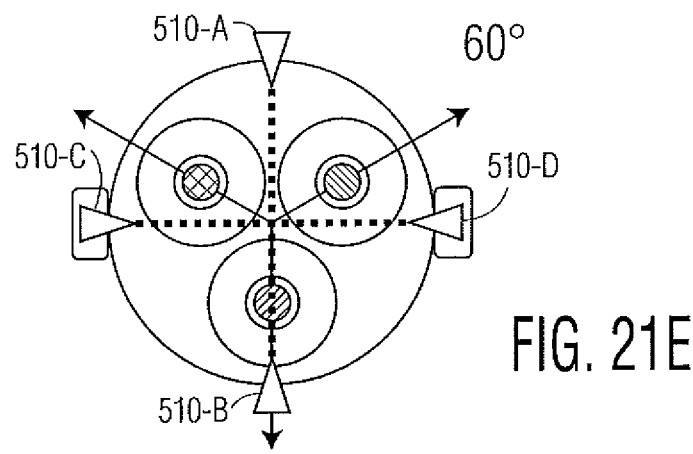
Figure 21F:
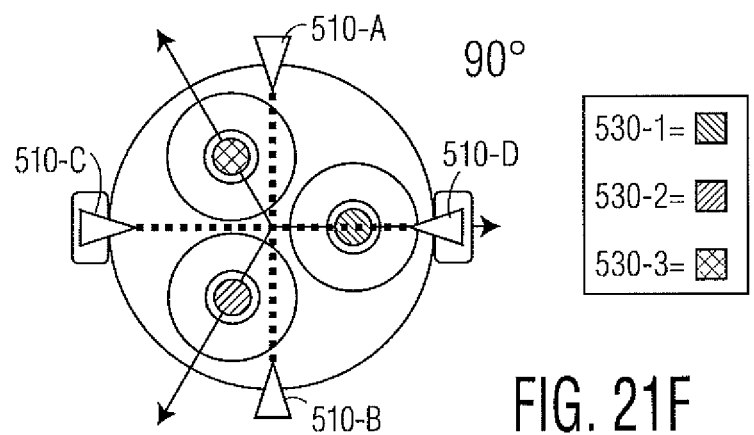
Figure 21G:
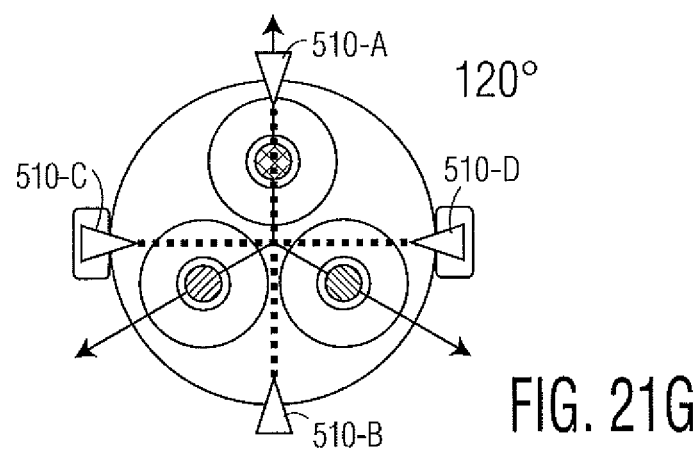
Figure 21H:
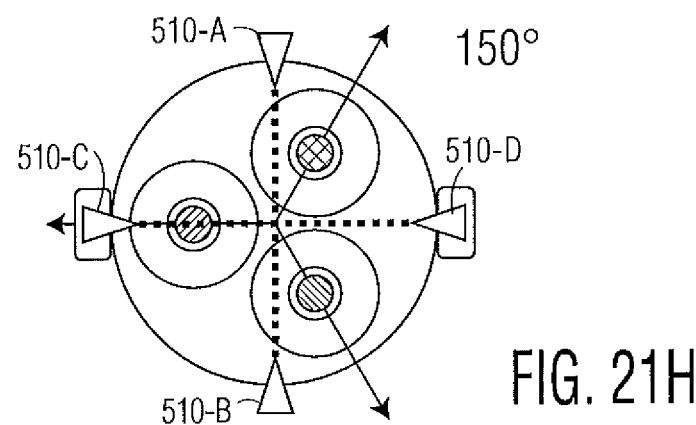
Figure 21I:
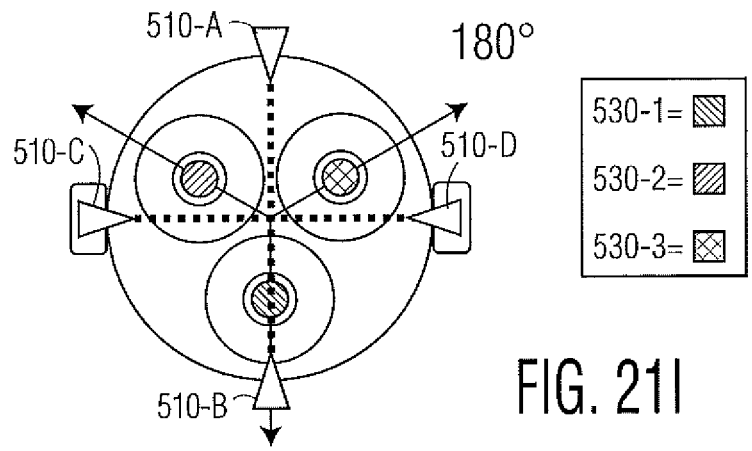
Figure 21J:
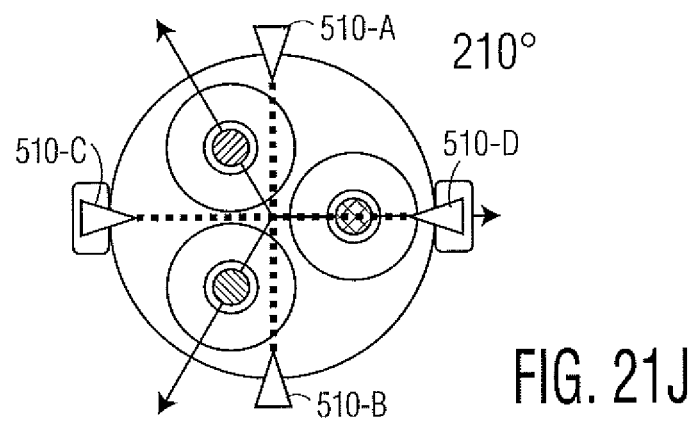
Figure 21K:
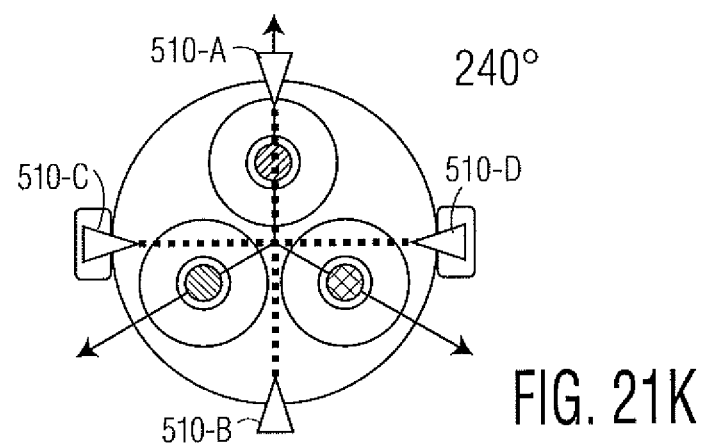
Figure 21L:
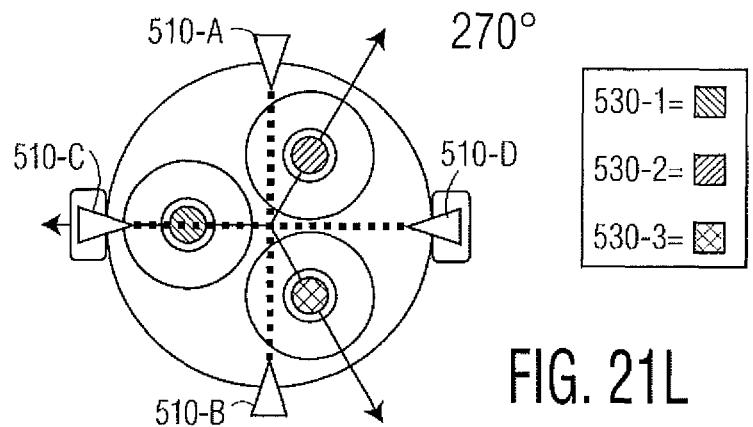
Figure 21M:
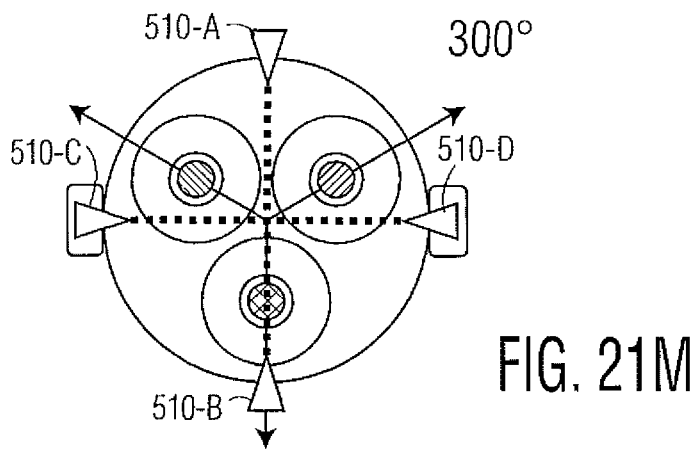
Figure 21N:
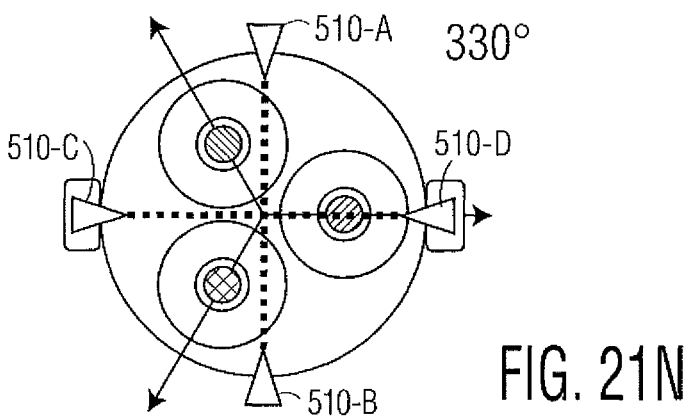

An implementation illustrating increased pulse count for higher resolution is shown in FIG. 21A-N. Four Hall-effect sensors 510 (i.e., sensors 510-A, 510-B, 510-C and 510-D) are used with one magnet 520 per each of three rollers 530 (i.e., rollers 530-1, 530-2, 530-3), to generate 12 pulses per each full rotation of the pulse counter dosing device 506. The hatched areas shown in FIG. 21A and FIGS. 21C-21N represent the associated roller; for clarity only the center of the roller is hatched.

An initial mapping process is performed wherein each ingredient may be mapped to measure the quantity dispensed per pulse in order to determine a conversion factor. To obtain accurate readings for creating the conversion factor, several large pulse count measurements over a range of pump revolutions per minute (RPMs) may be measured to determine an average value. For example, a dispense of 1000 pulses and a measurement of the quantity dispensed may be obtained. The volume amount measured may be divided by 1000 to obtain the conversion factor. Another measurement may be obtained for 10,000 pulses and compared to the conversion factor for 1000 pulses. If the same conversion factor is calculated, the results may be considered stable and useful. A map 509 between pulse count and amount dispensed may be created. For example, calculating the dose may include dividing the recipe amount by the quantity dispensed per pulse to determine how many pulses to count. In operation, a pulse counter dosing device 506 is attached to each ingredient pump 404, and controller 172 controls the speed of ingredient pump 404 using output 505 based on the pulse count and map 509 between pulse count and amount dispensed to determine how many pulses to dispense.

In another implementation, pulse counting technology may use optical or infra-red (IR) sensors to optically detect small holes or pins as they pass by the field of view of an optical sensor, each time generating a pulse that can be counted, as shown in FIGS. 22 23 and 24A-24G.

Figure 22:
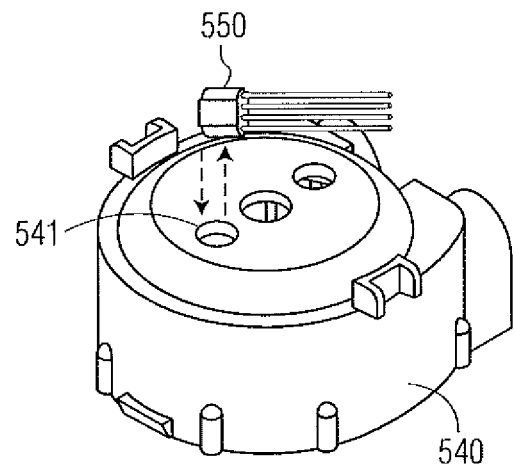
FIG. 22 is a perspective view depiction of an implementation of an infra-red sensor pulse counter dosing system.
Figure 23:
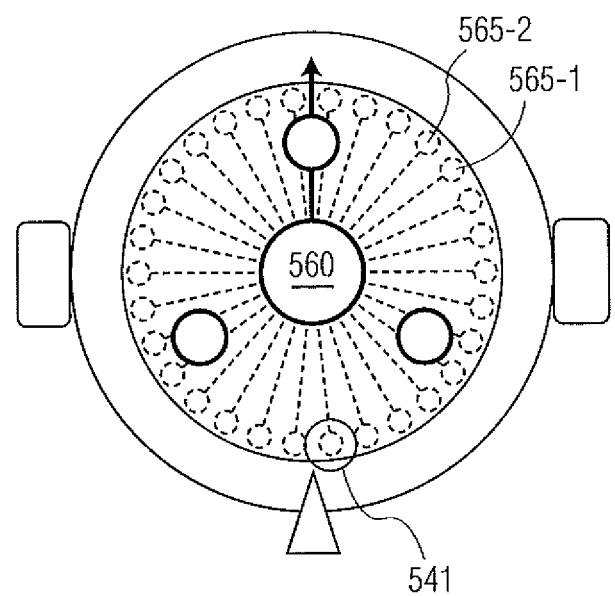
FIG. 23 is an overhead view depiction of an implementation of an optical pulse generator of the infra-red sensor pulse counter dosing system.
Figure 24A:
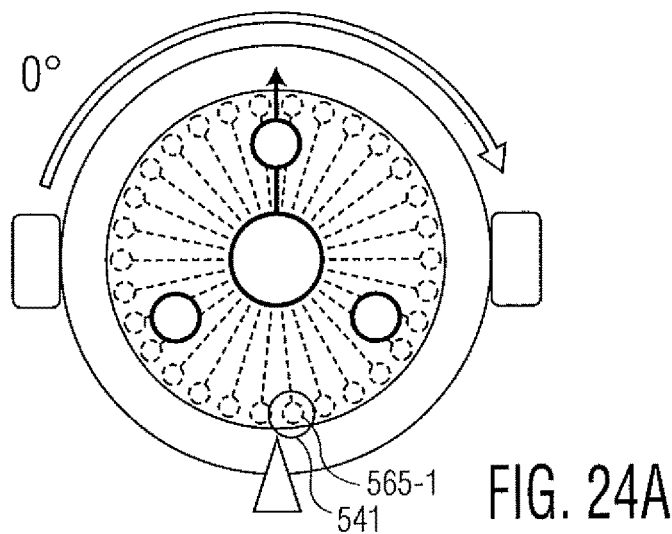
Figure 24B:
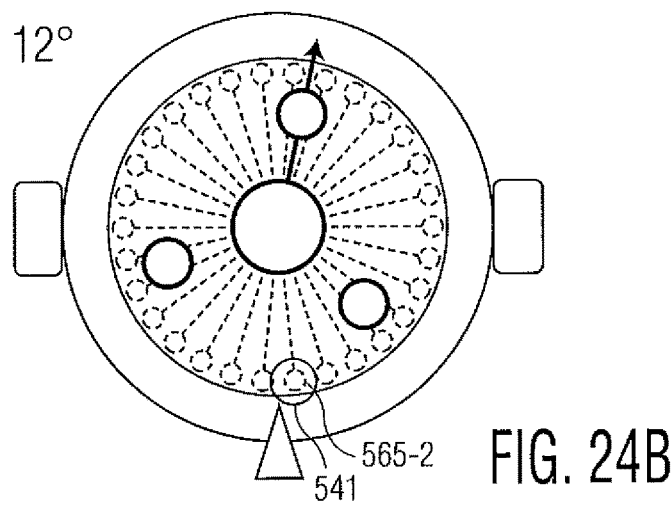
Figure 24C:
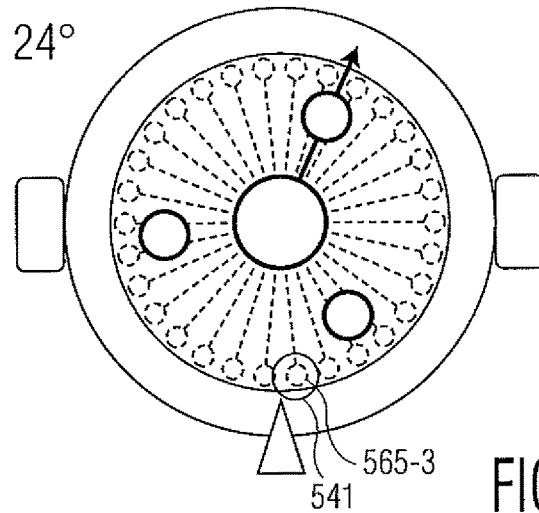
Figure 24D:
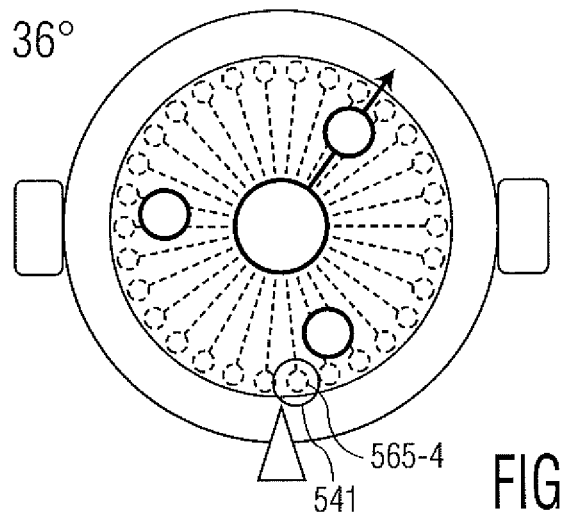
Figure 24E:
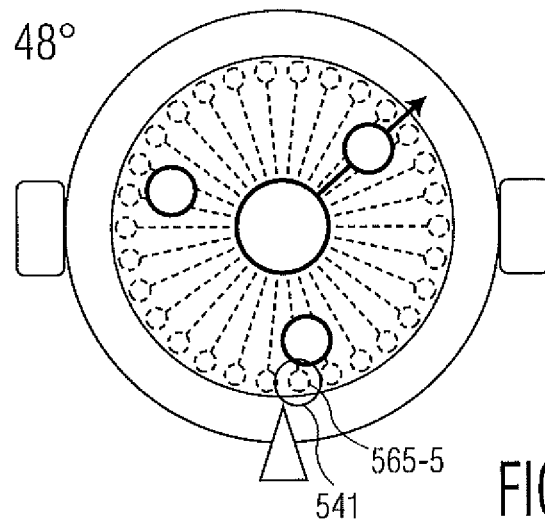
Figure 24F:
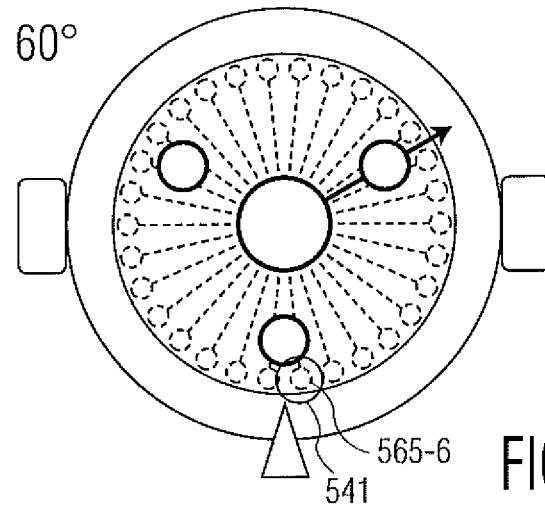

In an implementation, pulse counter dosing device 506 uses apertures 565 that are equally spaced around an outer edge of a roller plate 560, as shown in FIG. 23. A corresponding hole 541 is located in pump case 540, as shown in FIG. 22. An IR transceiver sensor 550 is mounted to an exterior face of pump case 540 in a manner that IR radiation may pass through pump case hole 541. During operation, apertures 565 rotate past pump case hole 541 and the IR signal reflection changes generate a measurement pulse, as shown in FIG. 23. In an implementation, using one IR transceiver 550 and thirty apertures 565 would generate thirty pulses per rotation of the roller plate 560. Rotational timing is shown in FIGS. 24A-24G for thirty apertures 565 that are equally spaced (12°) around the outer edge of the roller plate 560. The triangle shown in FIG. 23 and FIGS. 24A-24F represents the position that pump case hole 541 and an aperture 565 are in alignment such that transceiver 550 generates a pulse.

In implementations, not shown, that may include modifying existing pumps, apertures 565 may be offset (for example, 6°) from the roller shaft axis to allow apertures 565 to straddle roller shaft pins. Additionally, the roller plate 560 orientation may be reversed to allow it to face away from a motor. In an implementation, an optical light transceiver may be used instead of an IR transceiver. In an implementation, not shown, in addition to apertures 565 in the roller plate 560, an inverse construction may use a post or obstruction to break a beam of radiation, or block the optical view as it passes transceiver 550.

As disclosed above, the beverage dispensing system 170 may include various ingredients that may be in the form of highly-concentrated natural ingredients that are shelf-stable for at least one year without the use of artificial ingredients or preservatives. The high concentration reduces the water content to an activation level with a resulting pH that naturally inhibits bacteriological or other organic growth. Because of the high concentration levels and the desired long shelf-life, beverage dispensing system 170 may use the separation of the ingredients into individual ingredient storage and flows to maintain their flavors in order to meet the sensory desires of a user. The beverage dispensing system 170 is capable of keeping all the ingredients isolated until they are mixed together, one beverage at a time, in the user's container 699 without any flavor carryover from previous dispenses. In an implementation, the user's container may include a re-usable container.

Typical fountain dispensers experience problems with air infiltration induced dripping when the pump flow stops at the end of dispensing. Ingredients dribble out the side of the dispenser and are difficult to clean at the end of each recipe dispense, leaving flavors to carryover to the next beverage dispensed. Furthermore, because of the higher concentration levels of the individual ingredients used to reconstitute the flavors, it is desirable that the water system does not impart any undesirable tastes or odors from the water source. These are challenges in addition to operational challenge encountered with wide variations in water supply conditions present at locations where the beverage dispensing system is installed.

Figure 25:
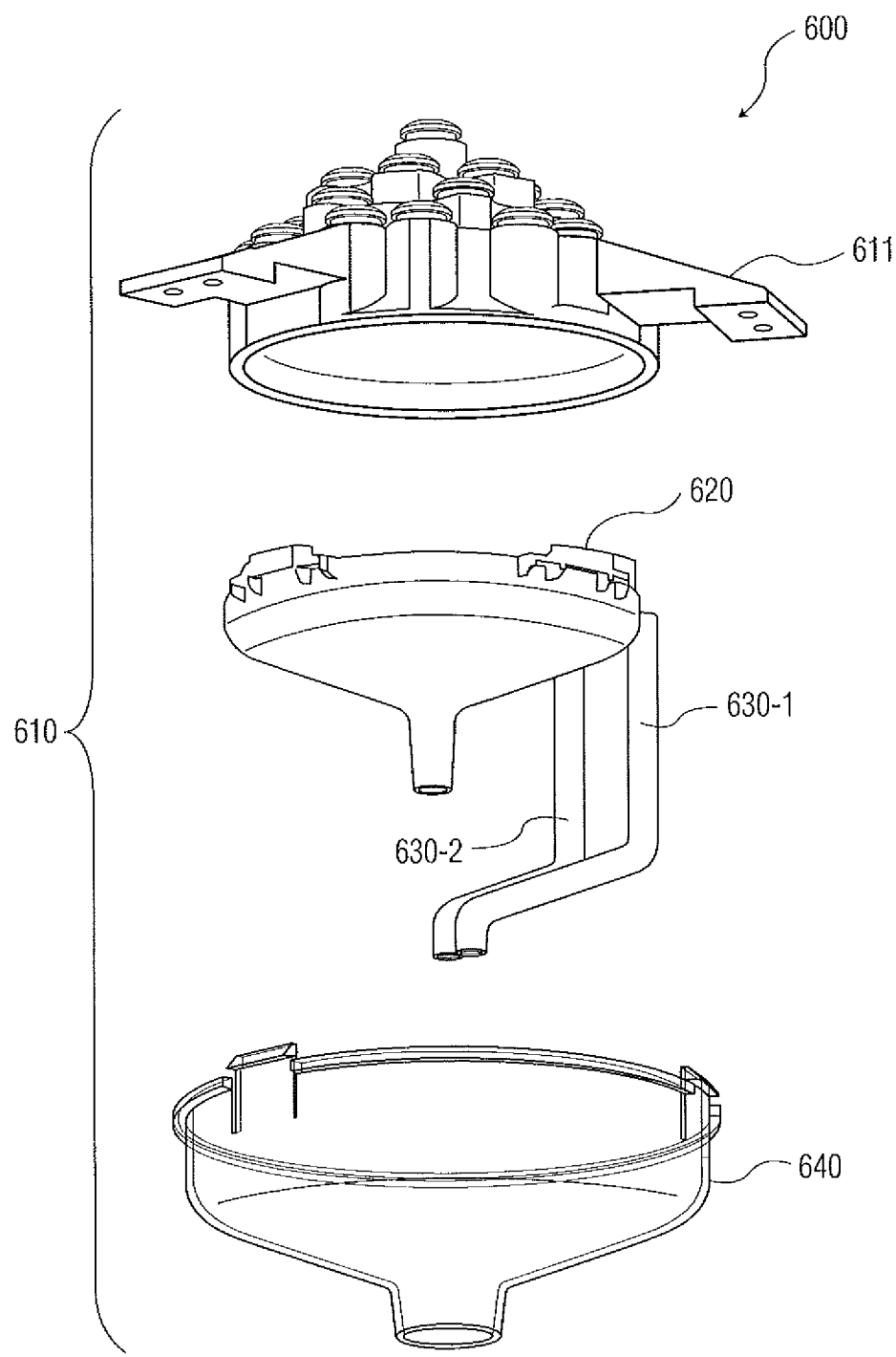
FIG. 25 is a depiction of an exploded-view of an implementation of a dispenser in the beverage dispensing system.
Figure 26:
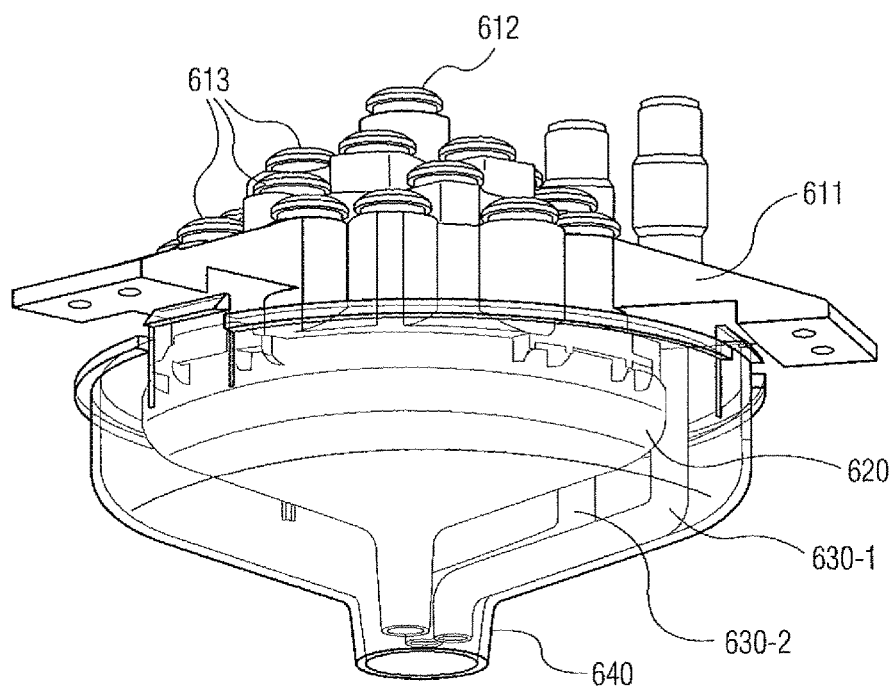
FIG. 26 is a depiction of an overview of an implementation of a dispenser in the beverage dispensing system.
Figure 27A:
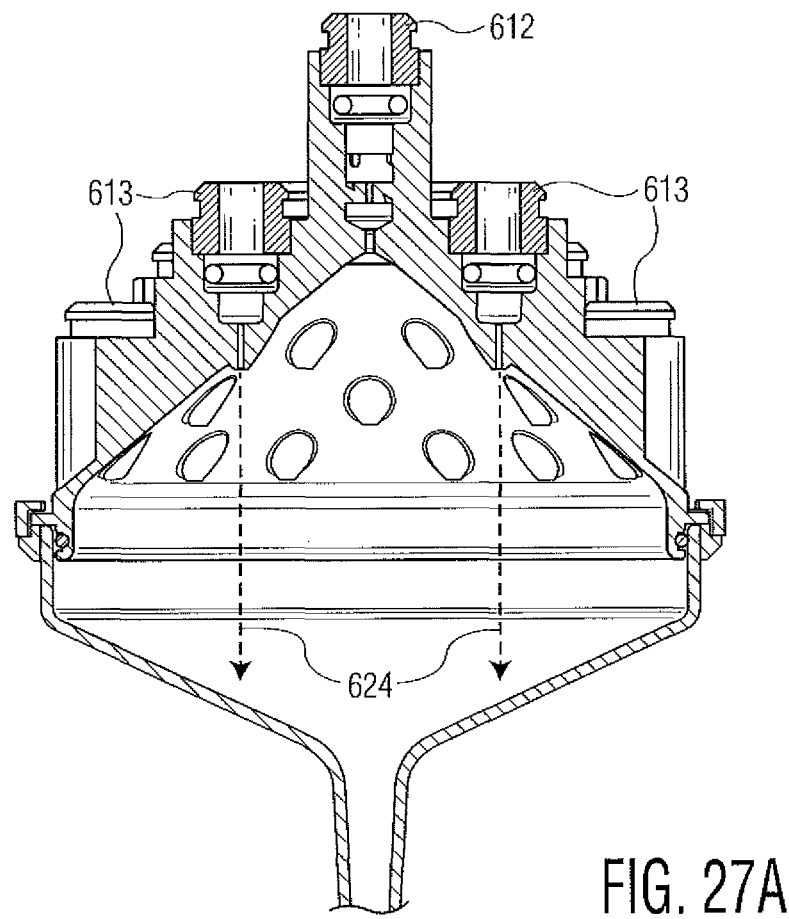
FIGS. 27A and 27B depict partial cross-sectional views of an implementation of a nozzle in the beverage dispensing system.

Next, a dispensing system 600 is described, according to an implementation, as shown in FIGS. 11, 25, 26, 27A-27D, 28A-28E and 29. The beverage dispensing system 170 of the present disclosure may use a dispenser system 600 which may include a nozzle 610 comprised of a cone nozzle 611 and an ingredient funnel 620, and at least one outlet tube 630. Optionally, dispenser 600 may include a cover 640, or multiple outlet tubes 630-1, 630-2, as shown in FIGS. 25 and 26. Cone nozzle 611 incorporates a staggered layout of ingredient outlets 613 in apertures located around a central rinse outlet 612 positioned in an aperture at an apex of cone nozzle 611 as shown in FIGS. 27A, 28D and 29.

Cone nozzle 611 is generally shaped as a concave cone to allow for a rinse spray pattern 614 to effectively clean any drips of individual flavor ingredients remaining at the conclusion of a dispense cycle. The water rinse outlet 612 may be a full cone nozzle, such as a Lechler 460 Series or 490/491 Series spray nozzle available from Lechler Inc. of St. Charles, Ill.; a Fulco Jet PVDF Spray Nozzle available from United States Plastic Corporation of Lima Ohio; or equivalent.

Figure 28A:
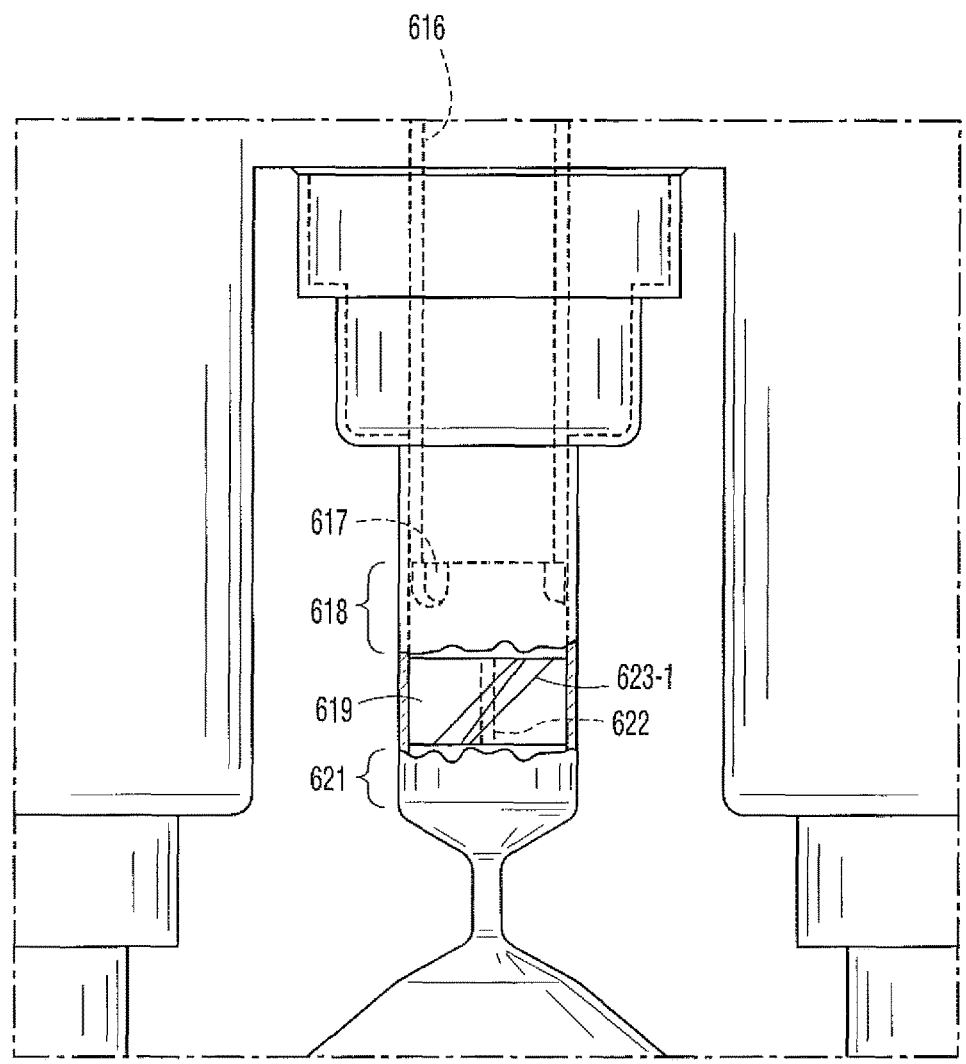
Figure 28B:
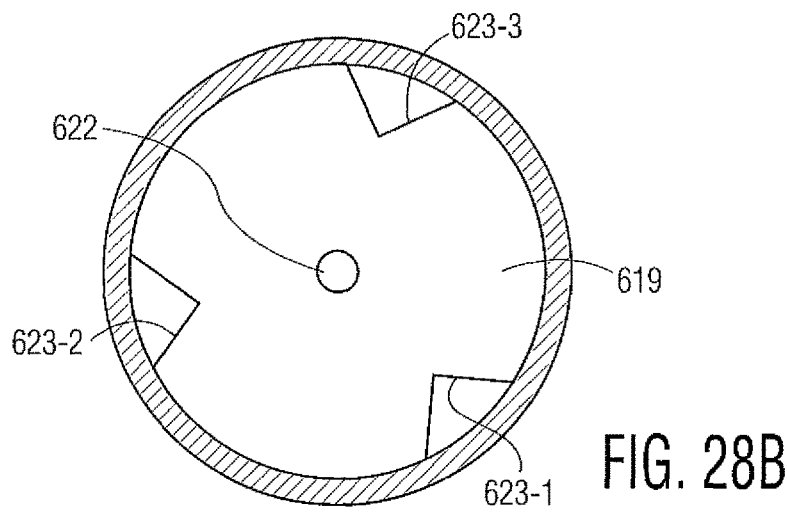
Figure 28C:
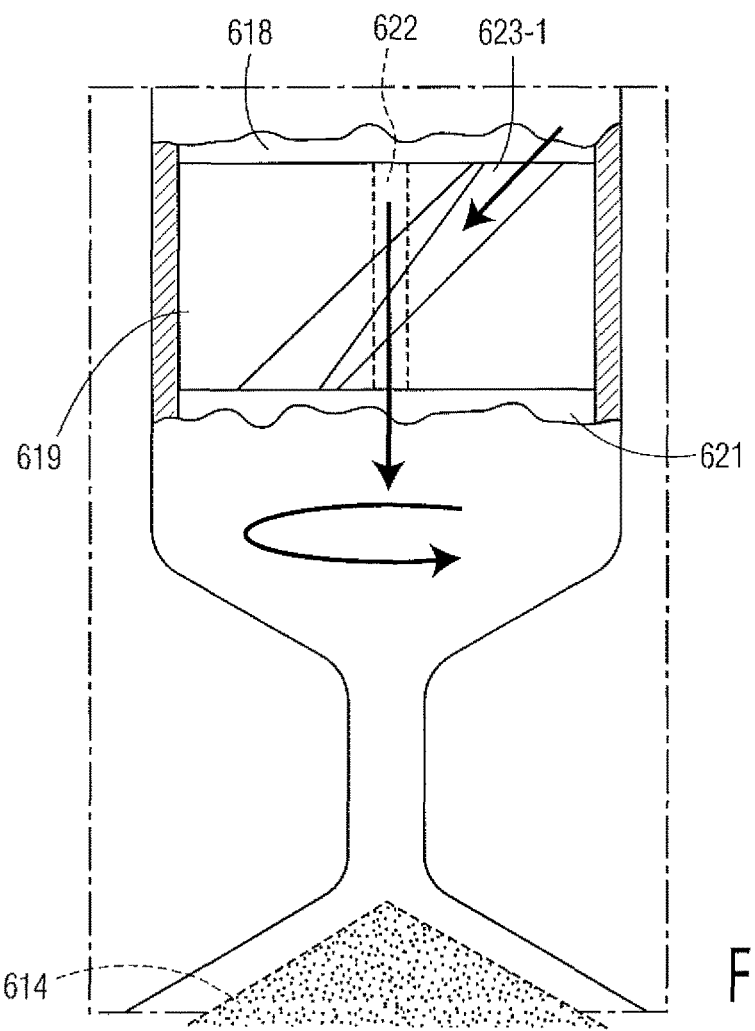
Figure 29:
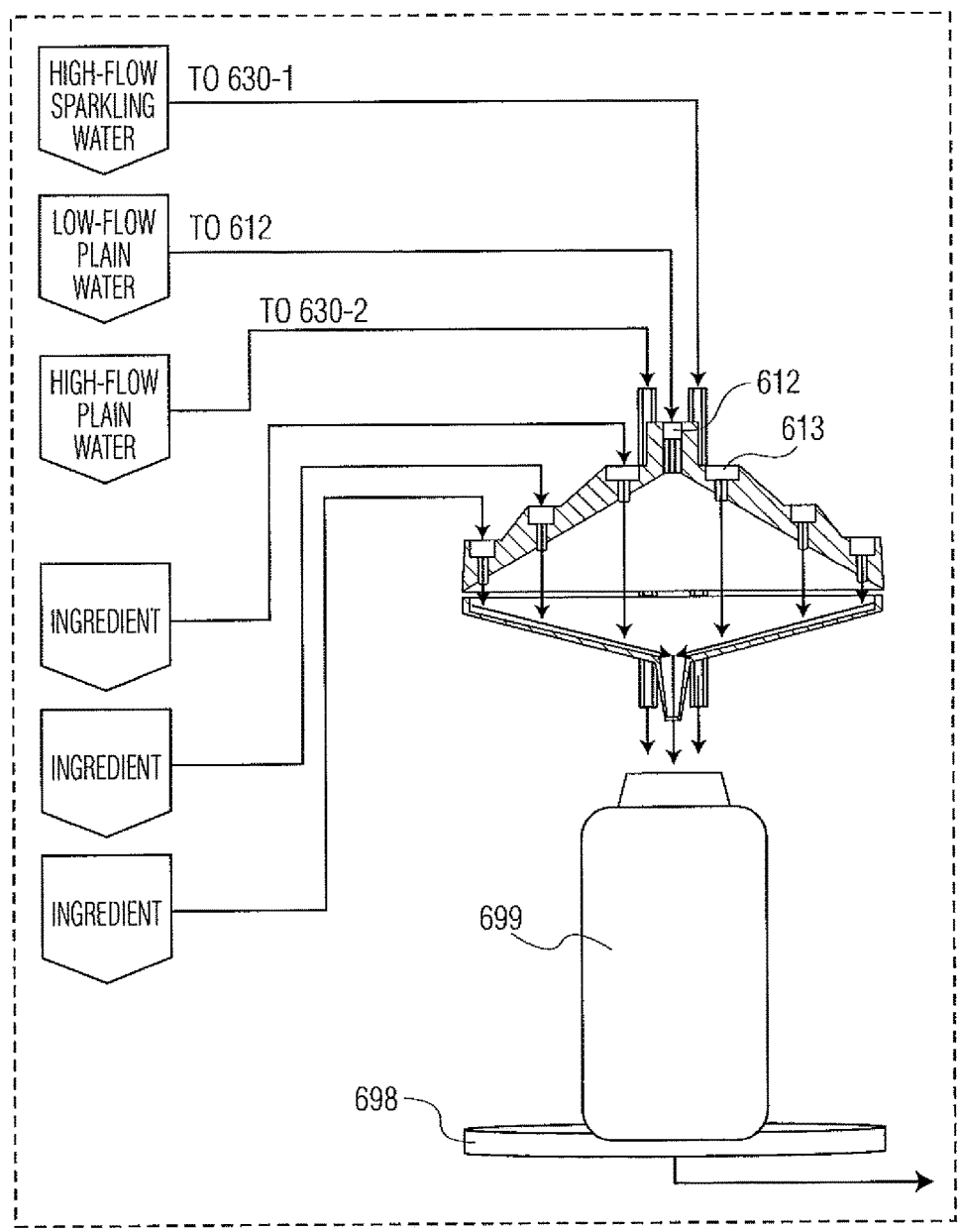
FIG. 29 is a depiction of a user container filled by a nozzle in the beverage dispensing system.

The water rinse outlet 612 may contain physical features to divide the water flow into two portions, as shown in FIGS. 28A-28C. A first portion of rinse water that exits the outlet is in a straight line direction of flow. A second portion is diverted through passageways in rinse outlet 612 that spins the rinse water around the straight line flow of the first portion as it exits rinse outlet 612, as shown in FIG. 28B. Low-flow rinse water enters the cone nozzle 611 through centrally-located rinse outlet 612.

In an implementation, rinse outlet 612 may use tubing fittings, and the low-flow water may be connected by tubing 616. Tubing 616 that is inserted into rinse outlet 612 may stop at stop-bumps 617 designed to create gap 618 between end of tubing 616 and full-cone spray insert 619 to distribute water to four inlets of the full-cone spray insert 619.

Figure 28E:
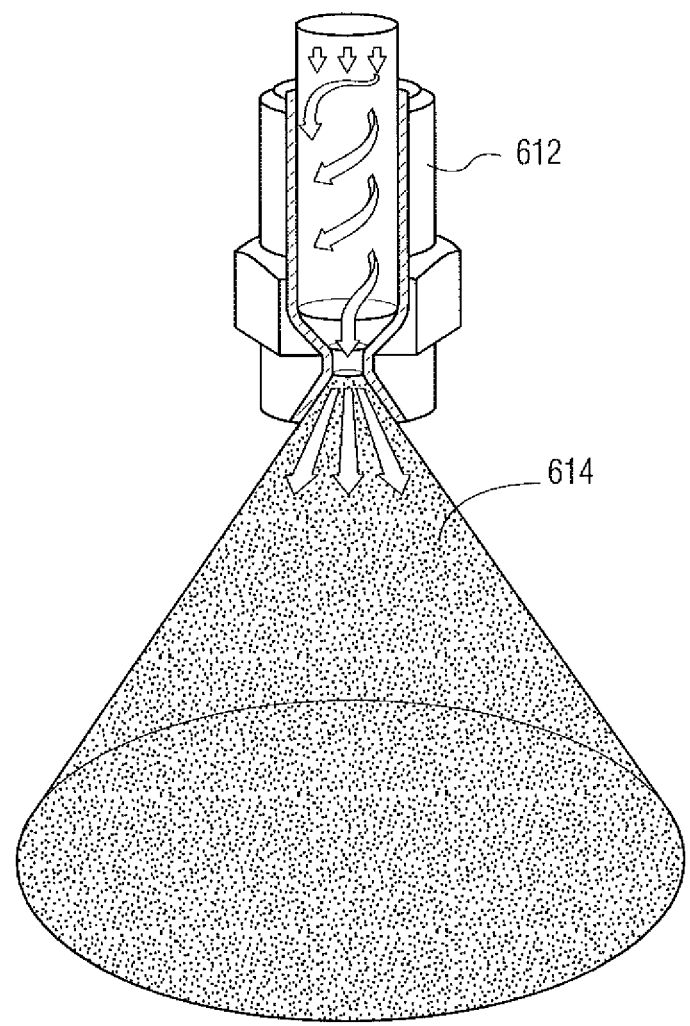
FIG. 28E is depiction of a perspective partial cross-sectional view of a water rinse outlet and resulting full-cone spray of the nozzle in the beverage dispensing system.

Full-cone spray insert 619 divides low-flow water into two portions. A first portion flows through central passageway 622 and continues vertically straight through the insert 619, as shown in FIGS. 28A, 28B and 28C. A second portion flows through three equally spaced angled groove paths 623-1, 623-2, 623-3 cut into side surface of the insert 619 that rotate the water direction counter-clockwise to the flow path of the first portion, before exiting the bottom of insert 619. An exit gap 621 below insert 619 allows the two portions to combine as they enter the cone nozzle and fan out in a conical shape and draw the first portion into the conical shape, filling the conical spray with a full cone spray 614 (as opposed to a hollow cone), as shown in FIGS. 28D and 28E. The angle of the full cone spray 614 may match the interior angle of cone nozzle 611, as shown in FIG. 28D. The full cone spray 614 effectively rinses the inner surface of ingredient funnel 620 as well as the interior of cone nozzle 611.

Figure 27B:
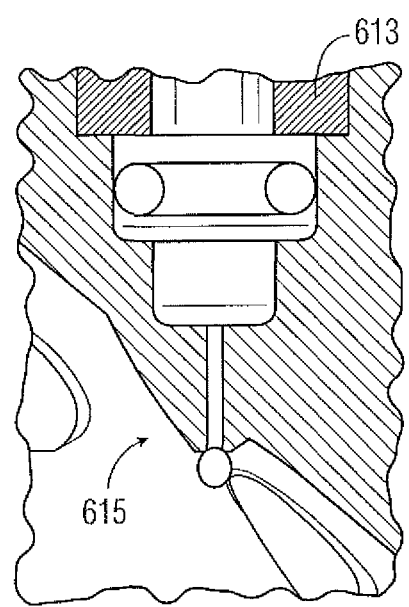
Figure 27D:
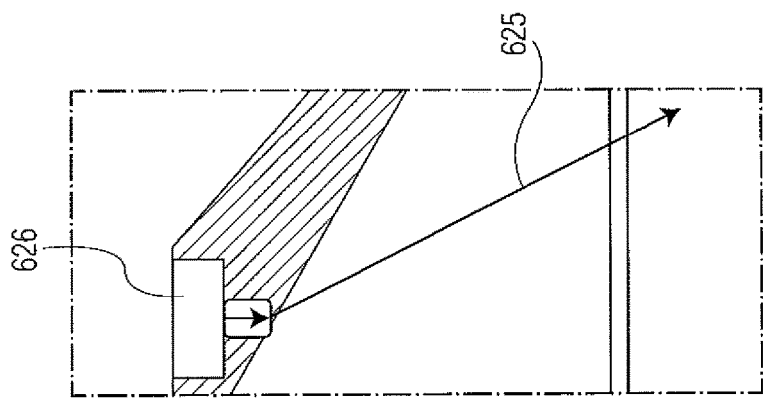
FIG. 27D is a depiction of a cross-sectional view of a portion of a nozzle illustrating a direction of liquid being dispensed without rounded outlets.
Figure 27C:
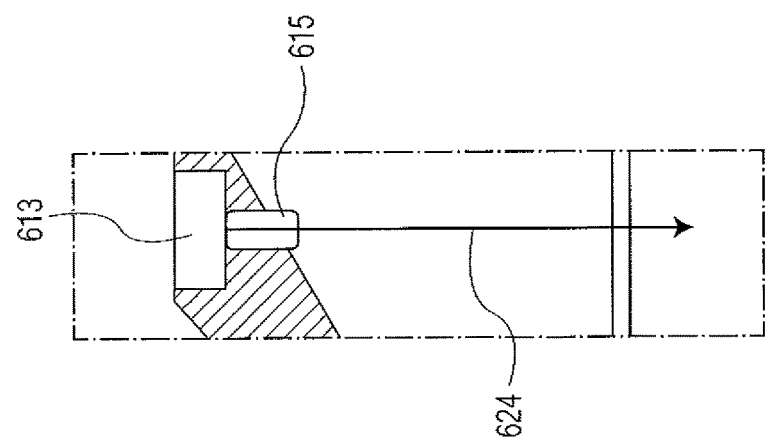
FIG. 27C is a depiction of a cross-sectional view of a portion of the nozzle in the beverage dispensing system illustrating a direction of liquid being dispensed by the ingredient outlets.

The inner surface of cone nozzle 611 may include rounded outlets 615 for each ingredient outlet 613, as shown in FIG. 27B. Rounded outlets 615 project outward from the inner surface of cone nozzle 611 to assure that the individual ingredients dispense with a single column of ingredient from cone nozzle 611 vertically to ingredient funnel 620. The shape of rounded outlet 615 is designed such that ingredient outlet 613 forms a circular opening and assures that the ingredient will dispense in a vertical stream 624 as shown in FIG. 27C, and not dribble down the inner surface of cone nozzle 611 in a distorted stream 625, as shown in FIG. 27D for non-rounded outlets 626. Without rounded outlets 615, the intersection of the ingredient outlet 613 and the inner surface of cone nozzle 611 is elliptical. The longer surface of the ellipse will bend the flow of some of the ingredients, causing excessive dribble down the inner surface which is difficult to effectively rinse at the end of each dispense cycle.

As explained above, a peristaltic pump provides its own flow control method in that when the pump stops operating, it automatically stops and seals off flow of the material being pumped. The rounded outlets 615 and peristaltic ingredient pumps 404 provide for ingredient flow that will leave at most one drip remaining at the ingredient outlet 613, as shown in FIG. 27B.

In operation, controller 172 may begin the recipe dispense process by turning on the low-flow rinse water via solenoid 216 (FIG. 14C) briefly to wet interior surfaces of cone nozzle 611 prior to dispensing any of the ingredients. Controller 172 may then pulse the low-flow water spray during the dispense of all the ingredients to start diluting the ingredients. The pulsing of the low-flow spray also drives the ingredients to exit the ingredient funnel 620 into the user's container 699 placed on container support and drain 698, as shown in FIG. 29.

The at least one outlet tube 630 may be located very close to the outlet of the ingredient funnel 620. In implementations including two outlet tubes 630-1, 630-2, the ingredient funnel 620 and outlet tubes 630-1, 630-1 may form a close triangular arrangement. For example outlet tube 630-1 may dispense high flow (chilled) sparkling water and outlet tube 630-2 may dispense high flow (chilled) plain water. The at least one outlet tube 630 may be located in relation to the ingredient funnel 620 in a manner to allow easy removal of the ingredient funnel 620 for routine cleaning. Optionally, a cover 640 may be used to shield and protect the at least one outlet tube 630 and ingredient funnel 620. The cover may be funnel-shaped to provide a visual indicator to help a user place a container under the outlet of ingredient funnel 620.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A beverage dispensing system comprising:
   a plurality of reservoirs holding a respective plurality of separate ingredients to be used in beverage recipes;
   a user interface for selection of a user-defined custom beverage to be dispensed, based on user input indicating user preferences associated with one or more ingredients among the plurality of separate ingredients to be combined;
   one or more ingredient pumps respectively connected to the plurality of reservoirs;
   a controller for separately controlling each of the one or more ingredient pumps to select any combination of the plurality of separate ingredients to form one or more selected ingredients, the controller being adapted to create the custom beverage by controlling selection of certain combinations and amounts among the plurality of separate ingredients based on the user preferences received in the user input, such that, for each selected ingredient, the controller determines a predefined dosing amount to be dispensed by repeatedly measuring varying amounts of the respective ingredient amount being dispensed by using a differential pressure sensor or a pulse counter sensor until the predefined dosing amount is reached; and
   a nozzle dispenser in communication with the one or more ingredient pumps for independently receiving the one more selected ingredients and mixing the one or more selected ingredients to form the custom beverage and to dispense the custom beverage.

2. The beverage dispensing system of claim 1, wherein the custom beverage comprises water and at least one of one or more flavor ingredients, one or more acids, one or more sweeteners and one or more supplements held within the plurality of reservoirs.

3. The beverage dispensing system of claim 2, wherein the one or more acids include at least one of citric acid, malic acid and ascorbic acid.

4. The beverage dispensing system of claim 2, wherein the one or more supplements include at least one of one or more vitamins, antioxidants, minerals, fiber, essential fatty acids, amino acids, probiotics, digestive enzymes, appetite suppressants, electrolytes, anti-acids, protein, glucosamine and chondroitin, CoQ10, curcumin, collagen, chemical extracts, brewer's yeast, *spirulina*, bee pollen, royal jelly, herbs and caffeine.

5. The beverage dispensing system of claim 1, wherein the custom beverage includes one or more of an alcohol or at least one of ethanol based spirits, wine, or beer.

6. The beverage dispensing system of claim 1, wherein the user input is adapted for one or more of:
   selecting one or more flavor ingredients,
   selecting one or more ingredient varietals,
   selecting relative strengths of the selected flavor ingredients,
   selecting a sweetener type,
   selecting a relative sweetness level of the selected sweetener type,
   selecting an acid ingredient,
   selecting a tartness level,
   selecting one or more water choices,
   selecting a temperature range of the selected water choices, and
   selecting a carbonation level of the selected water choices.

7. The beverage dispensing system of claim 6, wherein the sweetener type is associated with one or more different calorie levels.

8. The beverage dispensing system of claim 1, wherein the user input is a result of a user personally selecting the one or more ingredients among the plurality of separate ingredients and at least one of an amount, a concentration, a percentage or a ratio of the one or more ingredients to be used to create the custom beverage.

9. The beverage dispensing system of claim 1, further comprising one or more water choices comprising a temperature range from cold to hot and a carbonation level from non-carbonated to fully carbonated selectable by a user to define the custom beverage.

10. The beverage dispensing system of claim 1, further comprising a memory device coupled to the controller and the user interface, wherein the user interface is in communication with the memory device to store and manage the user preferences.

11. The beverage dispensing system of claim 1, wherein the user interface further comprises an interactive display for displaying ingredient selection parameters for creating the custom beverage.

12. The beverage dispensing system of claim 1, wherein the controller controls dispensing of each selected ingredient by repeatedly measuring varying amounts of the respective ingredient actually being dispensed.

13. A method for dispensing a beverage comprising:
   storing a plurality of separate ingredients to be used in beverage recipes in a respective plurality of reservoirs, the plurality of reservoirs respectively connected to a plurality of ingredient pumps;
   receiving, via a user interface, user input indicating selection of a user-defined custom beverage to be dispensed, the user input indicating user preferences associated with one or more ingredients among the plurality of separate ingredients to be combined;
   separately controlling, by a controller, each ingredient pump to select any combination of the plurality of separate ingredients to form one or more selected ingredients, such that the custom beverage is created by the controller controlling selection of certain combinations and amounts among the plurality of separate ingredients based on the user preferences received in the user input, such that, for each selected ingredient, the controller determines a predefined dosing amount to be dispensed by repeatedly measuring varying amounts of the respective ingredient amount being dispensed by using a differential pressure sensor or a pulse counter sensor until the predefined dosing amount is reached;
   independently receiving, by a nozzle dispenser in communication with the plurality of ingredient pumps, the one more selected ingredients;
   mixing, within the nozzle dispenser, the one or more selected ingredients to form the custom beverage; and
   dispensing, by the nozzle dispenser, the custom beverage.

14. The method of claim 13, wherein the custom beverage comprises water and at least one of one or more flavor ingredients, one or more acids, one or more sweeteners and one or more supplements held within the plurality of reservoirs.

15. The method of claim 13, wherein the user input is adapted for one or more of:
   selecting one or more flavor ingredients,
   selecting one or more ingredient varietals,
   selecting relative strengths of the selected flavor ingredients,
   selecting a sweetener type associated with one or more different calorie levels,
   selecting a relative sweetness level of the selected sweetener type,
   selecting an acid ingredient,
   selecting a tartness level,
   selecting one or more water choices,
   selecting a temperature range of the selected water choices, and
   selecting a carbonation level of the selected water choices.

16. The method of claim 13, wherein the user input is a result of a user personally selecting the one or more ingredients among the plurality of separate ingredients and at least one of an amount, a concentration, a percentage or a ratio of the one or more ingredients to be used to create the custom beverage.

17. The method of claim 13, wherein the user input includes selection of one or more water choices comprising a temperature range from cold to hot and a carbonation level from non-carbonated to fully carbonated to define the custom beverage.

18. The method of claim 13, wherein the controller controls dispensing of each selected ingredient by repeatedly measuring varying amounts of the respective ingredient actually being dispensed.

19. A method for dispensing a beverage comprising:
   storing a plurality of separate ingredients to be used in customizable beverage recipes in a respective plurality of reservoirs, the plurality of reservoirs interconnected to a dosing system for
   controlling a concentration of any ingredient among the plurality of separate ingredients;
   receiving, by a controller coupled to the dosing system, user input indicating user preferences for the beverage;

controlling, by the controller, responsive to the user input, the dosing system to select any combination among the plurality of separate ingredients according to the user preferences;

controlling, by the dosing system, selection of certain combinations and concentrations among the plurality of separate ingredients based on the user preferences to form one or more selected ingredients associated with the beverage, such that, for each selected ingredient, the dosing system determines a predefined dosing amount to be dispensed by repeatedly measuring varying amounts of the respective ingredient amount being dispensed by using a differential pressure sensor or a pulse counter sensor until the predefined dosing amount is reached;

independently receiving, by a dispense nozzle in communication with the dosing system, each selected ingredient associated with the beverage and water;

mixing, within the dispense nozzle, the one or more selected ingredients and the water; and dispensing, by the dispense nozzle, the beverage mixed in the dispense nozzle.

20. The method of claim 19, the method further comprising:

dispensing, by least one outlet tube coupled to the dispense nozzle and separate from an outlet of the dispense nozzle, one or more water choices comprising a temperature range from cold to hot and a carbonation level from non-carbonated to fully carbonated selectable by a user to define the beverage.

21. The method of claim 19, wherein the controlling of the selection of certain combinations and concentrations among the plurality of separate ingredients includes:

activating, for each selected ingredient, a respective ingredient pump coupled to a corresponding reservoir among the plurality of reservoirs;

measuring, for each selected ingredient, by the differential pressure sensor, a differential pressure of the respective selected ingredient when the respective ingredient pump is in operation;

determining, for each selected ingredient, by the controller, a flow rate of the corresponding selected ingredient based on the measured differential pressure; and controlling, for each selected ingredient, by the controller, operation of the respective ingredient pump based on the flow rate with respect to the user preferences for the beverage.

22. The method of claim 19, wherein the controlling of the selection of certain combinations and concentrations among the plurality of separate ingredients includes:

activating, for each selected ingredient, a respective ingredient pump coupled to a corresponding reservoir among the plurality of reservoirs;

measuring, for each selected ingredient, by the pulse counter sensor, pulses associated with rotation of the corresponding ingredient pump when the respective ingredient pump is in operation;

determining, for each selected ingredient, by the controller, a dispense amount of the corresponding selected ingredient from the respective measured pulses; and controlling, for each selected ingredient, by the controller, operation of the respective ingredient pump based on the dispense amount with respect to the user preferences for the beverage.

23. The method of claim 22, wherein the measured pulses are generated by a volume of each respective ingredient being dispensed.

24. The method of claim 19, the method further including purifying the water via at least one filter prior to directing the water to the dispense nozzle.

25. The method of claim 24, wherein the purifying of the water includes:

providing a booster pump in communication with the controller and a water supply source of the water;

storing, in an accumulator tank, a reserve supply of water, the accumulator tank being in communication with an outlet of the booster pump and an inlet of the at least one filter;

measuring, by a pressure sensor in communication with an outlet of the at least one filter and the controller, a water pressure from the outlet of the at least one filter; and controlling, by the controller, the booster pump to adjust a flow rate of the water output by the at least one filter based on at least one of the measured water pressure and an operational state of a beverage dispensing system.

26. The method of claim 19, the method further comprising cooling the water via a thermo-electric cooling (TEC) cooling system prior to transferring the water to the dispense nozzle.

27. The method of claim 26, the method further comprising carbonating the water by the TEC cooling system prior to transferring the water to the dispense nozzle.

28. The method of claim 19, the method further comprising heating the water via a heater tank prior to transferring the water to the dispense nozzle.

29. The method of claim 19, wherein the dosing system controls dispensing of each selected ingredient by repeatedly measuring varying amounts of the respective ingredient actually being dispensed.

* * * * *